(12) United States Patent
Van Immerseel et al.

(10) Patent No.: US 12,461,111 B2
(45) Date of Patent: Nov. 4, 2025

(54) INTESTINAL AND FECAL BIOMARKERS FOR INTESTINAL HEALTH OF POULTRY

(71) Applicant: Universiteit Gent, Ghent (BE)

(72) Inventors: Filip Van Immerseel, Eke (BE); Richard Ducatelle, Wortegem-Petegem (BE); Venessa Eeckhaut, Ruiselede (BE); Evy Goossens, Wachtebeke (BE); Fien De Meyer, Wondelgem (BE)

(73) Assignee: Universiteit Gent, Ghent (BE)

( * ) Notice: Subject to any disclaimer, the term of this patent is extended or adjusted under 35 U.S.C. 154(b) by 1347 days.

(21) Appl. No.: 17/048,911

(22) PCT Filed: Apr. 2, 2019

(86) PCT No.: PCT/EP2019/058324
§ 371 (c)(1),
(2) Date: Oct. 19, 2020

(87) PCT Pub. No.: WO2019/206585
PCT Pub. Date: Oct. 31, 2019

(65) Prior Publication Data
US 2023/0160911 A1    May 25, 2023

(30) Foreign Application Priority Data

Apr. 24, 2018 (EP) .................................... 18168901
Mar. 14, 2019 (EP) .................................... 19162944

(51) Int. Cl.
*G01N 33/68*    (2006.01)
(52) U.S. Cl.
CPC ... *G01N 33/6893* (2013.01); *G01N 2333/465* (2013.01); *G01N 2800/06* (2013.01)
(58) Field of Classification Search
CPC ......... G01N 33/6893; G01N 2333/465; G01N 2800/06; G01N 33/6803
See application file for complete search history.

(56) References Cited

U.S. PATENT DOCUMENTS

| | | | | |
|---|---|---|---|---|
| 6,566,333 | B2 * | 5/2003 | Williams | A61K 38/1709 424/85.1 |
| 6,800,610 | B2 * | 10/2004 | Williams | A61K 48/00 514/16.7 |
| 2002/0114779 | A1 * | 8/2002 | Williams | A61K 38/1709 424/85.1 |
| 2005/0070476 | A1 * | 3/2005 | Williams | C07K 16/00 514/16.7 |
| 2008/0057498 | A1 * | 3/2008 | Niewold | C12Q 1/6883 435/6.16 |
| 2011/0151490 | A1 * | 6/2011 | Hillman | G01N 33/57488 530/389.3 |

FOREIGN PATENT DOCUMENTS

| | | | | |
|---|---|---|---|---|
| WO | WO 2005052575 | * | 6/2005 | ............. G01N 33/48 |
| WO | 2017066777 A1 | | 4/2017 | |

OTHER PUBLICATIONS

2) Van Ness et al. "The v-myb oncogene product binds to and activates the promyelocyte-specific mim-1 gene." Cell vol. 59, 1115-1125, Dec. 22, 1989. This reference discloses SEQ ID No. 12, 13.*
International Search Report for International Application No. PCT/EP2019/058324, mailed Jun. 5, 2019, 5 pages.
International Written Opinion for International Application No. PCT/EP2019/058324, mailed Jun. 5, 2019, 6 pages.
Lima et al, "Faecal virome of healthy chickens reveals a large diversity of the eukaryote viral community, including novel circular ssDNA viruses", Journal of General Virology, vol. 98, No. 4, Apr. 1, 2017 (Apr. 1, 2017), p. 690-703, XP055496137 DOI: 10.1099/jgv.0.000711.
Chen et al, "Identification of Potential Biomarkers for Gut Barrier Failure in Broiler Chickens", Frontiers in Veterinary Science, vol. 2, May 26, 2015 (May 26, 2015), XP055465808 DOI: 10.3389/fvets.2015.00014.
Niewold, "Gut Health, Intestinal Innate Immunity and Performance", Aug. 29, 2014 (Aug. 29, 2014), p. 1-10, Retrieved from the Internet: URL:https://en.engormix.com/poultry-industry/articles/gut-health-intestinal-innate-t36261. htm XP002783445 [retrieved on Jul. 27, 2018].
Goossens et al, "Elevated faecal ovotransferrin concentrations are indicative for intestinal barrier failure in broiler chickens", Veterinary Research,vol. 49, No. 1, Jun. 20, 2018 (Jun. 20, 2018), XP055496145 DOI: 10.1186/s13567-018-0548-4.
Ducatelle et al, "Biomarkers for monitoring intestinal health in poultry: present status and future perspectives", Veterinary Research,vol. 49, No. 1, May 8, 2018 (May 8, 2018), XP055586800 DOI: 10.1186/s13567-018-0538-6.
Adelman et al. "Measuring Change In Small Intestinal Histology In Patients With Celiac Disease" Am J Gastroenterol 2018; 113:339-347; doi: 10.1038/ajg.2017.480; published online Feb. 20, 2018.
Awad et al. "Effects of dietary inclusion of probiotic and synbiotic on growth performance, organ weights, and intestinal histomorphology of broiler chickens" 2009 Poultry Science 88:49-55 (Accepted Aug. 24, 2008).
Broom et al. "Non-Invited Review Inflammation: friend or foe for animal production?" 2018 Poultry Science 97:510-514 (Accepted Sep. 25, 2017).
Canani et al. "Faecal calprotectin as reliable non-invasive marker to assess the severity of mucosal inflammation in children with inflammatory bowel disease" Digestive and Liver Disease 40 (2008) 547-553 (Available online Mar. 20, 2008).

(Continued)

*Primary Examiner* — Ann Montgomery
(74) *Attorney, Agent, or Firm* — TraskBritt

(57) ABSTRACT

Growth performance, health and welfare of domesticated birds such as broilers heavily depends on a well-functioning intestinal tract. Consequently, there is a high need to find biomarkers that are specific for gut damage and that are easily applicable in the field. The present disclosure describes a set of 20 specific proteins that can be quantified in fresh fecal droppings and/or intestinal content of the birds and that each specifically correlate with a damaged gut.

9 Claims, 7 Drawing Sheets

Specification includes a Sequence Listing.

(56) References Cited

OTHER PUBLICATIONS

Chang et al. "Faecal calprotectin as a novel biomarker for differentiating between inflammatory bowel disease and irritable bowel syndrome" Molecular Medicine Reports 10: 522-526, 2014 (Accepted Mar. 13, 2014).

Gilani et al. "Intestinal permeability induced by lipopolysaccharide and measured by lactulose, rhamnose and mannitol sugars in chickens" Animal (2017), 11:7, pp. 1174-1179 (published online Nov. 24, 2016).

Gilani et al. "New biomarkers for increased intestinal permeability induced by dextran sodium sulphate and fasting in chickens" Journal of Animal Physiology and Animal Nutrition 101 (2017) e237-e245 (accepted: Aug. 9, 2016).

Hong et al. "Differential regulation of microRNA transcriptome in chicken lines resistant and susceptible to necrotic enteritis disease" 2014 Poultry Science 93 : 1383-1395 (Accepted Feb. 8, 2014).

Johnson et al. Anticoccidial drugs: Lesion scoring techniques in battery and floor-pen experiments with chickens. Experimental Parasitology 28, 30-36 (1970).

Kuttappan et al. "Evaluation of Gastrointestinal Leakage in Multiple Enteric Inflammation Models in Chickens" Frontiers in Veterinary Science, Dec. 2015, vol. 2, Article 66, pp. 1-6.

O'Reilly et al. "Acute phase proteins: a review of their function, behaviour and measurement in chickens" World's Poultry Science Journal, vol. 70, Mar. 2014, pp. 27-44.

Teirlynck et al. "Morphometric evaluation of "dysbacteriosis" in broilers" Avian Pathology, 40(2), 139-144 (Published online: Apr. 15, 2011).

Wang et al. "Methods to determine intestinal permeability and bacterial translocation during liver disease" Journal of Immunological Methods 421, 44-53 (Jan. 13, 2015).

Yamauchi "Review on Chicken Intestinal Villus Histological Alterations Related with Intestinal Function" Journal of Poultry Science, 39, 229-242 (Accepted Jul. 31, 2002).

Yegani et al. "Factors Affecting Intestinal Health in Poultry" 2008 Poultry Science 87:2052-2063 (Accepted Jun. 3, 2008).

* cited by examiner

INTESTINAL AND FECAL BIOMARKERS FOR INTESTINAL HEALTH OF POULTRY

CROSS-REFERENCE TO RELATED APPLICATIONS

This application is a national phase entry under 35 U.S.C. § 371 of International Patent Application PCT/EP2019/058324, filed Apr. 2, 2019, designating the United States of America and published in English as International Patent Publication WO 2019/206585 A1 on Oct. 31, 2019, which claims the benefit under Article 8 of the Patent Cooperation Treaty to European Patent Application Serial No. 18168901.9, filed Apr. 24, 2018, and to European Patent Application Serial No. 19162944.3, filed Mar. 14, 2019.

TECHNICAL FIELD

Growth performance, health and welfare of domesticated birds such as broilers heavily depends on a well-functioning intestinal tract. Consequently, there is a high need to find biomarkers that are specific for gut damage and that are easily applicable in the field. In this disclosure, a set of 20 specific proteins that can be quantified in fresh fecal droppings and intestinal content of the birds and that each specifically correlate with a damaged gut is disclosed.

STATEMENT ACCORDING TO 37 C.F.R. § 1.821(c) or (e)—SEQUENCE LISTING SUBMITTED AS A TXT AND PDF FILES

Pursuant to 37 C.F.R. § 1.821(c) or (e), files containing a TXT version and a PDF version of the Sequence Listing have been submitted concomitant with this application, the contents of which are hereby incorporated by reference.

BACKGROUND

Poultry such as broiler chickens have the lowest feed conversion of all meat-producing animals, and are, therefore, considered to be a relative sustainable source of animal protein, of which the production and consumption are still rising worldwide (Scanes, 2007; Cowieson and Selle, 2012). A well-functioning intestinal tract is of key importance for digestion and nutrient absorption and consequently low feed conversion, and is also crucial for health and welfare of broilers (Bailey et al., 2010). Indeed, intestinal diseases and syndromes are rather common in broilers and constitute the most important cause for treatment (Casewell et al., 2003). In poultry practice, coccidiosis is by far the most important intestinal disease (Yegani and Korver, 2008; Caly et al., 2015). Clinical diseases caused by bacterial pathogens are not common, but it is widely recognized that a variety of intestinal syndromes are affecting broiler performance, including subclinical necrotic enteritis and coccidiosis, viral enteritis, and various non-defined enteritis syndromes (Yegani and Korver, 2008). It is not evident to diagnose these subclinical entities and differentiate these from performance problems that have no infectious etiology, such as those caused by suboptimal formulated diets that not always cause intestinal damage.

The gut wall structure and morphology is a major determinant of intestinal health. Macroscopic observations of the intestinal wall at necropsy can easily be used to monitor for intestinal lesions caused by *Clostridium perfringens* and coccidia (Johnson and Reid, 1970), but are less clear for more subtle intestinal pathologies. Macroscopic alterations of the gut wall (such as gut wall tonus and thickness) and intestinal content (such as viscosity) can be used by experienced veterinarians as parameters for intestinal health but are to some extent subjective (Teirlynck et al., 2011). Histopathological microscopic observations are giving an accurate picture of intestinal health as villus structure, epithelial cell defects and inflammation can be scored (Yamauchi, 2002). In any case, the above mentioned intestinal health monitoring systems should be performed postmortem and do not have high predictive diagnostic value, although in flocks animals can be sacrificed and used to monitor for disease.

Quantifiable easy-to-measure biomarkers for intestinal health are still not in use in broiler chickens in practice but would be of tremendous value as a tool to monitor for subclinical intestinal entities that cause performance problems and to evaluate control methods for intestinal health, independent of whether the triggers are derived from host, nutritional or microbial factors. Epithelial damage and epithelial permeability are likely the main drivers for intestinal health problems in broiler chickens, and damage to these cells and the gut mucosa is characterized by shortening of villi, lengthening of crypts and infiltration of inflammatory cells (Teirlynck et al., 2011; Adelman et al., 2018). It has been shown that an increase of villus length and villus-to-crypt ratio is associated with improvement of growth performance (Awad et al., 2009). While an inflammatory response in the gut is essential to control and contain infections, these responses should also have an accurate transition to an anti-inflammatory state as inflammation is costing energy that affects performance (Broom and Kogut, 2018).

Various systems have been developed to measure intestinal permeability, but are mainly used in experimental models (Gilani et al., 2016; Gilani et al., 2017; Wang et al., 2015). Quantification in serum or plasma of molecules that are orally administered and, because of their difference in size, can either or not cross the epithelial layer without intestinal damage and increased permeability have been shown to have value. Examples are the ratio of concentrations of lactulose and mannitol (lactulose/mannitol ratio (LMR), Gilani et al., 2017) in plasma or fluorescein isothiocyanate-dextran (FITC-dextran) in serum (Gilani et al., 2018; Kuttappan et al., 2015), after oral delivery of these compounds to the animals, with increased LMR or FITC-dextran levels indicative of high intestinal permeability. Other biomarkers for gut health have been evaluated in serum, most of them being acute phase proteins (O'Reilly and Eckersall, 2014), but these are not specific for gut damage. In addition, all the blood markers need invasive sampling, what is not preferred as diagnostic test in poultry practice. While quite some markers have been identified using transcriptomic approaches on gut tissue (Hong et al., 2014), these are also not applicable in the field. There is thus clearly a need to find an intestinal and/or fecal biomarker for intestinal health of poultry that is present in fresh fecal droppings, litter or an intestinal content sample so that it is applicable in the field. In humans, calprotectin has been used to evaluate inflammation in case of severe gut diseases, and has been shown to be reliable and specific (Canani et al., 2008; Chang et al., 2014). However, for poultry such as chickens, no intestinal protein biomarkers for gut health are known.

DETAILED DESCRIPTION

Figure 1A:
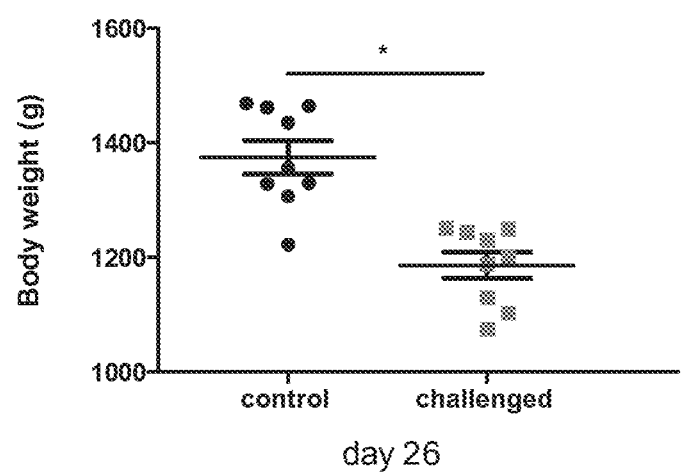
FIGS. 1A-1C: Mean body weight (g) (FIG. 1A), macroscopic gut appearance score (FIG. 1), and coccidiosis score (FIG. 1C) per pen for control and challenge on day 26. * denotes statistical significance at p<0.05 between control and challenged treatment.

The disclosure relates to a reliable, rapid and non-invasive biomarker test to diagnose gut health of poultry. With the term "poultry" is meant domesticated birds kept by humans for their eggs, their meat or their feathers. These birds are most typically members of the superorder Galloanserae, especially the order Galliformes, which includes chickens, quails and turkeys. The disclosure describes the identification of biomarkers that are indicative of intestinal pathology. The disclosure further describes a gut damage model in poultry wherein a set of intestinal and/or fecal biomarkers correlate with, for example, shortening of villi and $CD_3$ infiltration, the latter being markers for intestinal inflammation.

Hence, the disclosure relates, in the first instance, to a method to determine the intestinal health status of a domesticated bird comprising:
    Providing a fecal sample or an intestinal content sample obtained from the domesticated bird, and
    quantifying a protein, or a fragment thereof, in the fecal sample or intestinal content sample,
    wherein the protein is chosen from the group consisting of: myeloid protein 1, fibronectin, annexin A5, nucleophosmin, carbonic anhydrase 2, aminopeptidase Ey, transthyretin, ovoinhibitor, apolipoprotein A-1, hemoglobin subunit beta, superoxide dismutase [Cu—Zn], alpha-actinin-4, angiotensin-converting enzyme, WD repeat-containing protein 1, mitochondrial aspartate aminotransferase, histone H2A-IV, immunoglobulin lambda chain C region, immunoglobulin lambda chain V-1 region, cathepsin D and retinol-binding protein 4.

More specifically, the disclosure relates, in the first instance, to a method to determine the intestinal health status of a domesticated bird comprising:
    obtaining a fecal sample or an intestinal content sample of the domesticated bird, and
    quantifying a protein, or a fragment thereof, in the fecal or intestinal content sample,
    wherein the protein is chosen from the group consisting of: myeloid protein 1, fibronectin, annexin A5, nucleophosmin, carbonic anhydrase 2, aminopeptidase Ey, transthyretin, ovoinhibitor and apolipoprotein A-1.

The term "intestinal health status" relates, in the first instance, to the status of the gut wall structure and morphology that can be affected by, for example, infectious agents or a non-infectious cause such as a suboptimal formulated diet. The latter term thus mainly relates to epithelial damage and epithelial permeability, which is characterized by a shortening of villi, a lengthening of crypts and an infiltration of inflammatory cells. The latter damage and inflammation markers can also be associated with a "severe" macroscopic appearance of the gut, compared to a "normal" appearance, when evaluated using a scoring system such as the one described by Teirlynck et al. (2011).

The term "obtaining a fecal or intestinal content sample" refers to any means to collect of a fresh fecal dropping from the birds or intestinal content at necropsy of the birds. The term "intestinal content at necropsy of birds" means a sample taken from the content present in ileum or colon after the bird is euthanized.

The terms "quantifying a protein, or a fragment thereof, in the fecal or intestinal content sample" refers to any method known to a skilled person to quantify the proteins or fragments of in the sample. Non-limiting examples of the latter means are mass spectrometric methods (e.g., discovery and targeted proteomics, multiple reaction monitoring (MRM) assay, sequential window acquisition of all theoretical spectra assay (SWATH), . . . ), which require prior isolation of the proteins or fragments thereof from the sample. The latter isolation can be undertaken via protein extractions with different lysis buffers such as Sodium dodecyl sulfate (SDS)-based protein lysis buffer, Bacterial Protein extraction reagent (B-Per) or Urea-based lysis buffer with or without bead beating or other commonly used methods. Other non-limiting examples of means to quantify proteins or fragments thereof are ELISA and Western Blotting, which can be performed without prior protein isolation from the sample. Instead, the fecal or intestinal content sample can be diluted (10% m/v) in phosphate-buffered saline (PBS) or a 50 mM Tris, 150 mM NaCl (pH 7.2) buffer with or without bead beating prior to quantification.

It should be clear that the quantification of a single protein might be sufficient to determine the intestinal health status but that also a combination of 2, 3, 4, 5, 6, 7, 8, 9, 10, 11, 12, 13, 14, 15, 16, 17, 18, 19, 20 or more proteins can be used to determine the intestinal health status of the poultry.

The protein biomarkers of the disclosure, which are indicative of intestinal pathology in poultry, are the following:

1. Myeloid Protein 1

This protein has accession number P09840 in the UniProt database (see uniprot.org/uniprot/P08940). The protein is a granule protein present in secretory granules of heterophilic granulocytes.

This protein has the following amino acid sequence (i.e., SEQ IDNO:1; the gray boxes indicate peptides obtained via a trypsin digest of colon samples as is described further and represent non-limiting examples of protein fragments that can be quantified in a fecal or an intestinal content sample):

```
MPALSLIALLSLVSTAFARQWEVHPPQQQGRHWAQ

ICSGNPFNRIRGCDRYGCGNYGASRQGKGEKHKGV

DVICTDGSIVYAPFSGQLSGPIRFFHNGNAIDDGV

QISGSGYCVKLVCIHPIRYHGQIQKGQQLGRMLPM

QKVFPGIVSHIHVENCDQSDPTHLLRPIPDISPPF

PQQDAHWAVVCAGNPTNEIRGCDKYGCGYFGAPRR

NGKGEKHKGVDVICADGATVYAPFSGELSGPVKFF

HNGNAIDDGVQIRGSGFCVKLLCIHPIRYNGRISK

GQVLGRMLPMQRVFPGIISHIHVENCDRSDPTSNL

ERGKGESEMEV
```

2. Fibronectin

This protein has accession number P11722 in the UniProt database (see uniprot.org/uniprot/P11722). Fibronectin (Fn) is a high molecular weight glycoprotein that consists in a soluble form in plasma and in an insoluble form as extracellular matrix (ECM) component (Pankov and Yamada, 2002). It contributes to a variety of cellular activities including wound healing. Production of fibronectin is influenced by pro-inflammatory cytokines such as IL-1-alpha, TL-6 and TNF-alpha.

This protein has the following amino acid sequence (i.e., SEQ IDNO:2; the gray boxes indicate peptides obtained via a trypsin digest of colon samples as is described further and represent non-limiting examples of protein fragments that can be quantified in a fecal or an intestinal content sample):

```
PLDQCQDSETRTFYQIGDSWEKYVHGVRYQCYCYG

RGIGEWHCQPLQAYAPLSPPTNLRLEPNPDTGILI

VSWDRSTTPGISGYRVTTAPTNGQQGSTLEEVVGA

DQTSCTFENLNPGVEYNVSVYAVKDDQESIPISKT

ITQEVPQLTDLSFVDITDSSIGLRWTPLNASTIIG

YRITVVAAGESVPIFEDFVDSSVGYYTVTGLEPGI

DYDISVITLINGGESAPTTLTQQTAVPPPTDLRFT

NVGPDTMRVTWTAPTSIVLSSFLVRYSPVKKEEDV

AELTISPSDNVVVLTNLLPGTEYLVRVYSVAEQHE

SAPLSGIQKTGLDSPTGLDFSDITANSFTVHWIAP

RATITGYKIRHHPEHGVGRPKEDRVPPSRNSITLT

NLLPGTEYVVSIIAVNGREESVPLVGQQTTVSDVP

RDLEVNPTSPTSLE1SWDAPAVTVRYYRITYGETG

GSSPVQEFTVPGTMSRATITGLKPGVDYTITVYAV

TGRGDSPASSKPVTVTYKTEIDTPSQMQVTDVQDN

SISIRWLPSSSPVTGYRVTAVPKKGHGPTKTKNVP

PDQTQVTIEGLQPTVEYMVSVYAQNQNGESLPLVE

TAVTNIDRPKGLTFTEVDVDSIKIAWESPQGQVTR

YRVTYSSPEDGIHELLPAPGGEEDTAELHGLRPGS

EYTINIVAIYDDMESLPLTGTQSTAIPPPTNLKFT

QVTPTSLTVNWNAPNVRLTGYRVRVNPKEKTGPMK

EINLSPDSTSAVVSGLMVATKYEVSVYALKDSLTS

RPAQGVVTTLENVSPPRRARVTDATETTITITWRT

KTETITGFQIDAIPAASGQNPIQRTISPDVRTYTI

TGLQPGNDYKIYLYTLNENARSSPVVIDASTAIDA

PSNLRFLTTTTNSLLASWQPPRAKITGYIIRYDKP

GSPAKELLPRPRPGTTEATITGLEPGTEYTIYIIA

VKNNQKSEPLVGRKRTDDLPTLITGPHPNQPDMLD

VPSVDEGTPYLTNNRYDNGNGIQLPGTSGHPQTIG

HQGQQVFFEEHGYRRPVPTTATPLRPGSRRQPPNV

DEAIEIPGYQVPIIVVPSYPHSREPRRNDTTGQEA

LSQTTISWRPLLESTEYIISCQPVSQDEDTLQFRV

PGTSSSATLTGLTRGATYNIIVEALKDHRRQKVLE

EVVTVGNTVSEGLNQPADDTCYDTYTGSFYSIGEE

WERLSETGFKLWCQCLGFGSGHFRCDSSKWCHDNG

VNYKIGEKWDRQGENGQMIDCTCLGNGKGEF
```

3. Annexin A5

This protein has accession number P17153 in the UniProt database (see uniprot.org/uniprot/P17153). This protein is an anticoagulant protein that acts as an indirect inhibitor of the thromboplastin-specific complex, which is involved in the blood coagulation cascade.

This protein has the following amino acid sequence (i.e., SEQ IDNO:3; the gray boxes indicate peptides obtained via a trypsin digest of colon samples as is described further and represent non-limiting examples of protein fragments that can be quantified in a fecal or an intestinal content sample):

```
MAKYTRGTVTAFSPFDARADAEALRKAMKGMGTDE

ETILKILTSRNNAQRQEIASAFKTLFGRDLVDDLK

SELTGKFETLMVSLMRPARIFDAHALKHAIKGAGT

NEKVLTEILASRTPAEVQNIKQVYMQEYEANLEDK

ITGETSGHFQRLLVVLLQANRDPDGRVDEALVEKD

AQVLFRAGELKWGTDEETFITILGTRSVSHLRRVF

DKYMTISGFQIEETIDRETSGDLEKLLLAVVKCIR

SVPAYFAETLYYSMKGAGTDDDTLIRVMVSRSEID

LLDIRHEFRKNFAKSLYQMIQKDTSGDYRKALLLL

CGGDDE
```

4. Nucleophosmin

This protein has accession number P16039 in the UniProt database (see uniprot.org/uniprot/P16039). Nucleophosmin is a DNA binding nuclear protein that has been described as a wound-associated protein (Mellgren, 2010).

This protein has the following amino acid sequence (i.e., SEQ IDNO:4; the gray boxes indicate peptides obtained via a trypsin digest of colon samples as is described further and represent non-limiting examples of protein fragments that can be quantified in a fecal or an intestinal content sample):

```
MEDSAMDMESMGPLRPQTFLFGCELKAEKEYQFKV

DDEENEHQLSLRTVTLGAGAKDELHVVEAEALDYE

GNPTKVVLASLKMSVQPTVSLGGFEITPPFVLRLK

CGSGPVYVSGQHLVALEEEPESEDEEEDTKIGNAS

TKRPASGGGAKTPQKKPKLSEDDEDDDEDEDDDED

DEDDLDDDEEEIKTPMKKPAREPAGKNMQKAKQNG

KDSKPSTPASKTKTPDSKKDKSLTPKTPKVPLSLE

EIKAKMQASVDKGCSLPKLEPKFANYVKNCFRTED

QKVIQALWQWRQTL
```

5. Carbonic Anhydrase 2

This protein has accession number P07630 in the UniProt database (see uniprot.org/uniprot/P07630). This enzyme causes the rapid interconversion of carbon dioxide and water to bicarbonate and protons (or vice versa), a reaction that is important for acid/base equilibrium. The enzyme is a marker for differentiation in epithelial cells.

This protein has the following amino acid sequence (i.e., SEQ IDNO:5; the gray boxes indicate peptides obtained via a trypsin digest of colon samples as is described further and represent non-limiting examples of protein fragments that can be quantified in a fecal or an intestinal content sample):

```
MSHHWGYDSHNGPAHWHEHFPIANGERQSPIAIST
KAARYDPALKPLSFSYDAGTAKAIVNNGHSFNVEF
DDSSDKSVLQGGALDGVYRLVQFHIHWGSCEGQGS
EHTVDGVKYDAELHIVHWNVKYGKFAEALKHPDGL
AVVGIFMKVGNAKPEIQKVVDALNSIQTKGKQASF
TNFDPTGLLPPCRDYWTYPGSLTTPPLHECVIWHV
LKEPITVSSEQMCKLRGLCFSAENEPVCRMVDNWR
PCQPLKSREVRASFQ
```

6. Aminopeptidase Ey

This protein has accession number O57579 in the UniProt database (see uniprot.org/uniprot/O57579). Aminopeptidase Ey (EC 3.4.11.20) from chicken (*Gallus gallus domesticus*) egg yolk is a homodimeric exopeptidase with a broad specificity for N-terminal amino acid residues at P1 position of the substrate (Midorikawa et al. 1998). Aminopeptidases are members of a membrane-bound metallopeptidase family that are expressed at a high level on the brush-border membrane of enterocytes (Gal-Garber and Uni, 2000).

This protein has the following amino acid sequence (i.e. SEQ IDNO:6; the gray boxes indicate peptides obtained via a trypsin digest of colon samples as is described further and represent non-limiting examples of protein fragments that can be quantified in a fecal or an intestinal content sample):

```
MAAGFFISKSVGIVLALGAVATIIALSVVYAQ
EKNKSSGGSGGSDTTSTTTASTTTTSTTTASTTAA
PNNPWNRWRLPTALKPESYEVTLQPFLTPDDNNMY
IFKGNSSVVFLCEEATDLILIHSNKLNYTLQGGFH
ASLHAVNGSTPPTISNTWLETNTQYLVLQLAGPLQ
QGQHYRLFSIFTGELADDLAGFYRSEYTEGNVTKV
VATTQMQAPDARKAFPCFDEPAMKAVFTVTMIHPS
DHTAISNMPVHSTYQLQMDGQSWNVTQFDPTPRMS
TYLLAFIVSQFDYVENNTGKVQIRIWGRPAAIAEG
QGEYALEKTGPILSFFERHYNTAYPLPKSDQVGLP
DFNAGAMENWGLVTYRENSLLYDNAYSSIGNKERV
VTVIAHELAHQWFGNLVTLRWWNDLWLNEGFASYV
EYLGADSAEPTWDIKDLMVLNELYTVMATDALTTS
HPLTFREDEINTPAQISEVFDSIAYSKGASVLRML
SDFLTEDVFKEGLQSYLHDFSYNNTVYTDLWDHLQ
EAVNKNSVPLPDSIGAIMDRWTLQMGFPVVTVNTL
TGSVQQSHFLLDSNSTVERPSVFNYTWIVPITWMT
PSRTGDRYWLVDVSATNSDFSVGSSTWLLLNLNVS
GYFRVNYNQENWDQLLQQLSNNHQAIPVINRAQII
DDAFNLARAQQVSVTLALNTTRFLSGETAYMPWQA
ALNNLQYFQLMFDRSEVFGAMTKYIQKQVTPLFEY
YRTATNNWTAIPSALMDQYNEINAISTACSYGIAE
CQQLATALYQQWRQNVSNNPIAPNLRSAIYCSAVA
TGGEEVWDFIWERFLEAPVVSEADKLRTALTCSTE
TWILQRYLQYTIDPTKIRKQDATSTINSIASNVVG
QPLAWDFIRSNWRTLFGQYGGGSFSFSRLISAVTQ
RFNTEFELKQLEQFKADNQDIGFGSGTRALEQALE
RTRTNINWVKENKEVVHAWFRAETASS
```

7. Transthyretin

This protein has accession number P27731 in the UniProt database (see uniprot.org/uniprot/P27731). Plasma transthyretin (TTR) is a plasma protein secreted by the liver that circulates bound to retinol-binding protein 4 (RBP4) and its retinol ligand. TTR is a highly conserved protein in animal species.

This protein has the following amino acid sequence (i.e., SEQ IDNO:7; the gray boxes indicate peptides obtained via a trypsin digest of colon samples as is described further and represent non-limiting examples of protein fragments that can be quantified in a fecal or an intestinal content sample):

```
MAFHSTLLVFLAGLVFLSEAAPLVSHGSVDSKCPL
MVKVLDAVRGSPAANVAVKVFKKAADGTWQDFATG
KTTEFGEIHELTTEEQFVEGVYRVEFDTSSYWKGL
GLSPFHEYADVVFTANDSGHRHYTIAALLSPFSYS
TTAVVSDPQE
```

The following gray boxes indicate peptides obtained via a trypsin digest of ileal samples of SEQ IDNO:7 as is described further and represent non-limiting examples of protein fragments that can be quantified in a fecal or an intestinal content sample:

```
MAFHSTLLVFLAGLVFLSEAAPLVSHGSVDSKCPL
MVKVLDAVRGSPAANVAVKFKKAADGTWQDFATGK
TTEFGEIHELTTEEQFVEGVYRVEFDTSSYWKGLG
LSPFHEYADVVFTANDSGHRHYTIAALLSPFSYST
TAVVSDPQE
```

8. Ovoinhibitor

This protein has accession number P10184 in the UniProt database (see uniprot.org/uniprot/P10184). Ovoinhibitor is found in egg white and is a serine proteinase inhibitor that can reduce enzymatic digestion by trypsin and chymotrypsin.

This protein has the following amino acid sequence (i.e., SEQ IDNO:8; the gray boxes indicate peptides obtained via a trypsin digest of colon samples as is described further and represent non-limiting examples of protein fragments that can be quantified in a fecal or an intestinal content sample):

```
MRTARQFVQVALALCCFADIAFGIEVNCSLYASGI

GKDGTSWVACPRNLKPVCGTDGSTYSNECGICLYN

REHGANVEKEYDGECRPKHVMIDCSPYLQVVRDGN

TMVACPRILKPVCGSDSFTYDNECGICAYNAEHHT

NISKLHDGECKLEIGSVDCSKYPSTVSKDGRTLVA

CPRILSPVCGTDGFTYDNECGICAHNAEQRTHVSK

KHDGKCRQEIPEIDCDQYPTRKTTGGKLLVRCPRI

LLPVCGTDGFTYDNECGICAHNAQHGTEVKKSHDG

RCKERSTPLDCTQYLSNTQNGEAITACPFILQEVC

GTDGVTYSNDCSLCAHNIELGTSVAKKHDGRCREE

VPELDCSKYKTSTLKDGRQVVACTMIYDPVCATNG

VTYASECTLCAHNLEQRTNLGKRKNGRCEEDITKE

HCREFQKVSPICTMEYVPHCGSDGVTYSNRCFFCN

AYVQSNRTLNLVSMAAC
```

9. Apolipoprotein A-1

This protein has accession number P08250 in the UniProt database (see uniprot.org/uniprot/P08250). Apolipoprotein (apo) A-1 is a 28 kDa exchangeable apolipoprotein that plays a key role in lipoprotein metabolism.

This protein has the following amino acid sequence (i.e., SEQ IDNO:9; the gray boxes indicate peptides obtained via a trypsin digest of colon samples as is described further and represent non-limiting examples of protein fragments that can be quantified in a fecal or an intestinal content sample):

```
MRGVLVTLAVLFLTGTQARSFWQHDEPQTPLDRIR

DMVDVYLETVKASGKDAIAQFESSAVGKQLDLKLA

DNLDTLSAAAAKLREDMAPYYKEVREMWLKDTEAL

RAELTKDLEEVKEKIRPFLDQFSAKWTEELEQYRQ

RLTPVAQELKELTKQKVELMQAKLTPVAEEARDRL

RGHVEELRKNLAPYSDELRQKLSQKLEEIREKGIP

QASEYQAKVMEQLSNLREKMTPLVQEFRERLTPYA

ENLKNRLISFLDELQKSVA
```

The following gray boxes indicate peptides obtained via a trypsin digest of ileal samples of SEQ IDNO:9 as is described further and represent non-limiting examples of protein fragments that can be quantified in a fecal or an intestinal content sample:

```
MRGVLVTLAVLFLTGTQARSFWQHDEPQTPLDRIR

DMVDVYLETVKASGKDAIAQFESSAVGKQLDLKLA

DNLDTLSAAAAKLREDMAPYYKEVREMWLKDTEAL

RAELTKDLEEVKEKIRPFLDQFSAKWTEELEQYRQ

RLTPVAQELKELTKQKVELMQAKLTPVAEEARDRL

RGHVEELRKNLAPYSDELRQKLSQKLEEIREKGIP

QASEYQAKVMEQLSNLREKMTPLVQEFRERLTPYA

ENLKNRLISFLDELQKSVA
```

10. Hemoglobin Subunit Beta

This protein has accession number P02112 in the UniProt database (see uniprot.org/uniprot/P02112). The detection of hemoglobin subunit beta (HBB) in intestinal content indicates that the administered challenges induce gut leakage and endothelial damage allowing red blood cell leakage from the blood to the lumen.

This protein has the following amino acid sequence (i.e., SEQ IDNO:131; the gray boxes indicate peptides obtained via a trypsin digest of colon samples as is described further and represent non-limiting examples of protein fragments that can be quantified in a fecal or an intestinal content sample):

```
MVHWTAEEKQLITGLWGKVNVAECGAEALARLLIV

YPWTQRFFASFGNLSSPTAILGNPMVRAHGKKVLT

SFGDAVKNLDNIKNTFSQLSELHCDKLHVDPENFR

LLGDILIIVLAAHFSKDFTPECQAAWQKLVRVVAH

ALARKYH
```

11. Superoxide Dismutase

This protein has accession number P80566 in the UniProt database (see uniprot.org/uniprot/P80566). Superoxide dismutase (SOD) catalyzes the dismutation of superoxide radicals to hydrogen peroxide ($H_2O_2$) and oxygen and contributes to enhanced small intestinal preservation in feline (Sun et al., 1991).

This protein has the following amino acid sequence (i.e., SEQ IDNO:132; the gray boxes indicate peptides obtained via a trypsin digest of colon samples as is described further and represent non-limiting examples of protein fragments that can be quantified in a fecal or an intestinal content sample):

```
MATLKAVCVMKGDAPVEGVIHFQQQGSGPVKVTGK

ITGLSDGDHGFHVHEFGDNTNGCTSAGAHFNPEGK

QHGGPKDADRHVGDLGNVTAKGGVAEVEIEDSVIS

LTGPHCIIGRTMVVHAKSDDLGRGGDNESKLTGNA

GPRLACGVIGIAKC
```

The following gray boxes indicate peptides obtained via a trypsin digest of ileal samples of SEQ IDNO:132 as is described further and represent non-limiting examples of protein fragments that can be quantified in a fecal or an intestinal content sample:

```
MATLKAVCVMKGDAPVEGVIHFQQQGSGPVKVTGK

ITGLSDGDHGFHVHEFGDNTNGCTSAGAHFNPEGK
```

-continued

```
QHGGPKDADRHVGDLGNVTAKGGVAEVEIEDSVIS

LTGPHCIIGRTMVVHAKSDDLGRGGDNESKLTGNA

GPRLACGVIGIAKC
```

12. Alpha-Actinin-4

This protein has accession number Q90734 in the UniProt database (see uniprot.org/uniprot/Q90734). By indirect immunofluorescence, alpha-actinin-4 (ACTN4) was shown to be localized in the apical part of chicken intestinal epithelial cells (Craig and Pardo, 1979), more specifically as a component of the tight junction (zonula occludens) (Chen et al., 2006) and/or belt desmosome (zonula adherens) (Milanini et al., 2017).

This protein has the following amino acid sequence (i.e., SEQ IDNO:133; the gray boxes indicate peptides obtained via a trypsin digest of colon samples as is described further and represent non-limiting examples of protein fragments that can be quantified in a fecal or an intestinal content sample):

```
MVDYHSAGQPYPYGGNGPGPNGDYMAQEDDWDRDL

LLDPAWEKQQRKTFTAWCNSHLRKAGTQIENIDED

FRDGLKLMLLLEVISGERLPKPERGKMRVHKINNV

NKALDFIASKGVNVVSIGAEEIVDGNAKMTLGMIW

TIILRFAIQDISVEETSAKEGLLLWCQRKTAPYKN

VNVQNFHISWKDGLAFNALIHRHRPELIEYDKLRK

DDPVTNLNNAFEVAEKYLDIPKMLDAEDIVNTARP

DEKAIMTYVSSFYHAFSGAQKAETAANRICKVLAV

NQENEHLMEDYEKLASDLLEWIRRTIPWLEDRSPQ

KTIQEMQQKLEDFRDYRRVHKPPKVQEKCQLEINF

NTLQTKLRLSNRPAFMPSEGRMVSDINTGWQHLEQ

AEKGYEEWLLNEIRRLEPLDHLAEKFRQKASIHEA

WTEGKEAMLKQKDYETATLSDIKALIRKHEAFESD

LAAHQDRVEQIAAIAQELNELDYYDSPSVNARCQK

ICDQWDVLGSLTHSRREALEKTEKQLETIDELHLE

YAKRAAPFNNWMESAMEDLQDMFIVHTIEEIEGLI

AAHDQFKATLPDADREREAILGIQREAQRIADLHS

IKLSGNNPYTSVTPQVINSKWERVQQLVPTRDRAL

QDEQSRQQCNERLRRQFAGQANIVGPWMQTKMEEI

GRISIEMHGTLEDQLQHLKHYEQSIVDYKPNLELL

EHEHQLVEEALIFDNKHTNYTMEHIRVGWEQLLTT

IARTINEVENQILTRDAKGISQEQMQEFRASFNHF

DKDHCGALGPEEFKACLISLGYDVENDRQGDAEFN

RIMSLVDPNGSGSVTFQAFIDFMSRETTDTDTADQ

VIASFKVLAGDKNYITAEELRRELPPEQAEYCIAR

MAPYRGPDAAPGALDYKSFSTALYGESDL
```

13. Angiotensin-Converting Enzyme

This protein has accession number Q10751 in the UniProt database (see uniprot.org/uniprot/Q10751). Angiotensin-converting enzyme (ACE) are localized in the intestinal brush border membrane and are involved as major functional enzymes in the final stadium of protein digestion in the small intestine (Yoshioka et al., 1987).

This protein has the following amino acid sequence (i.e., SEQ IDNO:134; the gray boxes indicate peptides obtained via a trypsin digest of ileal samples as is described further and represent non-limiting examples of protein fragments that can be quantified in a fecal or an intestinal content sample):

```
AKELYGNIWSNFSDPQLKKIIGSIQTLGPSNLPLD

KRQQYNTILSDMDKIYSTAKVCLDNGTCWDLEPDI

SDIMATSRSYKKLLYAWEGWHNAAGNPLRAKYQEF

VTLSNEAYQMDGFEDTGSYWRSWYDSTTFEDDLEH

LYNQLEPLYLNLHAFVRRKLYDRYGPKYINLKGPI

PAHLLGNMWAQQWNNIYDLMVPYPDKPNLDVTNTM

VNQGWNATHMFRVSEEFFTSLGLLEMPPEFWEKSM

LEKPADGREVVCHASAWDFYNRKDFRIKQCTTVTM

EQLFTVHHEMGHVQYYLQYKDQPVSFRGGANPGFH

EAIGDVLSLSVSTPSHLQKIGLLSSAVEDEESNIN

YLLKMALEKIAFLPFGYLIDQWRWNVFSGRTPPSR

YNYDWWYLRTKYQGICAPVSRNESNFDPGAKYHIP

GNTPYIRYFVSFILQFQFHKALCQAANHTGPLHTC

DIYMSKEAGAKLREVLKAGSSKSWQEILFNLTGTD

KMDAGALLEYFSPVTTWLQEQNNKTNEVLGWPEFD

WRSPIPEGYPEGIDKIVDEAQAKEFLSEYNSTAEV

VWNAYTEASWEYNTNITDHNKEVMLEKNLAMSKHT

IEYGMRARQFDPSDFQDETVTRILNKLSVLERAAL

PEDELKEYNTLLSDMETTYSVAKVCRENNTFHPLD

PDLTDILATSRDYNELLFAWKGWWDASGAKIKDKY

KRYVELSNKAAVLNGYTDNGAYWRSLYETPTFEED

LERLYLQLQPLYLNLHAYVRRALYNKYGAEHISLK

GPIPAHLLGNMWAQSWSNIFDLVMPFPDATKVDAT

PAMKQQGWTPKMMFEESDRFFTSLGLIPMPQEFWD

KSMIEKPADGREVVCHASAWDFYNRKDFRIKQCTV

VNMDDLITVHHEMGHVQYFLQYMDQPISFRDGANP

GFHEAIGDVMALSVSTPKHLHSINLLDQVTENEES

DINYLMSIALDKIAFLPFGYLMDQWRWKVFDGRIK

EDEYNQQWWNLRLKYQGLCPPVPRSEDDFDPGAKF

HIPANVPYIRYFVSFVIQFQFHQALCKAAGHTGPL

HTCDIYQSKEAGKLLGDAMKLGFSKPWPEAMQLIT

GQPNMSAEALMSYFEPLMTWLVKKNTENGEVLGWP
```

```
EYSWTPYAVTEFHAATDTADFLGMSVGTKQATAGA

WVLLALALVFLITSIFLGVKLFSSRRKAFKSSSEM

ELK
```

14. WD Repeat-Containing Protein 1

This protein has accession number O93277 in the UniProt database (see uniprot.org/uniprot/O93277). WD (tryptophan-aspartate) repeat-containing protein 1 (WDR1), also called actin-interacting protein 1 (AIP1), acts as a cofactor of ADF-cofilin and facilitates actin turnover by disassembly of actin filaments (Fujibuchi et al., 2004).

This protein has the following amino acid sequence (i.e., SEQ IDNO:135; the gray boxes indicate peptides obtained via a trypsin digest of ileal samples as is described further and represent non-limiting examples of protein fragments that can be quantified in a fecal or an intestinal content sample):

```
MRMPYEIKKVFASLPQVERGVSKIIGGDPKGNNFL

YTNGKCVVIRNIDNPAIADIYTEHAHQVVVAKYAP

SGFYIASGDVSGKLRIWDTTQKEHLLKYEYQPFAG

KIKDLAWTEDSKRIAVVGEGREKFGAVFLWDSGSS

VGEITGHNKVINSVDIKQTRPYRLATGSDDNCAAF

FEGPPFKFKFTLSDHTRFVNCVRFSPDGNRFATAS

ADGQIFIYDGKTGEKVCALGGGKAHDGGIYAISWS

PDSSQLLSASGDKTAKIWDVGANSVVSTFNMGSNV

LDQQLGCLWQKDHLLSLSLSGYINYLDKNNPDKPL

RVIKGHSKSIQCLTVHKNGGKSYIYSGSNDGHINY

WDSDTGENDGFSGKGHTNQVSRMAVDEMDQLVTCS

MDDTVRYTNLSKRDYSGQDAVKMDVQPKCLAVGPG

GYTVVLCIGQIVLMKDKKKCFAIDDLGYEPEAVAV

HPGGGSVAVGGTDGNVRLYSIQGTSLKSDDKTLEA

KGPVTDLAYSHDGAFLAVCDANKVVTVFSVPDGYV

EHNVFYGHHAKVVCIAWSPDNEHFASGGMDMMVYV

WTVSDPETRIKIPDAHRLHHVSGLAWLDEHTLVTT

SHDASVKEWSISYN
```

15. Aspartate Aminotransferase, Mitochondrial

This protein has accession number P00508 in the UniProt database (see uniprot.org/uniprot/P00508). Aspartate aminotransferase, mitochondrial (AATM), formerly known as glutamic-oxaloacetic transaminase, catalyzes the reaction of L-aspartate and 2-oxoglutatarate to oxaloacetate and glutamate. This mitochondrial isotype is present predominantly in liver (Kaneko et al., 2008).

This protein has the following amino acid sequence (i.e., SEQ IDNO:136; the gray boxes indicate peptides obtained via a trypsin digest of ileal samples as is described further and represent non-limiting examples of protein fragments that can be quantified in a fecal or an intestinal content sample):

```
MALLQSRLLLSAPRRAAATARASSWWSHVEMGPPD

PILGVTEAFKRDTNSKKMNLGVGAYRDDNGKSYVL

NCVRKAEAMIAAKKMDKEYLPIAGLADFTRASAEL

ALGENSEAFKSGRYVTVQGISGTGSLRVGANFLQR

FFKFSRDVYLPKPSWGNHTPIFRDAGLQLQAYRYY

DPKTCSLDFTGAMEDISKIPEKSIILLHACAHNPT

GVDPRQEQWKELASVVKKRNLLAYFDMAYQGFASG

DINRDAWALRHFIEQGIDVVLSQSYAKNMGLYGER

AGAFTVICRDAEEAKRVESQLKILIRPMYSNPPMN

GARIASLILNTPELRKEWLVEVKGMADRIISMRTQ

LVSNLKKEGSSHNWQHITDQIGMFCFTGLKPEQVE

RLTKEFSIYMTKDGRISVAGVASSNVGYLAHAIHQ

VTK
```

16. Histone H2A-IV

This protein has accession number P02263 in the UniProt database (see uniprot.org/uniprot/P02263). H2A4 is a core component of nucleosomes that wrap and compact DNA into chromatin.

This protein has the following amino acid sequence (i.e., SEQ IDNO:137; the gray boxes indicate peptides obtained via a trypsin digest of ileal samples as is described further and represent non-limiting examples of protein fragments that can be quantified in a fecal or an intestinal content sample):

```
MSGRGKQGGKARAKAKSRSSRAGLQFPVGRVHRLL

RKGNYAERVGAGAPVYLAAVLEYLTAEILELAGNA

ARDNKKTRIIPRHLQLAIRNDEELNKLLGKVTIAQ

GGVLPNIQAVLLPKKTDSHKAKAK
```

17. Ig Lambda Chain C Region

This protein has accession number P20763 in the UniProt database (see uniprot.org/uniprot/P20763). Antibodies consist of two heavy and light chains whereby birds only have one isotope of light chain, namely lambda (λ). The light chain is made up by a constant, Ig lambda chain C-region (LAC), and a variable region, Ig lambda chain V1-region (LV1) (Benčina et al., 2014).

This protein has the following amino acid sequence (i.e., SEQ IDNO:138; the gray boxes indicate peptides obtained via a trypsin digest of ileal samples as is described further and represent non-limiting examples of protein fragments that can be quantified in a fecal or an intestinal content sample):

```
QPKVAPTITLFPPSKEELNEATKATLVCLINDFYP

SPVTVDWVIDGSTRSGETTAPQRQSNSQYMASSYL

SLSASDWSSHETYTCRVTHNGTSITKTLKRSEC
```

18. Ig Lambda Chain V1 Region

This protein has accession number P04210 in the UniProt database (see uniprot.org/uniprot/P04210). Antibodies consist of two heavy and light chains whereby birds only have one isotope of light chain, namely lambda (λ). The light chain is made up by a constant, Ig lambda chain C-region (LAC), and a variable region, Ig lambda chain V1-region (LV1) (Benčina et al., 2014).

This protein has the following amino acid sequence (i.e., SEQ IDNO:139; the gray boxes indicate peptides obtained via a trypsin digest of ileal samples as is described further and represent non-limiting examples of protein fragments that can be quantified in a fecal or an intestinal content sample):

```
MAWAPLLLAVLAHTSGSLVQAALTQPSSVSANPGE
TVKITCSGDRSYYGWYQQKAPGSAPVTLIYDNTNR
PSNIPSRFSGSKSGSTATLTITGVQADDEAVYYCG
SADSSSTA
```

19. Cathepsin D

This protein has accession number Q05744 in the UniProt database (see uniprot.org/uniprot/Q05744). Cathepsin D (CATD), an aspartic proteinase, is optimally active against denatured proteins at acidic pH. CATD is expressed in lysozomes, but also exists bound to some intracellular membranes, which has been detected in several different cell types (Fusek and Vetvicka, 1995).

This protein has the following amino acid sequence (i.e., SEQ IDNO:140; the gray boxes indicate peptides obtained via a trypsin digest of ileal samples as is described further and represent non-limiting examples of protein fragments that can be quantified in a fecal or an intestinal content sample):

```
MAPRGLLVLLLLALVGPCAALIRIPLTKFTSTRRM
LTEVGSEIPDMNAITQFLKFKLGFADLAEPTPEIL
KNYMDAQYYGEIGIGTPPQKFTVVFDTGSSNLWVP
SVHCHLLDIACLLHHKYDASKSSTYVENGTEFAIH
YGTGSLSGFLSQDTVTLGNLKIKNQIFGEAVKQPG
ITFIAAKFDGILGMAFPRISVDKVTPFFDNVMQQK
LIEKNIFSFYLNRDPTAQPGGELLLGGTDPKYYSG
DFSWVNVTRKAYWQVHMDSVDVANGLTLCKGGCEA
IVDTGTSLITGPTKEVKELQTAIGAKPLIKGQYVI
SCDKISSLPVVTLMLGGKPYQLTGEQYVFKVSAQG
ETICLSGFSGLDVPPPGGPLWILGDVFIGPYYTVF
DRDNDSVGFAKCV
```

20. Retinol-Binding Protein 4

This protein has accession number P41263 in the UniProt database (see uniprot.org/uniprot/P41263). Transthyretin (TTR) is a highly conserved protein in animal species that is involved in transport of thyroid hormones and retinol bound to retinol-binding protein 4 (RET4) in the bloodstream (Ingenbleek & Bernstein, 2015). Retinol (vitamin A) is known to be essential for differentiation and proliferation of epithelial cells (Thomas et al., 2004).

This protein has the following amino acid sequence (i.e., SEQ IDNO:141; the gray boxes indicate peptides obtained via a trypsin digest of ileal samples as is described further and represent non-limiting examples of protein fragments that can be quantified in a fecal or an intestinal content sample):

```
MAYTWRALLLLALAFLGSSMAERDCRVSSFKVKEN
FDKNRYSGTWYAMAKKDPEGLFLQDNVVAQFTVDE
NGQMSATAKGRVRLFNNWDVCADMIGSFTDTEDPA
KFKMKYWGVASFLQKGNDDHWVVDTDYDTYALHYS
CRELNEDGTCADSYSFVFSRDPKGLPPEAQKIVRQ
RQIDLCLDRKYRVIVHNGFCS
```

The disclosure further relates to a method as described above wherein an increased level of a protein chosen from the group consisting of myeloid protein 1, fibronectin, annexin A5, nucleophosmin, carbonic anhydrase 2, transthyretin, ovoinhibitor, apolipoprotein A-1, hemoglobin subunit beta, alpha-actinin-4, histone H2A-IV and retinol-binding protein 4 present in the fecal or intestinal content sample, when compared to the level found in fecal and/or intestinal content samples of healthy control animals, is an indicator of poor intestinal health. The terms "increased levels of protein compared to the level found in healthy control animals" means at least a two-fold increase such as a 2-fold, 2.5-fold, 3-fold, 3.5-fold, 4-fold, 4.5-fold . . . increase compared to the level found in healthy control animals.

The disclosure further relates to a method as described above wherein a decreased level of the protein aminopeptidase Ey, superoxide dismutase [Cu—Zn], angiotensin-converting enzyme, WD repeat-containing protein 1, mitochondrial aspartate aminotransferase, immunoglobulin lambda chain C region, immunoglobulin lambda chain V-1 region and cathepsin D present in the fecal or an intestinal content sample, when compared to the level found in fecal and/or an intestinal content samples of healthy control animals, is an indicator of poor intestinal health. The terms "decreased levels of protein compared to the level found in healthy control animals" means at least a two-fold decrease such as a 2-fold, 2.5-fold, 3-fold, 3.5-fold, 4-fold, 4.5-fold . . . decrease compared to the level found in healthy control animals.

The disclosure thus relates to a method as described above wherein the protein abundance is significantly differential between healthy and challenged group and/or level of protein correlates with the intestinal health as determined by measuring villus length in the duodenum of the birds, and/or, by measuring villus-to-crypt ratio in the duodenum of the birds, and/or by measuring T-lymphocyte infiltration is the villi, and/or, by scoring the macroscopic gut appearance of the birds. It is clear that the intestinal health is a measure for/correlates with performance parameters of the birds such as body weight and feed conversion ratio.

The disclosure further relates to a method as described above wherein the intestinal content sample is a colonic content sample and wherein the protein is chosen from the group consisting of: myeloid protein 1, fibronectin, annexin A5, nucleophosmin, carbonic anhydrase 2, aminopeptidase Ey, transthyretin, ovoinhibitor, apolipoprotein A-1, hemoglobin subunit beta, superoxide dismutase [Cu—Zn] and alpha-actinin-4.

The disclosure further relates to a method as described above wherein the intestinal content sample is an ileal content sample and wherein the protein is chosen from the group consisting of: aminopeptidase Ey, transthyretin, apolipoprotein A-1, superoxide dismutase [Cu—Zn], angiotensin-converting enzyme, WD repeat-containing protein 1, mitochondrial aspartate aminotransferase, histone H2A-IV, immunoglobulin lambda chain C region, immunoglobulin lambda chain V-1 region, cathepsin D and retinol-binding protein 4.

More specifically, the disclosure relates to a method as described above wherein the fragment of myeloid protein 1 comprises at least one of the following amino acid sequences: APFSGELSGPVK (SEQ IDNO:10), APFSGQLSGPIR (SEQ IDNO:11), FSGELSGPVK (SEQ IDNO:12), HGQIQK (SEQ IDNO:13), SDPTSNLER (SEQ IDNO:14), SGELSGPVK (SEQ IDNO:15), SGQLSGPIR (SEQ IDNO:16), VFPGIISHI (SEQ IDNO:17), VFPGIVSH (SEQ IDNO:18), VFPGIVSHI (SEQ IDNO:19); wherein the fragment of fibronectin comprises at least one of the following amino acid sequences: ATITGYK (SEQ IDNO:20), DDQESIPISK (SEQ IDNO:21); wherein the fragment of annexin A5 comprises at least one of the following amino acid sequences: KAMKGMGTDEETILK (SEQ IDNO:22), LLLAVVK (SEQ IDNO:23), VDEALVEK (SEQ IDNO:24); wherein the fragment of nucleophosmin comprises at least one of the following amino acid sequences: IGNASTK (SEQ IDNO:25), TPDSK (SEQ IDNO:26), TVTLGAGAK (SEQ IDNO:27), VVLASLK (SEQ IDNO:28); wherein the fragment of carbonic anhydrase 2 comprises at least one of the following amino acid sequences: VGNAKPEIQK (SEQ IDNO:29), VVDALNSIQTK (SEQ IDNO:30); wherein the fragment of aminopeptidase Ey comprises at least one of the following amino acid sequences: ADNQDIGFGSGTR (SEQ IDNO:31), AIAEGQGEYALEK (SEQ IDNO:32), APVVSEADK (SEQ IDNO:33), AQIIDDAFNLAR (SEQ IDNO:34), AVFTVTMIHPS (SEQ IDNO:35), AWDFIR (SEQ IDNO:36), DFIWER (SEQ IDNO:37), DFLTEDVFK (SEQ IDNO:38), DHLQEAVNK (SEQ IDNO:39), DLWDHLQEAVNK (SEQ IDNO:40), DNAYSSIGNK (SEQ IDNO:41), EAPVVSEADK (SEQ IDNO:42), EGQGEYALEK (SEQ IDNO:43), ENSLLYDNAYSSIGNK (SEQ IDNO:44), EQALER (SEQ IDNO:45), FLEAPVVSEADK (SEQ IDNO:46), FLEAPVVSEADKLR (SEQ IDNO:47), FNTEFELK (SEQ IDNO:48), GADSAETWDIK (SEQ IDNO:49), HYNTAYPLPK (SEQ IDNO:50), IAEGQGEYALEK (SEQ IDNO:51), ILSFFER (SEQ IDNO:52), IWGRPAAIAE (SEQ IDNO:53), IWGRPAAIAEGQGEY (SEQ IDNO:54), IWGRPAAIAEGQGEYALEK (SEQ IDNO:55), KQDATSTIN (SEQ IDNO:56) KQDATSTINSIASNVVGQPL (SEQ IDNO:57), KQDATSINSIASNVVGQPLA (SEQ IDNO:58), LAGPLQQGQHYR (SEQ IDNO:59), LEAPVVSEADK (SEQ IDNO:60), LPTALKPESYEVTLQPF (SEQ IDNO:61), MLSDFLTEDVFK (SEQ IDNO:62), NSVPLPDSIGAIMDR (SEQ IDNO:63), PAAIAEGQGEYALEK (SEQ IDNO:64), QAIPVINR (SEQ IDNO:65), QDATSTINSIASNVVGQPL (SEQ IDNO:66), QNVSNNPIAPNLR (SEQ IDNO:67), SDFLTEDVFK (SEQ IDNO:68), SDQVGLPDFNAGAMENWG (SEQ IDNO:69), SEVFDSIAYSK (SEQ IDNO:70), SLLYDNAYSSIGNK (SEQ IDNO:71), SNNHQAIPVINR (SEQ IDNO:72), SVPLPDSIGAIMDR (SEQ IDNO:73), TDLWDHLQEAVNK (SEQ IDNO:74), TGELADDLAGFYR (SEQ IDNO:75), TGPILSFFER (SEQ IDNO:76), TIDPTK (SEQ IDNO:77), TLFGQYGGGSFSFSR (SEQ IDNO:78), TNINWVK (SEQ IDNO:79), VNYNQENWDQLL (SEQ IDNO:80), VNYQENWDQLLQ (SEQ IDNO:81), VNYQENWDQLLQQ (SEQ IDNO:82), VVATTQMQAPDAR (SEQ IDNO:83), WRLPTAL (SEQ IDNO:84), WRLPTALKPES (SEQ IDNO:85), WRLPTALKPESYEVTLQPF (SEQ IDNO:86), YDNAYSSIGNK (SEQ IDNO:87), YLQYTIDPTK (SEQ IDNO:88), YPLPK (SEQ IDNO:89); wherein the fragment of transthyretin comprises at least one of the following amino acid sequences: AADGTWQDFATGK (SEQ IDNO:90), CPLMVK (SEQ IDNO:91), DGTWQDFATGK (SEQ IDNO:92), DVVFTANDSGHR (SEQ IDNO:93), GLGLSPFH (SEQ IDNO:94), GLGLSPFHEY (SEQ IDNO:95), GLGLSPFHEYA (SEQ IDNO:96), GLGLSPFHEYADVVF (SEQ IDNO:97), GLGLSPFHEYADVVFTANDSGHR (SEQ IDNO:98), GSPAANVAVK (SEQ IDNO:99), GSPAANVAVKV (SEQ IDNO:100), GTWQDFATGK (SEQ IDNO:101), HYTIAALL (SEQ IDNO:102), HYTIAALLSPF (SEQ IDNO:103), HYTIAALLSPFS (SEQ IDNO:104), TTEEQFVEGVYR (SEQ IDNO:105), TTEFGEIHEL (SEQ IDNO:106), TTEFGEIHELTTEEQ (SEQ IDNO:107), TTEFGEIHELTTEEQFVEGV (SEQ IDNO:108), TTEFGEIHELTTEEQFVEGVYR (SEQ IDNO:109), TTEFGEIHELTTEEQFVEGVYRVEFDTSSYWK (SEQ IDNO:110), VEFDTSSYWK (SEQ IDNO:111), VLDAVR (SEQ IDNO:112); wherein the fragment of ovoinhibitor comprises at least one of the following amino acid sequences: EHGANVEK (SEQ IDNO:113), TLNLVSMAAC (SEQ IDNO:114), TLVACPR (SEQ IDNO:115); wherein the fragment of apolipoprotein A-1 comprises at least one of the following amino acid sequences: DLEEVKEK (SEQ IDNO:116), EMWLK (SEQ IDNO:117), IRDMVDV (SEQ IDNO:118), IRPFLDQF (SEQ IDNO:119), IRPFLDQFSAK (SEQ IDNO:120), LADNLDTLSAAAAK (SEQ IDNO:121), LISFLDELQK (SEQ IDNO:122), LSQKLEEI (SEQ IDNO:123), LTPVAEEAR (SEQ IDNO:124), LTPVAQELK (SEQ IDNO:125), LTPYAENLK (SEQ IDNO:126), MTPLVQEFR (SEQ IDNO:127), QKLSQK (SEQ IDNO:128), QLDLK (SEQ IDNO:129), YKEVR (SEQ IDNO:130); wherein the fragment of hemoglobin subunit beta comprises at least one of the following amino acid sequences: KVLTSFGDAV (SEQ IDNO:142), LHVDPENF (SEQ IDNO:143), LLIVYPWTQR (SEQ IDNO:144), NLDNIK (SEQ IDNO:145), VLTSFGDAVK (SEQ IDNO:146); wherein the fragment of superoxide dismutase [Cu—Zn]comprises at least one of the following amino acid sequences: AVCVMK (SEQ IDNO:147), FQQQGSGPVK (SEQ IDNO:148), GDAPVEGVIHFQQQGSGPVK (SEQ IDNO:149), GGVAEVEI (SEQ IDNO:150), GGVAEVEIEDSVISLTGPH (SEQ IDNO:151), GVIGIAK (SEQ IDNO:152), HVGDLGNVTA (SEQ IDNO:153), HVGDLGNVTAK (SEQ IDNO:154), ITGLSDGDHGFHVH (SEQ IDNO:155), LACGVIGIAK (SEQ IDNO:156), LTGNAGPR (SEQ IDNO:157), SDDLGR (SEQ IDNO:158), SDDLGRGGDNESK (SEQ IDNO:159), TMVVHA (SEQ IDNO:160); wherein the fragment of alpha-actinin-4 comprises at least one of the following amino acid sequences: DAEDIVNTARDPEK (SEQ IDNO:161), TIPWLEDR (SEQ IDNO:162); wherein the fragment of angiotensin-converting enzyme comprises at least one of the following amino acid sequences: AALPEDELKEYNTLLSDMETTYSVAK (SEQ IDNO:163), ALYNK (SEQ IDNO:164), DGANPGFHEAIGDV (SEQ IDNO:165), DGANPGFHEAIGDVMA (SEQ IDNO:166), DGANPGFHEAIGDVMAL (SEQ IDNO:167), DYNELLFAWK (SEQ IDNO:168), ETPTFEEDLER (SEQ IDNO:169), EVMLEK (SEQ IDNO:170), FEESDR (SEQ IDNO:171), FFTSLGLIPMPQEFWDK (SEQ IDNO:172), GGANPGFHEAIGDVLS (SEQ IDNO:173), GLIPMPQEFWDK (SEQ IDNO:174), GLLEMPPEFWEK (SEQ IDNO:175), GPIPAHL (SEQ IDNO:176), GPIPAHLLGNMW (SEQ IDNO:177), GPIPAHLLGNMWAQQ (SEQ IDNO:178), GPIPAHLLGNMWAQS (SEQ IDNO:

179), GYLIDQWR (SEQ IDNO:180), IIGSIQTLGPSNLPLDK (SEQ IDNO:181), IIGSIQTLGPSNLPLDKR (SEQ IDNO:182), IKEDEYNQQWWNL (SEQ IDNO:183), IYSTAK (SEQ IDNO:184), KIIGSIQTLGPSNLPLDK (SEQ IDNO:185), LLGDAMK (SEQ IDNO:186), LLYAWEGWHNAAGNPLR (SEQ IDNO:187), LSVLER (SEQ IDNO: 188), MSIALDK (SEQ IDNO:189), NTILSDMDK (SEQ IDNO:190), QCTVVNMDDLITVH (SEQ IDNO:191), QFDPSDFQDETVTR (SEQ IDNO:192), QQGWTPK (SEQ IDNO:193), QQYNTILSDMDK (SEQ IDNO:194), RYVELSNK (SEQ IDNO:195), SLGLIPMPQEFWDK (SEQ IDNO:196), SLSVSTPSHLQK (SEQ IDNO:197), SLYETPTFEEDLER (SEQ IDNO:198), SMIEKPADGR (SEQ IDNO:199), SNIFDLVMPFPDATK (SEQ IDNO: 200), SVSTPK (SEQ IDNO:201), SVSTPSHLQK (SEQ IDNO:202), TLGPSNLPLDK (SEQ IDNO:203), TNEVLGWPEFDWRSPIPEGYPEGIDK (SEQ IDNO: 204), TSLGLIPMPQEFWDK (SEQ IDNO:205), TSLGLLEMPPEFWEK (SEQ IDNO:206), VDATPAMK (SEQ IDNO:207), VELSNK (SEQ IDNO:208), YGAEHISLK (SEQ IDNO:209), YHIPGNTPY (SEQ IDNO:210), YINLK (SEQ IDNO:211), YNELLFAWK (SEQ IDNO: 212), YQGLCPPVPR (SEQ IDNO:213), YVELSNK (SEQ IDNO:214); wherein the fragment of WD repeat-containing protein 1 comprises at least one of the following amino acid sequences: IIGGDPK (SEQ IDNO:215), KVFASLPQVERGVSK (SEQ IDNO:216), VINSVDIK (SEQ IDNO:217); wherein the fragment of mitochondrial aspartate aminotransferase comprises at least one of the following amino acid sequences: GPPDPILGVTEAFK (SEQ IDNO:218), LLLSAPR (SEQ IDNO:219), MDKEYLPI (SEQ IDNO:220), MGLYGER (SEQ IDNO:221), NPTGVDPR (SEQ IDNO:222), TQLVSNLK (SEQ IDNO: 223); wherein the fragment of histone H2A-IV comprises at least one of the following amino acid sequences: NDEELNK (SEQ IDNO:224), VTIAQGGVLPNIQAAVLLPK (SEQ IDNO:225); wherein the fragment of immunoglobulin lambda chain C region comprises at least one of the following amino acid sequences: DFYPSPVTVDWVIDGSTR (SEQ IDNO:226), ITLFPPSK (SEQ IDNO:227), NDFYPSPVTVDWVIDGSTR (SEQ IDNO:228), SGETTAPQR (SEQ IDNO:229), THNGTSITK (SEQ IDNO:230), TVDWVIDGSTR (SEQ IDNO:231), VAPTITLFPPSK (SEQ IDNO:232), VAPTITLFPPSKEELN (SEQ IDNO:233), VAPTITLFPPSKEELNEAT (SEQ IDNO:234), VAPTITLFPPSKEELNEATK (SEQ IDNO:235), VTHNGTSITK (SEQ IDNO:236); wherein the fragment of immunoglobulin lambda chain V1 region comprises at least one of the following amino acid sequences: ALTQPSSVSANPGETVK (SEQ IDNO:237), APGSAPVTLIYDNTNRPSNIPSR (SEQ IDNO:238), GSAPVTLIYDNTNRPSNIPSR (SEQ IDNO:239), ITCSGDR (SEQ IDNO:240), NPGETVK (SEQ IDNO: 241), PSNIPSR (SEQ IDNO:242), RPSNIPSR (SEQ IDNO: 243), SANPGETVK (SEQ IDNO:244), SVSANPGETVK (SEQ IDNO:245), YGWYQQK (SEQ IDNO:246); wherein the fragment of cathepsin D comprises at least one of the following amino acid sequences: DPTAQPGGELLLGGTDPK (SEQ IDNO:247), ELQTAIGAKPL (SEQ IDNO:248), ELQTAIGAKPLI (SEQ IDNO:249), FDGILGMAFPR (SEQ IDNO:250), IPLTK (SEQ IDNO: 251), QPGGELLLGGTDPK (SEQ IDNO:252), VTPFFDNVMQQK (SEQ IDNO:253); wherein the fragment of retinol-binding protein 4 comprises at least one of the following amino acid sequences: QIDLCLDR (SEQ IDNO:254), TVDENGQMSATAK (SEQ IDNO:255).

Furthermore, the disclosure relates to a method as described above wherein the domesticated bird is a broiler. The term "broiler" refers to any chicken (*Gallus gallus domesticus*) that is bred and raised specifically for meat production.

Moreover, the preset disclosure relates to a method as described above wherein the proteins or fragments thereof are quantified by using antibodies that specifically bind to the proteins or fragments thereof.

The phrase "specifically (or selectively) binds (or detects)" a protein or peptide, when referring to an antibody, refers to a binding reaction that is determinative of the presence of the protein in a heterogeneous population of proteins and other biologics. Thus, under designated immunoassay conditions, the specified antibodies bind to a particular protein at least two times the background and do not substantially bind in a significant amount to other proteins present in the sample. Specific binding to an antibody under such conditions may require an antibody that is selected for its specificity for a particular protein. A variety of immunoassay formats may be used to select antibodies specifically immunoreactive with a particular protein. For example, solid-phase ELISA immunoassays are routinely used to select antibodies specifically immunoreactive with a protein (see, e.g., Harlow & Lane, Antibodies, A Laboratory Manual (1988), for a description of immunoassay formats and conditions that can be used to determine specific immunoreactivity). Typically a specific or selective reaction will be at least twice background signal or noise and more typically more than 10 to 100 times background. "Immunoassay" is an assay that uses an antibody to specifically bind an antigen (e.g., a marker). The immunoassay is characterized by the use of specific binding properties of a particular antibody to isolate, target, and/or quantify the antigen.

Furthermore, the disclosure relates to a method as described above wherein the antibodies are part of an Enzyme-Linked Immunosorbent Assay.

The disclosure will be further illustrated by the following, non-limiting Examples.

EXAMPLES

List of Abbreviations

BHI Brain Heart Infusion
BW Body weight
CD Crypt depth
$CD_3$ Cluster of differentiation 3
CFU Colony forming units
DAB Di-amino-benzidine
DDA Data Dependent Acquisition
DFI Daily feed intake
DTT Dithiothreitol
DWG Daily weight gain
FCR Feed conversion ratio
HPLC-MS High performance liquid chromatography-mass spectrometry
HRP Horseradish peroxidase
LB Lysogeny Broth
MGAS Macroscopic Gut Appearance Score
MMTS Methyl methanethiosulfonate
MPDS 2 Mass prep digestion standard 2
MRS Man-Rogosa-Sharpe
MWCO Molecular weight cut-off
OTU Operational taxonomic unit
PBS Phosphate buffered saline
psi Pound per square inch TEABC Triethylammonium bicarbonate
VL Villus length
VL/CD Villus-to-crypt ratio Materials and Methods Study Design A total of 360 day-old broilers (Ross 308) were obtained from a local hatchery and housed in floor pens on wooden shavings. Throughout the study, feed and drinking water were provided ad libitum. The broilers were randomly assigned to two treatment groups, a control and challenge group (9 pens per treatment and 20 broilers per pen). All animals were fed a commercial feed till day 12 and the feed was switched to a wheat (57.5%) based diet supplemented with 5% rye (Table 1). From day 12 to 18, all animals from the challenge group received 10 mg florfenicol and 10 mg enrofloxacin per kg body weight via the drinking water daily, to induce substantial changes in the gut microbial community. After the antibiotic treatment, 1 ml of a bacterial cocktail consisting of Escherichia coli (G.78.71), Enterococcus faecalis (G.78.62), Lactobacillus salivarius (LMG22873), Lactobacillus crispatus (LMG49479), Clostridium perfringens (netB-) (D.39.61) and Ruminococcus gnavus (LMG27713) was given daily by oral gavage from day 19 till 21. Cultures of the bacteria were prepared as follows. Lysogeny Broth (LB, Oxoid,) was used for growing E. coli. Enterococcus faecalis and C. perfringens were grown in Brain Heart Infusion (BHI, Sigma) broth. Man-Rogosa-Sharpe (MRS, Oxoid) medium was used for the growth of L. crispatus and L. salivarius. For the growth of R. gnavus, anaerobic M2GSC medium (pH 6) as described by Miyazaki et al. (1997) was used but with 15% clarified rumen fluid instead of 30% and addition of 1 mg/ml cysteine HCl and 4 mg/ml NaHCO$_3$ after autoclaving. E. coli and Enterococcus faecalis was cultured in aerobic conditions at 37° C. In an aerobic (5% 02) incubator, Lactobacillus spp. were cultured. C. perfringens and R. gnavus were cultured an anaerobic chamber (gas mixture 84% N2, 8% 02 en 8% H$_2$, GP[concept], Jacomex, France) at 37° C. The bacterial cells were collected by ultracentrifugation (10,000 rpm, 10 minutes, 20° C.) and each pellet was resuspended in 100 ml anaerobic phosphate buffered saline (PBS, 1 mg/ml cysteine HCl, pH 6). The resuspended pellets were mixed and diluted with anaerobic PBS to a total volume of 1.5:1 to reach a final concentration of about 109 colony-forming units (CFU)/ml for each bacterial strain (Table 2). On day 20, the animals were administered a coccidial challenge consisting of different Eimeria sp., namely 60,000 oocysts of E. acervulina and 30,000 oocysts E. maxima.

At day 26, the birds were weighed and 3 birds per pen were euthanized. The duodenal loop was sampled for histological examination and content from ileum and colon was collected for protein extraction.

TABLE 1

Composition and nutrient content of the wheat/rye based broiler diet. Starter diet was given till day 11. Grower was given from day 12 to day 34.

| Feedstuff | Starter % | Grower % | Calculated nutrient composition (%) | Starter % | Grower % |
|---|---|---|---|---|---|
| Wheat | 55.13 | 57.87 | Dry matter | 88.45 | 88.38 |
| Rye | 0.00 | 5.00 | Ash | 5.11 | 4.79 |
| Soy meal, crude fiber content < 50 | 22.86 | 22.86 | Crude protein | 20.85 | 18.98 |
| Full fat soybeans | 7.50 | 2.50 | Crude fat | 10.83 | 9.90 |
| Animal fat | 7.20 | 7.20 | Crude fiber | 2.93 | 2.49 |
| Soybean oil | 1.00 | 1.00 | Carbohydrates | 48.46 | 51.95 |
| Premix | 0.50 | 0.50 | Starch | 34.62 | 38.46 |
| Lime fine | 1.11 | 1.11 | Sugars | 4.77 | 4.53 |
| Monocalcium phosphate | 0.83 | 0.83 | NDF | 10.52 | 9.93 |
| Salt | 0.18 | 0.18 | ADF | 4.18 | 3.52 |
| NaHCO$_3$ | 0.25 | 0.25 | Calcium | 0.69 | 0.66 |
| L-lysine HCl | 0.30 | 0.30 | Phosphorus, total | 0.57 | 0.54 |
| DL-methionine | 0.30 | 0.30 | Calcium/dP poultry | 0.22 | 0.22 |
| L-threonine | 0.10 | 0.10 | Magnesium | 0.16 | 0.14 |
| Rapeseed meal < 380 | 2.74 | 0.00 | Potassium | 0.88 | 0.79 |
| | | | Sodium | 0.15 | 0.15 |
| | | | Chloride | 0.20 | 0.20 |
| | | | Base-excess (mEq/kg) | 23.39 | 20.97 |
| | | | Linolic acid | 2.38 | 1.92 |

TABLE 2

Broilers were orally inoculated with 1 ml of a bacterial cocktail on day 19, 20 and 21 with $10^6$-$10^{10}$ CFU of Escherichia coli, Enterococcus faecalis, Lactobacillus salivarius, Lactobacillus crispatus, Clostridium perfringens (netB-) and Ruminococcus gnavus

| Bacterial strain | Day 19 (CFU/ml) | Day 20 (CFU/ml) | Day 21 CFU/ml) |
|---|---|---|---|
| E. coli | $2.11 \times 10^9$ | $1.22 \times 10^9$ | $2.28 \times 10^9$ |
| Enterococcus faecalis | $3.44 \times 10^9$ | $2.28 \times 10^{10}$ | $3.56 \times 10^9$ |
| Lactobacillus salivarius | $4.78 \times 10^7$ | $1.16 \times 10^7$ | $2.39 \times 10^7$ |
| Lactobacillus crispatus | $1.89 \times 10^9$ | $7.78 \times 10^7$ | $7.22 \times 10^6$ |
| Clostridium perfringens | $1 \times 10^7$ | $1.06 \times 10^7$ | $2.78 \times 10^8$ |
| Ruminococcus gnavus | $2.89 \times 10^8$ | $2.78 \times 10^8$ | $3.17 \times 10^8$ |

Macroscopic Scoring System

The macroscopic appearance of the gut was evaluated using a previously described scoring system (Teirlynck et al., 2011), in which, in total, 10 parameters were assessed and assigned 0 (absent) or 1 (present), which resulted in a total score between 0 and 10. A total score of 0 represents a normal appearance of the intestinal tract while 10 points to severe deviations from the normal appearance. The parameters are (1) "ballooning" of the gut; (2) inflammation, cranial to the Meckel's diverticulum; (3) macroscopically visible and tangible fragile small intestine cranial to the Meckel's diverticulum; (4) loss of tonus in longitudinal cutting of the intestine cranial to the Meckel's diverticulum within the 3 seconds after incision; (5) abnormal occurrence of the intestinal content (excess mucus, orange content, gas) cranial to the Meckel's diverticulum; (6, 7, 8, 9) are identical to (2, 3, 4, 5) but caudal to the Meckel's diverticulum and (10) presence of undigested particles in the colon. A coccidiosis scoring was performed as described in Johnson & Reid (1970) in which the animals were given a score for typical lesions associated with *Eimeria acervulina, E. maxima* and *E. tenella*. For each, a score was given between 0 (absent) and 4 (severe). A total coccidiosis score was calculated as the sum of the scores given for lesions caused by each individual *Eimeria* species.

Morphological Parameters

The duodenal loop was fixatied in 4% formaldehyde for 24 hours, dehydrated in xylene and embedded in paraffin. Sections of 4 μm were cut using a microtome (Microme HM360, Thermo Scientific) and were processed as described by De Maesschalck et al. (2015). Morphological parameters were determined using standard light microscopy. Villus length and crypt depth in the duodenum were measured by random measurement of twelve villi per intestinal segment using Leica DM LB2 Digital and a computer based image analysis program, LAS V4.1 (Leica Application Suite V4, Germany). Also the villus-to-crypt ratio was calculated.

Immunohistochemical Examination

Antigen retrieval was performed on 4 μm sections with a pressure cooker in citrate buffer (10 mM, pH 6). Slides were rinsed with washing buffer (Dako kit, K4011) and blocked with peroxidase reagent (Dako, S2023) for 5 minutes. Slides were rinsed with aqua destillata and Dako washing buffer before incubation with anti-$CD_3$ primary antibodies (Dako $CD_3$, A0452) for 30 minutes at room temperature diluted 1:100 in antibody diluent (Dako, S3022). After rinsing again with washing buffer, slides were incubated with labelled polymer-HRP anti-rabbit (Envision$^+$ System-HRP, K4011) for 30 minutes at room temperature. Before adding di-amino-benzidine ($DAB^+$) substrate and $DAB^+$ chromogen (Dako kit, K4011) for 5 minutes, slides were rinsed 2 times with washing buffer. To stop the staining, the slides were rinsed with Aquadest, dehydrated using the Shandon Varistain-Gemini Automated Slide Stainer and counter-stained with hematoxylin for 10 seconds. The slides were analyzed with Leica DM LB2 Digital and a computer based image analysis program LAS V4.1 (Leica Application Suite V4, Germany) to measure $CD_3$ positive area on a total area of 3 $mm^2$, which represents T-lymphocyte infiltration in approximately 10 villi per section.

Discovery Proteomics

Sample Preparation

Individual colon and ileal content samples were collected and stored at −20° C. before use. 500 mg was solubilized in 10 ml 2 M urea, 50 mM ammonium bicarbonate and homogenized by vortexing. After centrifugation (20,000×g, 15 minutes, 4° C.), the supernatant was filtered through a 0.22 μm filter unit (Merck, Germany) directly in a Vivaspin 20 with a 5 kDa MWCO filter (Sartorius, Germany) and centrifuged for 1 hour at 4000×g. The filter was washed 3 times with 1 ml 2 M urea, 50 mM ammonium bicarbonate followed by centrifugation (4000×g, 10 minutes, 4° C.). The samples were washed 3 times with 1 ml 500 mM triethyl-ammonium bicarbonate (TEABC, Sigma) to remove the urea. Subsequently, the samples were concentrated to a volume of ±500 μl. To determine the protein concentration, a Bradford assay was performed where OD was measured at 595 nm. Approximately 50 μg of proteins were reduced with 1 mM dithiothreitol (DTT) and incubated at 60° C. for 30 minutes, followed by alkylation for 10 minutes at room temperature with 10 mM methyl methanethiosulfonate (MMTS). Hereafter, calcium chloride and acetonitrile were added to a final concentration of 1 mM and 5% (v/v) respectively. Finally trypsin was added in a 1:20 (trypsin: protein) ratio for overnight digestion at 37° C. The samples were vacuum dried and analyzed with high performance liquid chromatography-mass spectrometry (HPLC-MS).

HPLC-MS

Peptides were dissolved in 0.1% formic acid in HPLC-grade water (buffer A) to a final concentration of 1 μg/μL. 100 fmol of mass prep digestion standard 2 (MPDS 2) was spiked into each sample. Data Dependent Acquisition MS analysis was performed on a TripleTOF 5600 (Sciex) fitted with a DuoSpray ion source in positive ion mode, coupled to an Eksigent NanoLC 400 HPLC system (Sciex). Peptides were separated on a microLC YMC Triart C18 column (id 300 μm, length 15 cm, particle size 3 μm) at a flow rate of 5 μL/minute by means of trap-elute injection (YMC Triart C18 guard column, id 500 μm, length 5 mm, particle size 3 μm). Elution was performed using a gradient of 4-40% buffer B (0.1% formic acid, 5% DMSO in 80% ACN) over 90 minutes. Ion source parameters were set to 5.5 kV for the ion spray voltage, 30 psi for the curtain gas, 13 psi for the nebulizer gas and 80° C. as temperature.

For DDA, a 2.25-second instrument cycle was repeated in high sensitivity mode throughout the whole gradient, consisting of a full scan MS spectrum (300-1250 m/z) with an accumulation time of 0.2 seconds, followed by 20 MS/MS experiments (50-1800 m/z) with 0.2 seconds accumulation time each, on MS precursors with charge state 2 to 5+ exceeding a 500 cps threshold. Rolling collision energy was used as suggested by the manufacturer and former target ions were excluded for 10 seconds.

Database Searching

The *.wiff files generated during LC-MS/MS analysis were imported into the Progenesis QI for Proteomics software (Non-linear Dynamics). The different samples were aligned based on retention time and m/z of reoccurring features to enable relative quantification. After subsequent peak picking, a merged *.mgf file was exported from the software and searched for identifications with MASCOT Daemon (Matrix Science, version 2.5.1) against a chicken database (reviewed protein database downloaded from Swissprot, January 2016) supplemented with the cRAP database (laboratory proteins and dust/contact proteins thegpm.org/crap/) and the internal standard. Maximum peptide mass tolerance and fragment mass tolerance were set to 10 ppm and 0.1 Da respectively. Additionally, methylthio on cysteine was set as a fixed modification and deamidation of asparagine and/or glutamine and oxidation of methionine were set as variable modifications. Enzyme specificity was set to trypsin with a maximum of one missed cleavage. The identifications were exported from MASCOT Daemon with a 5% false discovery rate (*.xml format) and imported into Progenesis QI for Proteomics.

Statistical Analysis

Statistical analysis was performed with Graphpad Prism (v.5). To evaluate whether the data is normally distributed, a Kolmogorov-Smirnov test was performed. In case of a normal distribution, comparison of the data was performed with an independent samples t-test. Otherwise, the non-parametric Mann-Whitney test was performed. A p-value of <0.05 was considered statistically significant. The statistical coherence between different parameters was evaluated via correlation analysis.

Results

Performance Parameters

Body weight (BW), daily weight gain (DWG), daily feed intake (DFI) and feed conversion ratio (FCR) were measured during different time periods. Significant differences between treatment and control groups were seen at day 26, 35 and 41, but not at the age of 12 days (Table 3).

TABLE 3

Mean ± standard deviation of body weight (BW), daily weight gain (DWG), daily feed intake (DFI) and feed conversion ratio (FCR) measured during different time periods for the control and challenge group. Significant differences ($p < 0.05$) are shown in bold.

| Time period | parameters | Control Mean ± SD | Challenge Mean ± SD | p-value |
|---|---|---|---|---|
| D 1-D 12 | BW (g) | 290 ± 13 | 295 ± 11 | 0.485 |
| | DWG (g) | 19.6 ± 1 | 20.2 ± 1 | 0.342 |
| | DFI (g) | 24 ± 1 | 25 ± 1 | 0.614 |
| | FCR | 1.25 ± 0.06 | 1.23 ± 0.05 | 0.321 |
| D 12-D 26 | BW (g) | 1375 ± 58 | 1195 ± 46 | <0.001 |
| | DWG (g) | 78 ± 4 | 64 ± 4 | <0.001 |
| | DFI (g) | 116 ± 6 | 108 ± 7 | 0.014 |
| | FCR | 1.50 ± 0.07 | 1.69 ± 0.18 | 0.004 |
| D 26-D 35 | BW (g) | 2345 ± 174 | 2153 ± 129 | 0.003 |
| | DWG (g) | 106 ± 10 | 105 ± 6 | 0.857 |
| | DFI (g) | 185 ± 10 | 203 ± 15 | 0.016 |
| | FCR | 1.76 ± 0.14 | 1.94 ± 0.20 | 0.040 |
| D 35-D 41 | BW (g) | 3095 ± 164 | 2850 ± 176 | 0.001 |
| | DWG (g) | 121 ± 17 | 114 ± 21 | 0.276 |
| | DFI (g) | 161 ± 14 | 166 ± 10 | 0.427 |
| | FCR | 1.35 ± 0.14 | 1.53 ± 0.45 | 0.041 |
| D 12-D 35 | DWG (g) | 86 ± 5 | 76 ± 4 | <0.001 |
| | DFI (g) | 136 ± 6 | 135 ± 8 | 0.811 |
| | FCR | 1.59 ± 0.08 | 1.79 ± 0.18 | 0.002 |
| D 12-D 41 | DWG (g) | 91 ± 4 | 82 ± 5 | <0.001 |
| | DFI (g) | 139 ± 7 | 140 ± 7 | 0.864 |
| | FCR | 1.52 ± 0.04 | 1.72 ± 0.13 | <0.001 |

Macroscopic Scoring

Figure 1B:
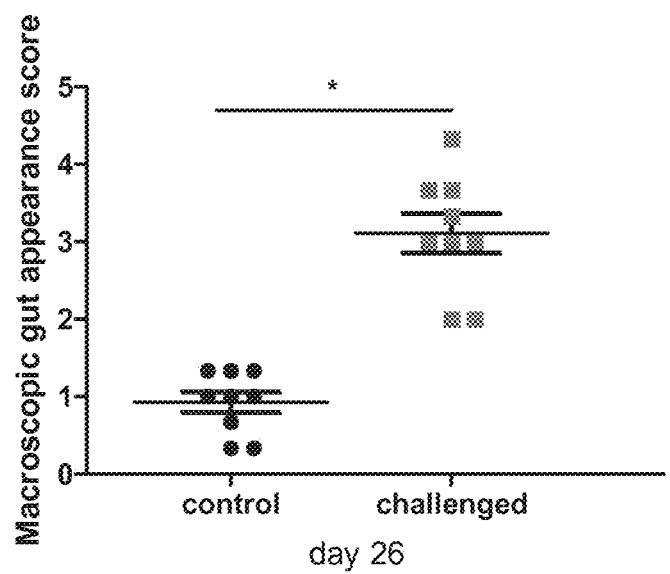
Figure 1C:
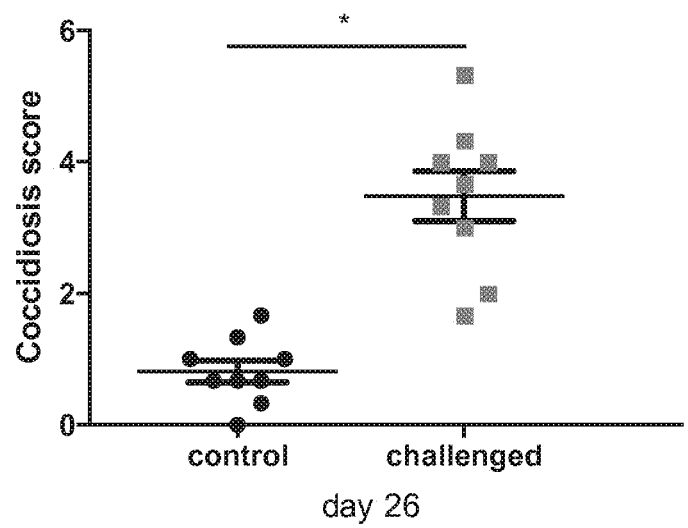
Figure 2A:
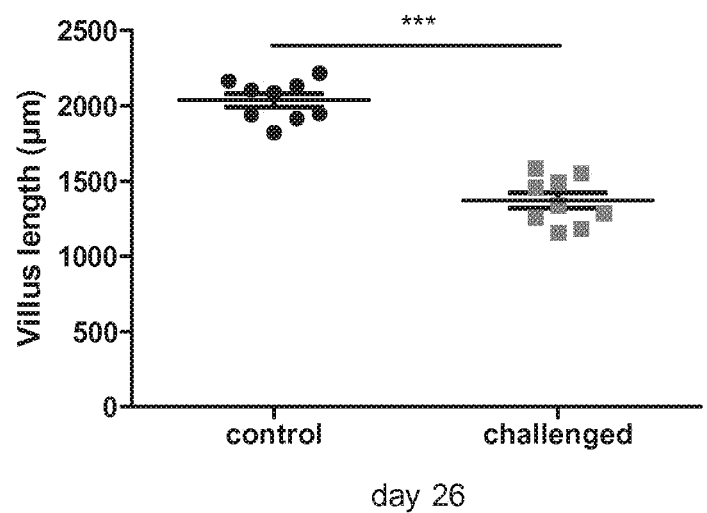
FIGS. 2A-2D: Mean villus length (FIG. 2A), crypt depth (FIG. 2B), villus-to-crypt ratio (FIG. 2C), and T-lymphocyte infiltration ($CD_3$ area %) per pen for control and challenge (FIG. 2D) on day 26. *** denotes statistical significance at p<0.0001 between control and challenge group.
Figure 2B:
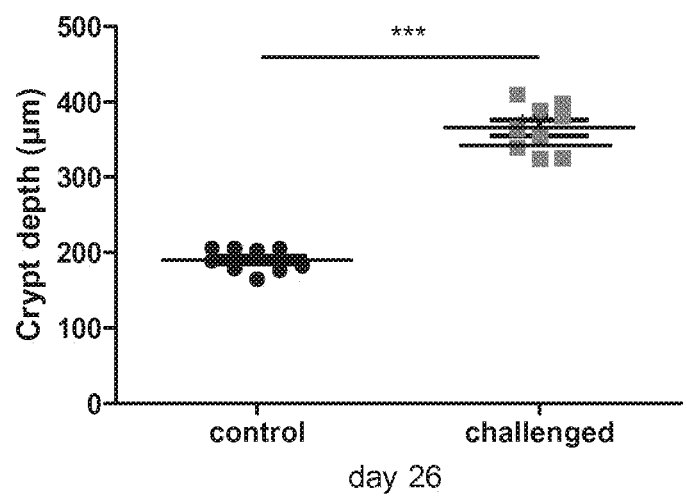
Figure 2C:
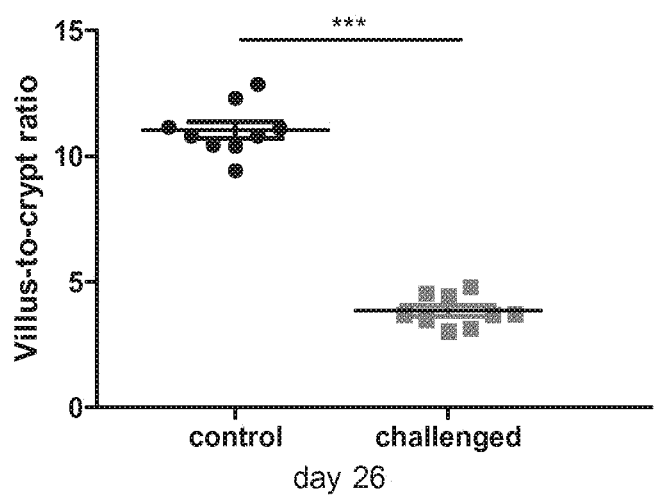
Figure 2D:
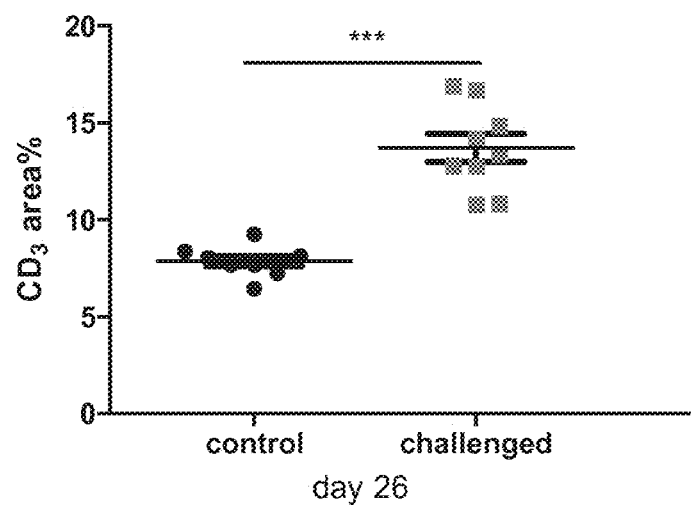

The appearance of the gut and a coccidiosis score were given to 27 birds per treatment. A lower body weight was observed at day 26 (p=0.0001) for broilers that received challenge treatment. The score for the macroscopic appearance of the gut and the total coccidiosis score were higher in the challenged group at day 26 (p<0.001) (FIGS. 1A-1C, Table 4).

TABLE 4

Mean ± standard deviation of body weight (BW), macroscopic gut appearance score (MGAS) and coccidiosis score (CS) for the control (n = 27) and challenge group (n = 27) at day 26. Significant differences ($p < 0.05$) are shown in bold.

| Timepoint | parameters | Control Mean ± SD | Challenge Mean ± SD | p-value |
|---|---|---|---|---|
| D 26 | BW (g) | 1375 ± 157.4 | 1187 ± 170.1 | p = 0.0001 |
| | MGAS | 0.9 ± 0.7 | 3.1 ± 1.1 | p < 0.001 |
| | CS | 0.8 ± 0.7 | 3.5 ± 1.7 | p < 0.001 |

Intestinal Morphology and Immunohistochemistry

A significant shorter villus length, an increased crypt depth, a lower villus-to-crypt ratio and a higher inflammation level in duodenal sections on day 26 (p<0.0001) were detected in the gut of animals from the treatment group as compared to the control group (Table 5).

TABLE 5

Mean ± standard deviation of villus length (VL), crypt depth (CD), villus-to-crypt ratio (VL/CD) and T-lymphocyte infiltration ($CD_3$ area %) on day 26 for control (n = 27) and challenge group (n = 27). For all evaluated parameters, statistical significance was $p < 0.0001$.

| Timepoint | parameters | Control Mean ± SD | Challenge Mean ± SD |
|---|---|---|---|
| D 26 | VL (µm) | 2035.7 ± 134.6 | 1369.9 ± 158.7 |
| | CD (µm) | 190.1 ± 15.43 | 365.7 ± 31.41 |
| | VL/CD | 11.03 ± 1.03 | 3.85 ± 0.63 |
| | $CD_3$ area % | 7.88 ± 1.35 | 9.54 ± 2.71 |

Correlations

Pearson r has a value between −1 (total negative correlation) and +1 (total positive correlation). In case of a positive correlation, one parameter increases as the other parameter increases and vice versa. When one parameter decreases and the other one increases, there is a negative correlation. On day 26, all macroscopic (macroscopic gut appearance score, coccidiosis score and body weight) and histological parameters (villus length, crypt depth, villus-to-crypt ratio and T-lymphocyte infiltration) correlate with one another (Table 6).

TABLE 6

Pearson correlation coefficient between macroscopic gut appearance score (MGAS), coccidiosis score (CS), body weight (BW), villus length (VL), crypt depth (CD), villus-to-crypt ratio (VL/CD) and T-lymphocyte infiltration (CD3 area %). Correlation coefficients with a statistical significance of $p < 0.05$ are shown.
Day 26

| | MGAS | CS | BW | VL | CD | VL/CD | $CD_3$ area % |
|---|---|---|---|---|---|---|---|
| MGAS | — | | | | | | |
| CS | 0.0905 | — | | | | | |
| BW | −0.6836 | −0.5974 | — | | | | |
| VL | −0.8400 | −0.8572 | 0.7400 | — | | | |
| CD | 0.8220 | 0.8045 | −0.7546 | −0.9073 | — | | |
| VL/CD | −0.8507 | −0.8599 | 0.7303 | 0.9570 | −0.9773 | — | |
| $CD_3$ area % | 0.8559 | 0.8177 | −0.770 | −0.9028 | 0.8959 | −0.8979 | — |

Discovery Proteomics 1.

Using MASCOT Daemon (Matrix Science, version 2.5.1) against a chicken database (reviewed protein database downloaded from Swissprot, January 2016) supplemented with the cRAP database (laboratory proteins and dust/contact proteins thegpm.org/crap/), 157 proteins were identified for colon. In theory, a good gut health biomarker should relate with one or more histological parameters since measurement of villus length and inflammation level are used as standard measurements in the evaluation of intestinal health. Also correlation with the macroscopic gut appearance score was evaluated. It is noted that proteins of which the colonic concentration has a negative correlation with the villus length, inverse correlation was seen with crypt depth, $CD_3$ area % and macroscopic gut appearance score. Only correlations with a statistical significance of p<0.1 are shown (Table 7).

TABLE 7

Pearson correlation coefficient between the abundance of the protein in colon content and villus length (VL), crypt depth (CD), villus-to-crypt ratio (VL/CD) and T-lymphocyte infiltration ($CD_3$ area %) and macroscopic gut appearance score (MGAS) on day 26. Correlation coefficients with a statistical significance of $p < 0.1$ are shown.
Day 26

| Accession number | | VL | $CD_3$ area % | MGAS |
|---|---|---|---|---|
| P08940 | Myeloid protein 1 | −0.7283 | 0.5466 | 0.5668 |
| P11722 | Fibronectin | −0.8114 | 0.6515 | 0.6519 |
| P17153 | Annexin A5 | −0.5746 | | |
| P16039 | Nucleophosmin | −0.5263 | 0.7196 | |
| P07630 | Carbonic anhydrase 2 | −0.5899 | | 0.5726 |
| O57579 | Aminopeptidase Ey | 0.5462 | | −0.7177 |
| P27731 | Transthyretin | −0.5778 | 0.6065 | |
| P10184 | Ovoinhibitor | −0.4852 | | |
| P08250 | Apolipoprotein A-1 | −0.5066 | | |

Discovery Proteomics 2

Using MASCOT Daemon (Matrix Science, version 2.5.1) against a chicken database (reviewed protein database downloaded from Swissprot, January 2016) supplemented with the cRAP database (laboratory proteins and dust/contact proteins thegpm.org/crap/), 157 and 181 proteins were identified for colon and ileum respectively whereby significant differential proteins between control and challenged birds were selected (p<0.05). In broilers from the challenge group, the following proteins showed a significantly higher abundance compared to control animals in colonic content (p<0.05): alpha-actinin-4 (ACTN4), annexin A5 (ANXA5), apolipoprotein A-1 (APOA1), fibronectin (FINC), hemoglobin subunit beta (HBB), myeloid protein 1 (MIM1), nucleophosmin (NPM), ovoinhibitor (IOV7) and transthyretin (TTR). Both in colonic and ileal content, superoxide dismutase [Cu—Zn] (SOD) showed a decreased abundance compared to control animals (p<0.05). Angiotensin-converting enzyme (ACE), mitochondrial aspartate aminotransferase (AATM), cathepsin D (CATD), Ig lambda chain C region (LAC), Ig lambda chain V-1 region (LV1), TTR and WD repeat-containing protein 1 (WDR1) showed a lower abundance in challenged birds (p<0.05) in ileal samples. Following proteins were more abundant (p<0.05): APOA1, histone H2A-IV (H2A4) and retinol-binding protein 4 (RET4) (Table 8 and Table 9).

TABLE 8

Significantly different proteins between control and challenge group in colonic content.

| Accession number | Protein name | Abbreviation | P-value | Highest mean |
|---|---|---|---|---|
| Q90734 | Alpha-actinin 4 | ACTN4 | 0.0385 | Challenge |
| P17153 | Annexin A5 | ANXA5 | 0.0266 | Challenge |
| P08250 | Apolipoprotein A-1 | APOA1 | 0.0277 | Challenge |
| P11722 | Fibronectin | FINC | 0.0106 | Challenge |
| P02112 | Hemoglobin subunit beta | HBB | 0.0158 | Challenge |
| P08940 | Myeloid protein 1 | MIM1 | 0.0008 | Challenge |
| P16039 | Nucleophosmin | NPM | 0.0071 | Challenge |
| P10184 | Ovoinhibitor | IOV7 | 0.0254 | Challenge |
| P80566 | Superoxide dismutase [Cu—Zn] | SOD | 0.0287 | Control |
| P27731 | Transthyretin | TTR | 0.0317 | Challenge |

Proteomics using high performance liquid chromatography-mass spectrometry (HPLC-MS) was performed on colonic content of animals from the control (n=9) and challenged (n=9) group at day 26. This resulted in significant differential proteins (p<0.05) with a higher normalized abundance of 9 proteins and a decrease of superoxide dismutase [Cu—Zn] in challenged birds.

TABLE 9

Significantly different proteins between control and challenge group in ileal content.

| Accession number | Protein name | Abbreviation | P-value | Highest mean |
|---|---|---|---|---|
| O57579 | Aminopeptidase Ey | AMPN | 0.0012 | Control |
| Q10751 | Angiotensin-converting enzyme | ACE | 0.0006 | Control |
| P08250 | Apolipoprotein A-1 | APOA1 | 0.0364 | Challenge |
| P00508 | Aspartate aminotransferase, mitochondrial | AATM | 0.0067 | Control |
| Q05744 | Cathepsin D | CATD | 0.0203 | Control |
| P02263 | Histone H2A-IV | H2A4 | 0.0079 | Challenge |
| P20763 | Ig lambda chain C region | LAC | 0.0155 | Control |
| P04210 | Ig lambda chain V-1 region | LV1 | 0.0370 | Control |
| P41263 | Retinol-binding protein 4 | RET4 | 0.0399 | Challenge |
| P80566 | Superoxide dismutase [Cu—Zn] | SOD | 0.0004 | Control |
| P27731 | Transthyretin | TTR | 0.0091 | Control |
| O93277 | WD repeat-containing protein 1 | WDR1 | 0.0027 | Control |

Proteomics using high performance liquid chromatography-mass spectrometry (HPLC-MS) was performed on ileal content of animals from the control (n=9) and challenged (n=9) group at day 26. This resulted in 12 significant differential proteins (p<0.05) with a higher normalized abundance of apolipoprotein A-1 (APOA1), histone H2A-IV (H2A4) and retinol-binding protein 4 (RET4) and decrease in normalized abundance for the other 9 proteins in challenged birds.

REFERENCES

Adelman, D. C., Murray, J., Wu, T. T., Maki, M., Green, P. H. and Kelly, C. P. (2018). Measuring Change In Small Intestinal Histology In Patients With Celiac Disease. *The American Journal of Gastroenterology* doi: 10.1038/ajg.2017.480.

Awad, W. A., Ghareeb, K., Abdel-Raheem, S., and Bohm, J. (2009). Effects of dietary inclusion of probiotic and synbiotic on growth performance, organ weights, and intestinal histomorphology of broiler chickens. *Poultry Science* 88: 49-55

Bailey, R. A. (2010). Intestinal Microbiota and the Pathogenesis of Dysbacteriosis in Broiler Chickens. Doctor of Philosophy, Institute of Food Research—Norwich Research Park, United Kingdom, https://core.ac.uk/download/pdf/2778547.pdf Benčina, M., Cizelj, I., Berčič, R. L., Narat, M., Benčina, D. and Dovč, P. (2014). Shared epitopes of avian immunoglobulin light chains. *Veterinary Immunology and Immunopathology* 158:175-181

Broom, L. J. and Kogut, M. H. (2018). Inflammation: friend or foe for animal production? *Poultry Science* 97, 2: 510-514

Caly, D. L., D'Inca, R., Auclair, E. and Drider, D. (2015). Alternatives to Antibiotics to Prevent Necrotic Enteritis in Broiler Chickens: A Microbiologist's Perspective. *Frontiers in Microbiology* 6: 1336

Canani, R. B., Terrin, G., Rapacciuolo, L., Miele, E., Siani, M. C., Puzone, C., Cosenza, L., Staiano, A. and Troncone, R. (2008). Faecal calprotectin as reliable non-invasive marker to assess the severity of mucosal inflammation in children with inflammatory bowel disease. *Digestive and Liver Disease* 40, 7: 547-553

Casewell, M., Friis, C., Marco, E., McMullin, P. and Phillips, I. (2003). The European ban on growth-promoting antibiotics and emerging consequences for human and animal health. *Journal of Antimicrobial Chemotherapy* 52, 2: 159-161

Chang, M-H., Chou, J-W., Chen, S-M., Tsai, M-C., Sun, Y-S., Lin, C-C. and Lin, C-P. (2014). Faecal calprotectin as a novel biomarker for differentiating between inflammatory bowel disease and irritable bowel syndrome. *Molecular Medicine Reports* 10, 1: 522-526

Chen, V. C., Li, X., Perreault, H. and Nagy, J. I. (2006). Interaction of Zonula Occludens-1 (ZO-1) with r-Actinin-4: Application of Functional Proteomics for Identification of PDZ Domain-Associated Proteins. *Journal of Proteome Research* 5:2123-2134

Cowieson, A. J. and Selle, P. H. (2012). The Environmental Impact of Low Feed Conversion Ratios in Poultry. Available at: https://en.engormix.com/poultry-industry/articles/(published 17 Jul. 2012).

Craig, S. W. and Pardo, J. V. (1979). Alpha-actinin localization in the junctional complex of intestinal epithelial cells. *Journal of cell biology* 80: 203-210

De Maesschalck, C., Eeckhaut, V., Maertens, L., De Lange, L., Marchal, L., Nezer, C., De Baere, S., Croubels, S., Daube, G., Dewulf, J., Haesebrouck, F., Ducatelle, R., Taminau, B. and Van Immerseel, F. (2015). Effects of Xylo-Oligosaccharides on Broiler Chicken Performance and Microbiota. *Applied and Environmental Microbiology* 81, 17: 5880-5888

Fujibuchi, T., Abe, Y., Takeuchi, T., Imai, Y., Kamei, Y., Murase, R., Ueda, N., Shigemoto, K., Yamamoto, H. and Kito, K. (2004). AIP1/WDR1 supports mitotic cell rounding. *Biochemical and Biophysical Research Communications* 327: 268-275

Fusek, M. and Vetvicka, V. (2005). Dual role of cathepsin D: ligand and protease. *Biomedical papers of the Medical Faculty of the University Palacky, Olomouc, Czechoslovakia* 149, 1:43-50

Gal-Garber, O. and Uni, Z. (2000). Chicken intestinal aminopeptidase: Partial sequence of the gene expression and activity. *Poultry Science* 79: 41-45.

Gilani, S., Howarth, G. S., Kitessa, S. M., Tran, C. D., Forder, R. E. A. and Hughes, R. J. (2016). Intestinal permeability induced by lipopolysaccharide and measured by lactulose, rhamnose and mannitol sugars in chickens. *Animal* 11, 7: 1174-1179

Gilani, S., Howarth, G. S., Kitessa, S. M., Tran, C. D., Forder, R. E. A. and Hughes, R. J. (2017). New biomarkers for increased intestinal permeability induced by dextran sodium sulphate and fasting in chickens. *Journal of Animal Physiology and Animal Nutrition* 101, 5: 237-245

Gilani, S., Howarth, G. S., Tran, C. D., Barekatain, R., Kitessa, S. M., Forder, R. E. A. and Hughes, R. J. (2018). Reduced fasting periods increase intestinal permeability in chickens. *Journal of Animal Physiology and Animal Nutrition* 102, 1: 486-492

Hong, Y. H., Dinh, H., Lillehoj, H. S., Song, K-D. and Oh, J-D. (2014). Differential regulation of microRNA transcriptome in chicken lines resistant and susceptible to necrotic enteritis disease. *Poultry Science* 93, 6: 1383-1395

Ingenbleek, Y. and Bernstein, L. H. (2015). Plasma Transthyretin as a Biomarker of Lean Body Mass and Catabolic States. *Advances in Nutrition* 6: 572-580

Johnson, J. and Reid, W. M. (1970). Anticoccidial Drugs: Lesion Scoring Techniques in Battery and Floor-Pen Experiments with Chickens. *Experimental Parasitology* 28, 30-36

Kaneko, J. J., Harvey, J. W., Bruss, M. L., Hoffmann, W. E. and Solter, P. F. (2008). Diagnostic Enzymology of Domestic Animals. *Clinical Biochemistry of Domestic Animals* 351-378

Kuttappan, V. A., Vicuña, E. A., Latorre, J. D., Wolfenden, A. D., Téllez, G. I., Hargis, B. M. and Bielke, L. R. (2015). Evaluation of Gastrointestinal Leakage in Multiple Enteric Inflammation Models in Chickens. *Frontiers in Veterinary Science* 2:66

Mellgren, R. L. (2010). A plasma membrane wound proteome: reversible externalization of intracellular proteins following reparable mechanical damage. *Journal of Biological Chemistry* 285: 36597-36607

Midorikawa, T., Abe, R., Yamagata, Y. Nakajima, T. and Ichishima, E. (1998). Isolation and characterization of cDNA encoding chicken egg yolk aminopeptidase Ey. *Comparative Biochemistry and Physiology—Part B: Biochemistry & Molecular Biology* 119, 3: 513-520

Milanini, J., Fayad, R., Partisani, M., Lecine, P., Borg, J-P., Franco, M. and Luton, F. (2017). EFA6 regulates lumen formation through alpha-actinin 1. *Journal of Cell Science* 131

Milanini, J., Fayad, R., Partisani, M., Lecine, P., Borg, J-P., Franco, M. and Luton, F. (2017). EFA6 regulates lumen formation through alpha-actinin 1. *Journal of Cell Science* 131

O'Reilly, E. L. and Eckersall, P. D. (2014). Acute phase proteins: a review of their function, behaviour and measurement in chickens. *World's Poultry Science* 70, 1: 27-44

Pankov, R. and Yamada, K. M. (2002). Fibronectin at a glance. *Journal of Cell Science* 115: 3861-3863

Scanes, C. G. (2007). The global importance of poultry. *Poultry Science* 86, 6: 1057-1058

Sun S C, Greenstein S M, Schechner R S, Sablay L B, Veith, F J and Tellis V A (1991). Superoxide dismutase: enhanced small intestinal preservation. *Journal of surgical research* 52, 583-590

Teirlynck, E., De Gussem, M., Dewulf, J., Haesebrouck, F., Ducatelle, R. and Van Immerseel, F. (2011). Morphometric evaluation of "dysbacteriosis" in broilers. *Avian Pathology* 40, 2: 139-144

Thomas, S., Prabhu, R. and Balasubramanian, K. A. (2018). Retinoid metabolism in the rat small intestine. *British Journal of Nutrition* 93: 59-63

Wang, L., Llorente, C., Hartmann, P., Yang, A. M., Chen, P. and Schnabl, B. (2015). Methods to determine intestinal permeability and bacterial translocation during liver disease. *Journal of Immunological Methods* 421: 44-53

Yamauchi, K. (2002). Histological Alterations Related with Intestinal Function. *The Journal of Poultry Science* 39, 4: 229-242

Yegani, M. and Korver, D. R. (2008). Factors Affecting Intestinal Health in Poultry. *Poultry Science* 87, 10: 2052-2063

Yoshioka, M., Erickson, R. H., Woodley, J. F., Gulli, R., Guan, D. and Kim, Y. S. (1987). Role of rat intestinal brush-border membrane angiotensin-converting enzyme in dietary protein digestion. *American Journal of Physiology* 253: G781-786

The invention claimed is:

1. A method comprising:
providing a fecal sample or an intestinal content sample obtained from a domesticated bird, and quantifying a protein, or a fragment thereof, in the sample,
wherein the protein is selected from the group consisting of myeloid protein 1, ovoinhibitor, immunoglobulin lambda chain C region, and immunoglobulin lambda chain V-1 region.

2. The method according to claim 1, wherein the protein is selected from the group consisting of myeloid protein 1 and ovoinhibitor.

3. The method according to claim 2, further comprising measuring villus length in the duodenum of the domesticated bird, and/or by measuring villus-to-crypt ratio in the duodenum of the domesticated bird, and/or by measuring T-lymphocyte infiltration in the villi, and/or by scoring the macroscopic gut appearance of the domesticated bird.

4. The method according to claim 3, further comprising:
administering an antibiotic treatment to the domesticated bird.

5. The method according to claim 1, further comprising detecting an increased level of the selected protein present in the fecal or intestinal content sample over a level found in fecal or intestinal content samples of healthy control animals.

6. The method according to claim 5, further comprising: administering an antibiotic treatment to the domesticated bird.

7. The method according to claim 1, wherein the intestinal content sample is a colonic content sample.

8. The method according to claim 1,
wherein the protein is a fragment of myeloid protein 1 comprising at least one of the following peptides: APFSGELSGPVK (SEQ ID NO:10), APFSGQLSGPIR (SEQ ID NO:11), FSGELSGPVK (SEQ ID NO:12), HGQIQK (SEQ ID NO:13), SDPTSNLER (SEQ ID NO: 14), SGELSGPVK (SEQ ID NO:15), SGQLSGPIR (SEQ ID NO:16), VFPGIISHI (SEQ ID NO:17), VFPGIVSH (SEQ ID NO:18), and VFPGIVSHI (SEQ ID (SEQ ID NO: 19); or
wherein the protein is a fragment of ovoinhibitor comprising at least one of the following peptides: EHGANVEK (SEQ ID NO:113), TLNLVSMAAC (SEQ ID NO:114), and TLVACPR (SEQ ID NO:115).

9. The method according to claim 1, wherein the domesticated bird is a broiler.

* * * * *

SEQUENCE LISTING

<160> NUMBER OF SEQ ID NOS: 255

<210> SEQ ID NO 1
<211> LENGTH: 326
<212> TYPE: PRT
<213> ORGANISM: Gallus gallus

<400> SEQUENCE: 1

Gln Gly Lys Gly Glu Lys His Lys Gly Val Asp Val Ile Cys Thr Asp
1               5                   10                  15

Gly Ser Ile Val Tyr Ala Pro Phe Ser Gly Gln Leu Ser Gly Pro Ile
            20                  25                  30

Arg Phe Phe His Asn Gly Asn Ala Ile Asp Asp Gly Val Gln Ile Ser
            35                  40                  45

Gly Ser Gly Tyr Cys Val Lys Leu Val Cys Ile His Pro Ile Arg Tyr
        50                  55                  60

His Gly Gln Ile Gln Lys Gly Gln Gln Leu Gly Arg Met Leu Pro Met
65                  70                  75                  80

Gln Lys Val Phe Pro Gly Ile Val Ser His Ile His Val Glu Asn Cys
                85                  90                  95

Asp Gln Ser Asp Pro Thr His Leu Leu Arg Pro Ile Pro Asp Ile Ser
            100                 105                 110

Pro Pro Phe Pro Gln Gln Asp Ala His Trp Ala Val Val Cys Ala Gly
        115                 120                 125

Asn Pro Thr Asn Glu Ile Arg Gly Cys Asp Lys Tyr Gly Cys Gly Tyr
    130                 135                 140

Phe Gly Ala Pro Arg Arg Asn Gly Lys Gly Glu Lys His Lys Gly Val
145                 150                 155                 160

Asp Val Ile Cys Ala Asp Gly Ala Thr Val Tyr Ala Pro Phe Ser Gly
                165                 170                 175

Glu Leu Ser Gly Pro Val Lys Phe Phe His Asn Gly Asn Ala Ile Asp
            180                 185                 190

Asp Gly Val Gln Ile Arg Gly Ser Gly Phe Cys Val Lys Leu Leu Cys
        195                 200                 205

Ile His Pro Ile Arg Tyr Asn Gly Arg Ile Ser Lys Gly Gln Val Leu
    210                 215                 220

Gly Arg Met Leu Pro Met Gln Arg Val Phe Pro Gly Ile Ile Ser His
225                 230                 235                 240

Met Pro Ala Leu Ser Leu Ile Ala Leu Leu Ser Leu Val Ser Thr Ala
                245                 250                 255

Phe Ala Arg Gln Trp Glu Val His Pro Pro Gln Gln Gln Gly Arg His
            260                 265                 270

Trp Ala Gln Ile Cys Ser Gly Asn Pro Phe Asn Arg Ile Arg Gly Cys
        275                 280                 285

Asp Arg Tyr Gly Cys Gly Asn Tyr Gly Ala Ser Arg Ile His Val Glu
    290                 295                 300

Asn Cys Asp Arg Ser Asp Pro Thr Ser Asn Leu Glu Arg Gly Lys Gly
305                 310                 315                 320

Glu Ser Glu Met Glu Val
                325

<210> SEQ ID NO 2
<211> LENGTH: 1256
<212> TYPE: PRT
<213> ORGANISM: Gallus gallus

```
<400> SEQUENCE: 2

Pro Leu Asp Gln Cys Gln Asp Ser Glu Thr Arg Thr Phe Tyr Gln Ile
1               5                   10                  15

Gly Asp Ser Trp Glu Lys Tyr Val His Gly Val Arg Tyr Gln Cys Tyr
                20                  25                  30

Cys Tyr Gly Arg Gly Ile Gly Glu Trp His Cys Gln Pro Leu Gln Ala
            35                  40                  45

Tyr Ala Pro Leu Ser Pro Pro Thr Asn Leu Arg Leu Glu Pro Asn Pro
        50                  55                  60

Asp Thr Gly Ile Leu Ile Val Ser Trp Asp Arg Ser Thr Thr Pro Gly
65                  70                  75                  80

Ile Ser Gly Tyr Arg Val Thr Thr Ala Pro Thr Asn Gly Gln Gln Gly
                85                  90                  95

Ser Thr Leu Glu Glu Val Val Gly Ala Asp Gln Thr Ser Cys Thr Phe
            100                 105                 110

Glu Asn Leu Asn Pro Gly Val Glu Tyr Asn Val Ser Val Tyr Ala Val
        115                 120                 125

Lys Asp Asp Gln Glu Ser Ile Pro Ile Ser Lys Thr Ile Thr Gln Glu
130                 135                 140

Val Pro Gln Leu Thr Asp Leu Ser Phe Val Asp Ile Thr Asp Ser Ser
145                 150                 155                 160

Ile Gly Leu Arg Trp Thr Pro Leu Asn Ala Ser Thr Ile Ile Gly Tyr
                165                 170                 175

Arg Ile Thr Val Val Ala Ala Gly Glu Ser Val Pro Ile Phe Glu Asp
            180                 185                 190

Phe Val Asp Ser Ser Val Gly Tyr Tyr Thr Val Thr Gly Leu Glu Pro
        195                 200                 205

Gly Ile Asp Tyr Asp Ile Ser Val Ile Thr Leu Ile Asn Gly Gly Glu
        210                 215                 220

Ser Ala Pro Thr Thr Leu Thr Gln Gln Thr Ala Val Pro Pro Pro Thr
225                 230                 235                 240

Asp Leu Arg Phe Thr Asn Val Gly Pro Asp Thr Met Arg Val Thr Trp
                245                 250                 255

Thr Ala Pro Thr Ser Ile Val Leu Ser Ser Phe Leu Val Arg Tyr Ser
            260                 265                 270

Pro Val Lys Lys Glu Glu Asp Val Ala Glu Leu Thr Ile Ser Pro Ser
        275                 280                 285

Asp Asn Val Val Leu Thr Asn Leu Leu Pro Gly Thr Glu Tyr Leu Val
290                 295                 300

Val Arg Val Tyr Ser Val Ala Glu Gln His Glu Ser Ala Pro Leu Ser
305                 310                 315                 320

Gly Ile Gln Lys Thr Gly Leu Asp Ser Pro Thr Gly Leu Asp Phe Ser
                325                 330                 335

Asp Ile Thr Ala Asn Ser Phe Thr Val His Trp Ile Ala Pro Arg Ala
            340                 345                 350

Thr Ile Thr Gly Tyr Lys Ile Arg His His Pro Glu His Gly Val Gly
        355                 360                 365

Arg Pro Lys Glu Asp Arg Val Pro Pro Ser Arg Asn Ser Ile Thr Leu
        370                 375                 380

Thr Asn Leu Leu Pro Gly Thr Glu Tyr Val Val Ser Ile Ile Ala Val
385                 390                 395                 400

Asn Gly Arg Glu Glu Ser Val Pro Leu Val Gly Gln Gln Thr Thr Val
                405                 410                 415
```

-continued

```
Ser Asp Val Pro Arg Asp Leu Glu Val Asn Pro Thr Ser Pro Thr Ser
            420                 425                 430

Leu Glu Ile Ser Trp Asp Ala Pro Ala Val Thr Val Arg Tyr Tyr Arg
            435                 440                 445

Ile Thr Tyr Gly Glu Thr Gly Gly Ser Ser Pro Val Gln Glu Phe Thr
            450                 455                 460

Val Pro Gly Thr Met Ser Arg Ala Thr Ile Thr Gly Leu Lys Pro Gly
465                 470                 475                 480

Val Asp Tyr Thr Ile Thr Val Tyr Ala Val Thr Gly Arg Gly Asp Ser
                485                 490                 495

Pro Ala Ser Ser Lys Pro Val Thr Val Thr Tyr Lys Thr Glu Ile Asp
            500                 505                 510

Thr Pro Ser Gln Met Gln Val Thr Asp Val Gln Asp Asn Ser Ile Ser
            515                 520                 525

Ile Arg Trp Leu Pro Ser Ser Ser Pro Val Thr Gly Tyr Arg Val Thr
            530                 535                 540

Ala Val Pro Lys Lys Gly His Gly Pro Thr Lys Thr Lys Asn Val Pro
545                 550                 555                 560

Pro Asp Gln Thr Gln Val Thr Ile Glu Gly Leu Gln Pro Thr Val Glu
                565                 570                 575

Tyr Met Val Ser Val Tyr Ala Gln Asn Gln Asn Gly Glu Ser Leu Pro
            580                 585                 590

Leu Val Glu Thr Ala Val Thr Asn Ile Asp Arg Pro Lys Gly Leu Thr
            595                 600                 605

Phe Thr Glu Val Asp Val Asp Ser Ile Lys Ile Ala Trp Glu Ser Pro
            610                 615                 620

Gln Gly Gln Val Thr Arg Tyr Arg Val Thr Tyr Ser Ser Pro Glu Asp
625                 630                 635                 640

Gly Ile His Glu Leu Leu Pro Ala Pro Gly Gly Glu Glu Asp Thr Ala
                645                 650                 655

Glu Leu His Gly Leu Arg Pro Gly Ser Glu Tyr Thr Ile Asn Ile Val
            660                 665                 670

Ala Ile Tyr Asp Asp Met Glu Ser Leu Pro Leu Thr Gly Thr Gln Ser
            675                 680                 685

Thr Ala Ile Pro Pro Pro Thr Asn Leu Lys Phe Thr Gln Val Thr Pro
690                 695                 700

Thr Ser Leu Thr Val Asn Trp Asn Ala Pro Asn Val Arg Leu Thr Gly
705                 710                 715                 720

Tyr Arg Val Arg Val Asn Pro Lys Glu Lys Thr Gly Pro Met Lys Glu
                725                 730                 735

Ile Asn Leu Ser Pro Asp Ser Thr Ser Ala Val Val Ser Gly Leu Met
            740                 745                 750

Val Ala Thr Lys Tyr Glu Val Ser Val Tyr Ala Leu Lys Asp Ser Leu
            755                 760                 765

Thr Ser Arg Pro Ala Gln Gly Val Val Thr Thr Leu Glu Asn Val Ser
            770                 775                 780

Pro Pro Arg Arg Ala Arg Val Thr Asp Ala Thr Glu Thr Thr Ile Thr
785                 790                 795                 800

Ile Thr Trp Arg Thr Lys Thr Glu Thr Ile Thr Gly Phe Gln Ile Asp
                805                 810                 815

Ala Ile Pro Ala Ala Ser Gly Gln Asn Pro Ile Gln Arg Thr Ile Ser
            820                 825                 830
```

-continued

```
Pro Asp Val Arg Thr Tyr Thr Ile Thr Gly Leu Gln Pro Gly Asn Asp
            835                 840                 845

Tyr Lys Ile Tyr Leu Tyr Thr Leu Asn Glu Asn Ala Arg Ser Ser Pro
    850                 855                 860

Val Val Ile Asp Ala Ser Thr Ala Ile Asp Ala Pro Ser Asn Leu Arg
865                 870                 875                 880

Phe Leu Thr Thr Thr Thr Asn Ser Leu Leu Ala Ser Trp Gln Pro Pro
                885                 890                 895

Arg Ala Lys Ile Thr Gly Tyr Ile Ile Arg Tyr Asp Lys Pro Gly Ser
            900                 905                 910

Pro Ala Lys Glu Leu Leu Pro Arg Pro Arg Pro Gly Thr Thr Glu Ala
            915                 920                 925

Thr Ile Thr Gly Leu Glu Pro Gly Thr Glu Tyr Thr Ile Tyr Ile Ile
        930                 935                 940

Ala Val Lys Asn Asn Gln Lys Ser Glu Pro Leu Val Gly Arg Lys Arg
945                 950                 955                 960

Thr Asp Asp Leu Pro Thr Leu Ile Thr Gly Pro His Pro Asn Gln Pro
                965                 970                 975

Asp Met Leu Asp Val Pro Ser Val Asp Glu Gly Thr Pro Tyr Leu Thr
            980                 985                 990

Asn Asn Arg Tyr Asp Asn Gly Asn Gly Ile Gln Leu Pro Gly Thr Ser
            995                 1000                 1005

Gly His Pro Gln Thr Ile Gly His Gly Gln Gln Val Phe Phe
    1010                 1015                 1020

Glu Glu His Gly Tyr Arg Arg Pro Val Pro Thr Thr Ala Thr Pro
    1025                 1030                 1035

Leu Arg Pro Gly Ser Arg Arg Gln Pro Pro Asn Val Asp Glu Ala
    1040                 1045                 1050

Ile Glu Ile Pro Gly Tyr Gln Val Pro Ile Ile Val Val Pro Ser
    1055                 1060                 1065

Tyr Pro His Ser Arg Glu Pro Arg Arg Asn Asp Thr Thr Gly Gln
    1070                 1075                 1080

Glu Ala Leu Ser Gln Thr Thr Ile Ser Trp Arg Pro Leu Leu Glu
    1085                 1090                 1095

Ser Thr Glu Tyr Ile Ile Ser Cys Gln Pro Val Ser Gln Asp Glu
    1100                 1105                 1110

Asp Thr Leu Gln Phe Arg Val Pro Gly Thr Ser Ser Ser Ala Thr
    1115                 1120                 1125

Leu Thr Gly Leu Thr Arg Gly Ala Thr Tyr Asn Ile Ile Val Glu
    1130                 1135                 1140

Ala Leu Lys Asp His Arg Arg Gln Lys Val Leu Glu Glu Val Val
    1145                 1150                 1155

Thr Val Gly Asn Thr Val Ser Glu Gly Leu Asn Gln Pro Ala Asp
    1160                 1165                 1170

Asp Thr Cys Tyr Asp Thr Tyr Thr Gly Ser Phe Tyr Ser Ile Gly
    1175                 1180                 1185

Glu Glu Trp Glu Arg Leu Ser Glu Thr Gly Phe Lys Leu Trp Cys
    1190                 1195                 1200

Gln Cys Leu Gly Phe Gly Ser Gly His Phe Arg Cys Asp Ser Ser
    1205                 1210                 1215

Lys Trp Cys His Asp Asn Gly Val Asn Tyr Lys Ile Gly Glu Lys
    1220                 1225                 1230

Trp Asp Arg Gln Gly Glu Asn Gly Gln Met Ile Asp Cys Thr Cys
```

```
               1235              1240              1245
Leu Gly  Asn Gly Lys Gly Glu  Phe
   1250              1255
```

<210> SEQ ID NO 3
<211> LENGTH: 321
<212> TYPE: PRT
<213> ORGANISM: Gallus gallus

<400> SEQUENCE: 3

```
Met Ala Lys Tyr Thr Arg Gly Thr Val Thr Ala Phe Ser Pro Phe Asp
1               5                   10                  15

Ala Arg Ala Asp Ala Glu Ala Leu Arg Lys Ala Met Lys Gly Met Gly
            20                  25                  30

Thr Asp Glu Glu Thr Ile Leu Lys Ile Leu Thr Ser Arg Asn Asn Ala
        35                  40                  45

Gln Arg Gln Glu Ile Ala Ser Ala Phe Lys Thr Leu Phe Gly Arg Asp
    50                  55                  60

Leu Val Asp Asp Leu Lys Ser Glu Leu Thr Gly Lys Phe Glu Thr Leu
65                  70                  75                  80

Met Val Ser Leu Met Arg Pro Ala Arg Ile Phe Asp Ala His Ala Leu
                85                  90                  95

Lys His Ala Ile Lys Gly Ala Gly Thr Asn Glu Lys Val Leu Thr Glu
            100                 105                 110

Ile Leu Ala Ser Arg Thr Pro Ala Glu Val Gln Asn Ile Lys Gln Val
        115                 120                 125

Tyr Met Gln Glu Tyr Glu Ala Asn Leu Glu Asp Lys Ile Thr Gly Glu
    130                 135                 140

Thr Ser Gly His Phe Gln Arg Leu Leu Val Val Leu Leu Gln Ala Asn
145                 150                 155                 160

Arg Asp Pro Asp Gly Arg Val Asp Glu Ala Leu Val Glu Lys Asp Ala
                165                 170                 175

Gln Val Leu Phe Arg Ala Gly Glu Leu Lys Trp Gly Thr Asp Glu Glu
            180                 185                 190

Thr Phe Ile Thr Ile Leu Gly Thr Arg Ser Val Ser His Leu Arg Arg
        195                 200                 205

Val Phe Asp Lys Tyr Met Thr Ile Ser Gly Phe Gln Ile Glu Glu Thr
    210                 215                 220

Ile Asp Arg Glu Thr Ser Gly Asp Leu Glu Lys Leu Leu Leu Ala Val
225                 230                 235                 240

Val Lys Cys Ile Arg Ser Val Pro Ala Tyr Phe Ala Glu Thr Leu Tyr
                245                 250                 255

Tyr Ser Met Lys Gly Ala Gly Thr Asp Asp Asp Thr Leu Ile Arg Val
            260                 265                 270

Met Val Ser Arg Ser Glu Ile Asp Leu Leu Asp Ile Arg His Glu Phe
        275                 280                 285

Arg Lys Asn Phe Ala Lys Ser Leu Tyr Gln Met Ile Gln Lys Asp Thr
    290                 295                 300

Ser Gly Asp Tyr Arg Lys Ala Leu Leu Leu Leu Cys Gly Gly Asp Asp
305                 310                 315                 320

Glu
```

<210> SEQ ID NO 4
<211> LENGTH: 294
<212> TYPE: PRT

-continued

<213> ORGANISM: Gallus gallus

<400> SEQUENCE: 4

Met Glu Asp Ser Ala Met Asp Met Glu Ser Met Gly Pro Leu Arg Pro
1               5                   10                  15

Gln Thr Phe Leu Phe Gly Cys Glu Leu Lys Ala Glu Lys Glu Tyr Gln
            20                  25                  30

Phe Lys Val Asp Asp Glu Glu Asn Glu His Gln Leu Ser Leu Arg Thr
        35                  40                  45

Val Thr Leu Gly Ala Gly Ala Lys Asp Glu Leu His Val Val Glu Ala
    50                  55                  60

Glu Ala Leu Asp Tyr Glu Gly Asn Pro Thr Lys Val Val Leu Ala Ser
65                  70                  75                  80

Leu Lys Met Ser Val Gln Pro Thr Val Ser Leu Gly Gly Phe Glu Ile
                85                  90                  95

Thr Pro Pro Phe Val Leu Arg Leu Lys Cys Gly Ser Gly Pro Val Tyr
            100                 105                 110

Val Ser Gly Gln His Leu Val Ala Leu Glu Glu Pro Glu Ser Glu
        115                 120                 125

Asp Glu Glu Asp Thr Lys Ile Gly Asn Ala Ser Thr Lys Arg Pro
130                 135                 140

Ala Ser Gly Gly Ala Lys Thr Pro Gln Lys Lys Pro Lys Leu Ser
145                 150                 155                 160

Glu Asp Asp Glu Asp Asp Glu Asp Asp Asp Glu Asp Asp
                165                 170                 175

Glu Asp Asp Leu Asp Asp Glu Glu Ile Lys Thr Pro Met Lys
                180                 185                 190

Lys Pro Ala Arg Glu Pro Ala Gly Lys Asn Met Gln Lys Ala Lys Gln
            195                 200                 205

Asn Gly Lys Asp Ser Lys Pro Ser Thr Pro Ala Ser Lys Thr Lys Thr
210                 215                 220

Pro Asp Ser Lys Lys Asp Lys Ser Leu Thr Pro Lys Thr Pro Lys Val
225                 230                 235                 240

Pro Leu Ser Leu Glu Glu Ile Lys Ala Lys Met Gln Ala Ser Val Asp
                245                 250                 255

Lys Gly Cys Ser Leu Pro Lys Leu Glu Pro Lys Phe Ala Asn Tyr Val
            260                 265                 270

Lys Asn Cys Phe Arg Thr Glu Asp Gln Lys Val Ile Gln Ala Leu Trp
        275                 280                 285

Gln Trp Arg Gln Thr Leu
    290

<210> SEQ ID NO 5
<211> LENGTH: 260
<212> TYPE: PRT
<213> ORGANISM: Gallus gallus

<400> SEQUENCE: 5

Met Ser His His Trp Gly Tyr Asp Ser His Asn Gly Pro Ala His Trp
1               5                   10                  15

His Glu His Phe Pro Ile Ala Asn Gly Glu Arg Gln Ser Pro Ile Ala
            20                  25                  30

Ile Ser Thr Lys Ala Ala Arg Tyr Asp Pro Ala Leu Lys Pro Leu Ser
        35                  40                  45

Phe Ser Tyr Asp Ala Gly Thr Ala Lys Ala Ile Val Asn Asn Gly His

```
                 50                  55                  60
Ser Phe Asn Val Glu Phe Asp Asp Ser Asp Lys Ser Val Leu Gln
 65                  70                  75                  80

Gly Gly Ala Leu Asp Gly Val Tyr Arg Leu Val Gln Phe His Ile His
                 85                  90                  95

Trp Gly Ser Cys Glu Gly Gln Gly Ser Glu His Thr Val Asp Gly Val
                100                 105                 110

Lys Tyr Asp Ala Glu Leu His Ile Val His Trp Asn Val Lys Tyr Gly
                115                 120                 125

Lys Phe Ala Glu Ala Leu Lys His Pro Asp Gly Leu Ala Val Val Gly
                130                 135                 140

Ile Phe Met Lys Val Gly Asn Ala Lys Pro Glu Ile Gln Lys Val Val
145                 150                 155                 160

Asp Ala Leu Asn Ser Ile Gln Thr Lys Gly Lys Gln Ala Ser Phe Thr
                165                 170                 175

Asn Phe Asp Pro Thr Gly Leu Leu Pro Pro Cys Arg Asp Tyr Trp Thr
                180                 185                 190

Tyr Pro Gly Ser Leu Thr Thr Pro Pro Leu His Glu Cys Val Ile Trp
                195                 200                 205

His Val Leu Lys Glu Pro Ile Thr Val Ser Ser Glu Gln Met Cys Lys
                210                 215                 220

Leu Arg Gly Leu Cys Phe Ser Ala Glu Asn Glu Pro Val Cys Arg Met
225                 230                 235                 240

Val Asp Asn Trp Arg Pro Cys Gln Pro Leu Lys Ser Arg Glu Val Arg
                245                 250                 255

Ala Ser Phe Gln
                260

<210> SEQ ID NO 6
<211> LENGTH: 972
<212> TYPE: PRT
<213> ORGANISM: Gallus gallus

<400> SEQUENCE: 6

Met Ala Ala Gly Phe Phe Ile Ser Lys Ser Val Gly Ile Val Gly Ile
  1               5                  10                  15

Val Leu Ala Leu Gly Ala Val Ala Thr Ile Ile Ala Leu Ser Val Val
                 20                  25                  30

Tyr Ala Gln Glu Lys Asn Lys Ser Ser Gly Ser Gly Gly Ser Asp
                 35                  40                  45

Thr Thr Ser Thr Thr Thr Ala Ser Thr Thr Thr Ser Thr Thr Thr
 50                  55                  60

Ala Ser Thr Thr Ala Ala Pro Asn Asn Pro Trp Asn Arg Trp Arg Leu
 65                  70                  75                  80

Pro Thr Ala Leu Lys Pro Glu Ser Tyr Glu Val Thr Leu Gln Pro Phe
                 85                  90                  95

Leu Thr Pro Asp Asp Asn Met Tyr Ile Phe Lys Gly Asn Ser Ser
                100                 105                 110

Val Val Phe Leu Cys Glu Glu Ala Thr Asp Leu Ile Leu Ile His Ser
                115                 120                 125

Asn Lys Leu Asn Tyr Thr Leu Gln Gly Gly Phe His Ala Ser Leu His
                130                 135                 140

Ala Val Asn Gly Ser Thr Pro Pro Thr Ile Ser Asn Thr Trp Leu Glu
145                 150                 155                 160
```

```
Thr Asn Thr Gln Tyr Leu Val Leu Gln Leu Ala Gly Pro Leu Gln Gln
            165                 170                 175
Gly Gln His Tyr Arg Leu Phe Ser Ile Phe Thr Gly Glu Leu Ala Asp
        180                 185                 190
Asp Leu Ala Gly Phe Tyr Arg Ser Glu Tyr Thr Glu Gly Asn Val Thr
    195                 200                 205
Lys Val Val Ala Thr Thr Gln Met Gln Ala Pro Asp Ala Arg Lys Ala
210                 215                 220
Phe Pro Cys Phe Asp Glu Pro Ala Met Lys Ala Val Phe Thr Val Thr
225                 230                 235                 240
Met Ile His Pro Ser Asp His Thr Ala Ile Ser Asn Met Pro Val His
            245                 250                 255
Ser Thr Tyr Gln Leu Gln Met Asp Gly Gln Ser Trp Asn Val Thr Gln
            260                 265                 270
Phe Asp Pro Thr Pro Arg Met Ser Thr Tyr Leu Leu Ala Phe Ile Val
        275                 280                 285
Ser Gln Phe Asp Tyr Val Glu Asn Asn Thr Gly Lys Val Gln Ile Arg
    290                 295                 300
Ile Trp Gly Arg Pro Ala Ala Ile Ala Glu Gly Gln Gly Glu Tyr Ala
305                 310                 315                 320
Leu Glu Lys Thr Gly Pro Ile Leu Ser Phe Phe Glu Arg His Tyr Asn
            325                 330                 335
Thr Ala Tyr Pro Leu Pro Lys Ser Asp Gln Val Gly Leu Pro Asp Phe
            340                 345                 350
Asn Ala Gly Ala Met Glu Asn Trp Gly Leu Val Thr Tyr Arg Glu Asn
        355                 360                 365
Ser Leu Leu Tyr Asp Asn Ala Tyr Ser Ser Ile Gly Asn Lys Glu Arg
    370                 375                 380
Val Val Thr Val Ile Ala His Glu Leu Ala His Gln Trp Phe Gly Asn
385                 390                 395                 400
Leu Val Thr Leu Arg Trp Trp Asn Asp Leu Trp Leu Asn Glu Gly Phe
            405                 410                 415
Ala Ser Tyr Val Glu Tyr Leu Gly Ala Asp Ser Ala Glu Pro Thr Trp
            420                 425                 430
Asp Ile Lys Asp Leu Met Val Leu Asn Glu Leu Tyr Thr Val Met Ala
        435                 440                 445
Thr Asp Ala Leu Thr Thr Ser His Pro Leu Thr Phe Arg Glu Asp Glu
    450                 455                 460
Ile Asn Thr Pro Ala Gln Ile Ser Glu Val Phe Asp Ser Ile Ala Tyr
465                 470                 475                 480
Ser Lys Gly Ala Ser Val Leu Arg Met Leu Ser Asp Phe Leu Thr Glu
            485                 490                 495
Asp Val Phe Lys Glu Gly Leu Gln Ser Tyr Leu His Asp Phe Ser Tyr
            500                 505                 510
Asn Asn Thr Val Tyr Thr Asp Leu Trp Asp His Leu Gln Glu Ala Val
        515                 520                 525
Asn Lys Asn Ser Val Pro Leu Pro Asp Ser Ile Gly Ala Ile Met Asp
    530                 535                 540
Arg Trp Thr Leu Gln Met Gly Phe Pro Val Val Thr Val Asn Thr Leu
545                 550                 555                 560
Thr Gly Ser Val Gln Gln Ser His Phe Leu Leu Asp Ser Asn Ser Thr
            565                 570                 575
Val Glu Arg Pro Ser Val Phe Asn Tyr Thr Trp Ile Val Pro Ile Thr
```

```
                580             585             590
Trp Met Thr Pro Ser Arg Thr Gly Asp Arg Tyr Trp Leu Val Asp Val
            595             600             605
Ser Ala Thr Asn Ser Asp Phe Ser Val Gly Ser Ser Thr Trp Leu Leu
610             615             620
Leu Asn Leu Asn Val Ser Gly Tyr Phe Arg Val Asn Tyr Asn Gln Glu
625             630             635             640
Asn Trp Asp Gln Leu Leu Gln Gln Leu Ser Asn Asn His Gln Ala Ile
            645             650             655
Pro Val Ile Asn Arg Ala Gln Ile Ile Asp Asp Ala Phe Asn Leu Ala
            660             665             670
Arg Ala Gln Gln Val Ser Val Thr Leu Ala Leu Asn Thr Thr Arg Phe
            675             680             685
Leu Ser Gly Glu Thr Ala Tyr Met Pro Trp Gln Ala Ala Leu Asn Asn
            690             695             700
Leu Gln Tyr Phe Gln Leu Met Phe Asp Arg Ser Glu Val Phe Gly Ala
705             710             715             720
Met Thr Lys Tyr Ile Gln Lys Gln Val Thr Pro Leu Phe Glu Tyr Tyr
            725             730             735
Arg Thr Ala Thr Asn Asn Trp Thr Ala Ile Pro Ser Ala Leu Met Asp
            740             745             750
Gln Tyr Asn Glu Ile Asn Ala Ile Ser Thr Ala Cys Ser Tyr Gly Ile
            755             760             765
Ala Glu Cys Gln Gln Leu Ala Thr Ala Leu Tyr Gln Gln Trp Arg Gln
            770             775             780
Asn Val Ser Asn Asn Pro Ile Ala Pro Asn Leu Arg Ser Ala Ile Tyr
785             790             795             800
Cys Ser Ala Val Ala Thr Gly Gly Glu Glu Val Trp Asp Phe Ile Trp
            805             810             815
Glu Arg Phe Leu Glu Ala Pro Val Val Ser Glu Ala Asp Lys Leu Arg
            820             825             830
Thr Ala Leu Thr Cys Ser Thr Glu Thr Trp Ile Leu Gln Arg Tyr Leu
            835             840             845
Gln Tyr Thr Ile Asp Pro Thr Lys Ile Arg Lys Gln Asp Ala Thr Ser
            850             855             860
Thr Ile Asn Ser Ile Ala Ser Asn Val Val Gly Gln Pro Leu Ala Trp
865             870             875             880
Asp Phe Ile Arg Ser Asn Trp Arg Thr Leu Phe Gly Gln Tyr Gly Gly
            885             890             895
Gly Ser Phe Ser Phe Ser Arg Leu Ile Ser Ala Val Thr Gln Arg Phe
            900             905             910
Asn Thr Glu Phe Glu Leu Lys Gln Leu Glu Gln Phe Lys Ala Asp Asn
            915             920             925
Gln Asp Ile Gly Phe Gly Ser Gly Thr Arg Ala Leu Glu Gln Ala Leu
            930             935             940
Glu Arg Thr Arg Thr Asn Ile Asn Trp Val Lys Glu Asn Lys Glu Val
945             950             955             960
Val His Ala Trp Phe Arg Ala Glu Thr Ala Ser Ser
            965             970

<210> SEQ ID NO 7
<211> LENGTH: 150
<212> TYPE: PRT
<213> ORGANISM: Gallus gallus
```

```
<400> SEQUENCE: 7

Met Ala Phe His Ser Thr Leu Leu Val Phe Leu Ala Gly Leu Val Phe
1               5                   10                  15

Leu Ser Glu Ala Ala Pro Leu Val Ser His Gly Ser Val Asp Ser Lys
            20                  25                  30

Cys Pro Leu Met Val Lys Val Leu Asp Ala Val Arg Gly Ser Pro Ala
        35                  40                  45

Ala Asn Val Ala Val Lys Val Phe Lys Lys Ala Ala Asp Gly Thr Trp
    50                  55                  60

Gln Asp Phe Ala Thr Gly Lys Thr Thr Glu Phe Gly Glu Ile His Glu
65                  70                  75                  80

Leu Thr Thr Glu Glu Gln Phe Val Gly Val Tyr Arg Val Glu Phe
                85                  90                  95

Asp Thr Ser Ser Tyr Trp Lys Gly Leu Gly Leu Ser Pro Phe His Glu
                100                 105                 110

Tyr Ala Asp Val Val Phe Thr Ala Asn Asp Ser Gly His Arg His Tyr
            115                 120                 125

Thr Ile Ala Ala Leu Leu Ser Pro Phe Ser Tyr Ser Thr Thr Ala Val
130                 135                 140

Val Ser Asp Pro Gln Glu
145                 150

<210> SEQ ID NO 8
<211> LENGTH: 472
<212> TYPE: PRT
<213> ORGANISM: Gallus gallus

<400> SEQUENCE: 8

Met Arg Thr Ala Arg Gln Phe Val Gln Val Ala Leu Ala Leu Cys Cys
1               5                   10                  15

Phe Ala Asp Ile Ala Phe Gly Ile Glu Val Asn Cys Ser Leu Tyr Ala
            20                  25                  30

Ser Gly Ile Gly Lys Asp Gly Thr Ser Trp Val Ala Cys Pro Arg Asn
        35                  40                  45

Leu Lys Pro Val Cys Gly Thr Asp Gly Ser Thr Tyr Ser Asn Glu Cys
    50                  55                  60

Gly Ile Cys Leu Tyr Asn Arg Glu His Gly Ala Asn Val Glu Lys Glu
65                  70                  75                  80

Tyr Asp Gly Glu Cys Arg Pro Lys His Val Met Ile Asp Cys Ser Pro
                85                  90                  95

Tyr Leu Gln Val Val Arg Asp Gly Asn Thr Met Val Ala Cys Pro Arg
                100                 105                 110

Ile Leu Lys Pro Val Cys Gly Ser Asp Ser Phe Thr Tyr Asp Asn Glu
            115                 120                 125

Cys Gly Ile Cys Ala Tyr Asn Ala Glu His His Thr Asn Ile Ser Lys
130                 135                 140

Leu His Asp Gly Glu Cys Lys Leu Glu Ile Gly Ser Val Asp Cys Ser
145                 150                 155                 160

Lys Tyr Pro Ser Thr Val Ser Lys Asp Gly Arg Thr Leu Val Ala Cys
                165                 170                 175

Pro Arg Ile Leu Ser Pro Val Cys Gly Thr Asp Gly Phe Thr Tyr Asp
            180                 185                 190

Asn Glu Cys Gly Ile Cys Ala His Asn Ala Glu Gln Arg Thr His Val
                195                 200                 205
```

```
Ser Lys Lys His Asp Gly Lys Cys Arg Gln Glu Ile Pro Glu Ile Asp
    210                 215                 220
Cys Asp Gln Tyr Pro Thr Arg Lys Thr Thr Gly Gly Lys Leu Leu Val
225                 230                 235                 240
Arg Cys Pro Arg Ile Leu Leu Pro Val Cys Gly Thr Asp Gly Phe Thr
                245                 250                 255
Tyr Asp Asn Glu Cys Gly Ile Cys Ala His Asn Ala Gln His Gly Thr
            260                 265                 270
Glu Val Lys Lys Ser His Asp Gly Arg Cys Lys Glu Arg Ser Thr Pro
        275                 280                 285
Leu Asp Cys Thr Gln Tyr Leu Ser Asn Thr Gln Asn Gly Glu Ala Ile
    290                 295                 300
Thr Ala Cys Pro Phe Ile Leu Gln Glu Val Cys Gly Thr Asp Gly Val
305                 310                 315                 320
Thr Tyr Ser Asn Asp Cys Ser Leu Cys Ala His Asn Ile Glu Leu Gly
                325                 330                 335
Thr Ser Val Ala Lys Lys His Asp Gly Arg Cys Arg Glu Glu Val Pro
            340                 345                 350
Glu Leu Asp Cys Ser Lys Tyr Lys Thr Ser Thr Leu Lys Asp Gly Arg
        355                 360                 365
Gln Val Val Ala Cys Thr Met Ile Tyr Asp Pro Val Cys Ala Thr Asn
    370                 375                 380
Gly Val Thr Tyr Ala Ser Glu Cys Thr Leu Cys Ala His Asn Leu Glu
385                 390                 395                 400
Gln Arg Thr Asn Leu Gly Lys Arg Lys Asn Gly Arg Cys Glu Glu Asp
                405                 410                 415
Ile Thr Lys Glu His Cys Arg Glu Phe Gln Lys Val Ser Pro Ile Cys
            420                 425                 430
Thr Met Glu Tyr Val Pro His Cys Gly Ser Asp Gly Val Thr Tyr Ser
        435                 440                 445
Asn Arg Cys Phe Phe Cys Asn Ala Tyr Val Gln Ser Asn Arg Thr Leu
    450                 455                 460
Asn Leu Val Ser Met Ala Ala Cys
465                 470

<210> SEQ ID NO 9
<211> LENGTH: 264
<212> TYPE: PRT
<213> ORGANISM: Gallus gallus

<400> SEQUENCE: 9

Met Arg Gly Val Leu Val Thr Leu Ala Val Leu Phe Leu Thr Gly Thr
1               5                   10                  15
Gln Ala Arg Ser Phe Trp Gln His Asp Glu Pro Gln Thr Pro Leu Asp
            20                  25                  30
Arg Ile Arg Asp Met Val Asp Val Tyr Leu Glu Thr Val Lys Ala Ser
        35                  40                  45
Gly Lys Asp Ala Ile Ala Gln Phe Glu Ser Ser Ala Val Gly Lys Gln
    50                  55                  60
Leu Asp Leu Lys Leu Ala Asp Asn Leu Asp Thr Leu Ser Ala Ala Ala
65                  70                  75                  80
Ala Lys Leu Arg Glu Asp Met Ala Pro Tyr Tyr Lys Glu Val Arg Glu
                85                  90                  95
Met Trp Leu Lys Asp Thr Glu Ala Leu Arg Ala Glu Leu Thr Lys Asp
```

-continued

```
                100                 105                 110
Leu Glu Glu Val Lys Glu Lys Ile Arg Pro Phe Leu Asp Gln Phe Ser
        115                 120                 125

Ala Lys Trp Thr Glu Glu Leu Glu Gln Tyr Arg Gln Arg Leu Thr Pro
130                 135                 140

Val Ala Gln Glu Leu Lys Glu Leu Thr Lys Gln Lys Val Glu Leu Met
145                 150                 155                 160

Gln Ala Lys Leu Thr Pro Val Ala Glu Glu Ala Arg Asp Arg Leu Arg
                165                 170                 175

Gly His Val Glu Glu Leu Arg Lys Asn Leu Ala Pro Tyr Ser Asp Glu
            180                 185                 190

Leu Arg Gln Lys Leu Ser Gln Lys Leu Glu Glu Ile Arg Glu Lys Gly
        195                 200                 205

Ile Pro Gln Ala Ser Glu Tyr Gln Ala Lys Val Met Glu Gln Leu Ser
    210                 215                 220

Asn Leu Arg Glu Lys Met Thr Pro Leu Val Gln Glu Phe Arg Glu Arg
225                 230                 235                 240

Leu Thr Pro Tyr Ala Glu Asn Leu Lys Asn Arg Leu Ile Ser Phe Leu
                245                 250                 255

Asp Glu Leu Gln Lys Ser Val Ala
            260
```

<210> SEQ ID NO 10
<211> LENGTH: 12
<212> TYPE: PRT
<213> ORGANISM: Gallus gallus

<400> SEQUENCE: 10

```
Ala Pro Phe Ser Gly Glu Leu Ser Gly Pro Val Lys
1               5                   10
```

<210> SEQ ID NO 11
<211> LENGTH: 12
<212> TYPE: PRT
<213> ORGANISM: Gallus gallus

<400> SEQUENCE: 11

```
Ala Pro Phe Ser Gly Gln Leu Ser Gly Pro Ile Arg
1               5                   10
```

<210> SEQ ID NO 12
<211> LENGTH: 10
<212> TYPE: PRT
<213> ORGANISM: Gallus gallus

<400> SEQUENCE: 12

```
Phe Ser Gly Glu Leu Ser Gly Pro Val Lys
1               5                   10
```

<210> SEQ ID NO 13
<211> LENGTH: 6
<212> TYPE: PRT
<213> ORGANISM: Gallus gallus

<400> SEQUENCE: 13

```
His Gly Gln Ile Gln Lys
1               5
```

<210> SEQ ID NO 14
<211> LENGTH: 9

```
<212> TYPE: PRT
<213> ORGANISM: Gallus gallus

<400> SEQUENCE: 14

Ser Asp Pro Thr Ser Asn Leu Glu Arg
1               5

<210> SEQ ID NO 15
<211> LENGTH: 9
<212> TYPE: PRT
<213> ORGANISM: Gallus gallus

<400> SEQUENCE: 15

Ser Gly Glu Leu Ser Gly Pro Val Lys
1               5

<210> SEQ ID NO 16
<211> LENGTH: 9
<212> TYPE: PRT
<213> ORGANISM: Gallus gallus

<400> SEQUENCE: 16

Ser Gly Gln Leu Ser Gly Pro Ile Arg
1               5

<210> SEQ ID NO 17
<211> LENGTH: 9
<212> TYPE: PRT
<213> ORGANISM: Gallus gallus

<400> SEQUENCE: 17

Val Phe Pro Gly Ile Ile Ser His Ile
1               5

<210> SEQ ID NO 18
<211> LENGTH: 8
<212> TYPE: PRT
<213> ORGANISM: Gallus gallus

<400> SEQUENCE: 18

Val Phe Pro Gly Ile Val Ser His
1               5

<210> SEQ ID NO 19
<211> LENGTH: 9
<212> TYPE: PRT
<213> ORGANISM: Gallus gallus

<400> SEQUENCE: 19

Val Phe Pro Gly Ile Val Ser His Ile
1               5

<210> SEQ ID NO 20
<211> LENGTH: 7
<212> TYPE: PRT
<213> ORGANISM: Gallus gallus

<400> SEQUENCE: 20

Ala Thr Ile Thr Gly Tyr Lys
1               5

<210> SEQ ID NO 21
<211> LENGTH: 10
<212> TYPE: PRT
<213> ORGANISM: Gallus gallus
```

<400> SEQUENCE: 21

Asp Asp Gln Glu Ser Ile Pro Ile Ser Lys
1               5                   10

<210> SEQ ID NO 22
<211> LENGTH: 15
<212> TYPE: PRT
<213> ORGANISM: Gallus gallus

<400> SEQUENCE: 22

Lys Ala Met Lys Gly Met Gly Thr Asp Glu Glu Thr Ile Leu Lys
1               5                   10                  15

<210> SEQ ID NO 23
<211> LENGTH: 7
<212> TYPE: PRT
<213> ORGANISM: Gallus gallus

<400> SEQUENCE: 23

Leu Leu Leu Ala Val Val Lys
1               5

<210> SEQ ID NO 24
<211> LENGTH: 8
<212> TYPE: PRT
<213> ORGANISM: Gallus gallus

<400> SEQUENCE: 24

Val Asp Glu Ala Leu Val Glu Lys
1               5

<210> SEQ ID NO 25
<211> LENGTH: 7
<212> TYPE: PRT
<213> ORGANISM: Gallus gallus

<400> SEQUENCE: 25

Ile Gly Asn Ala Ser Thr Lys
1               5

<210> SEQ ID NO 26
<211> LENGTH: 5
<212> TYPE: PRT
<213> ORGANISM: Gallus gallus

<400> SEQUENCE: 26

Thr Pro Asp Ser Lys
1               5

<210> SEQ ID NO 27
<211> LENGTH: 9
<212> TYPE: PRT
<213> ORGANISM: Gallus gallus

<400> SEQUENCE: 27

Thr Val Thr Leu Gly Ala Gly Ala Lys
1               5

<210> SEQ ID NO 28
<211> LENGTH: 7
<212> TYPE: PRT
<213> ORGANISM: Gallus gallus

<400> SEQUENCE: 28

```
Val Val Leu Ala Ser Leu Lys
1               5
```

<210> SEQ ID NO 29
<211> LENGTH: 10
<212> TYPE: PRT
<213> ORGANISM: Gallus gallus

<400> SEQUENCE: 29

```
Val Gly Asn Ala Lys Pro Glu Ile Gln Lys
1               5                   10
```

<210> SEQ ID NO 30
<211> LENGTH: 11
<212> TYPE: PRT
<213> ORGANISM: Gallus gallus

<400> SEQUENCE: 30

```
Val Val Asp Ala Leu Asn Ser Ile Gln Thr Lys
1               5                   10
```

<210> SEQ ID NO 31
<211> LENGTH: 13
<212> TYPE: PRT
<213> ORGANISM: Gallus gallus

<400> SEQUENCE: 31

```
Ala Asp Asn Gln Asp Ile Gly Phe Gly Ser Gly Thr Arg
1               5                   10
```

<210> SEQ ID NO 32
<211> LENGTH: 13
<212> TYPE: PRT
<213> ORGANISM: Gallus gallus

<400> SEQUENCE: 32

```
Ala Ile Ala Glu Gly Gln Gly Glu Tyr Ala Leu Glu Lys
1               5                   10
```

<210> SEQ ID NO 33
<211> LENGTH: 9
<212> TYPE: PRT
<213> ORGANISM: Gallus gallus

<400> SEQUENCE: 33

```
Ala Pro Val Val Ser Glu Ala Asp Lys
1               5
```

<210> SEQ ID NO 34
<211> LENGTH: 12
<212> TYPE: PRT
<213> ORGANISM: Gallus gallus

<400> SEQUENCE: 34

```
Ala Gln Ile Ile Asp Asp Ala Phe Asn Leu Ala Arg
1               5                   10
```

<210> SEQ ID NO 35
<211> LENGTH: 11
<212> TYPE: PRT
<213> ORGANISM: Gallus gallus

<400> SEQUENCE: 35

```
Ala Val Phe Thr Val Thr Met Ile His Pro Ser
1               5                   10
```

```
1               5                    10

<210> SEQ ID NO 36
<211> LENGTH: 6
<212> TYPE: PRT
<213> ORGANISM: Gallus gallus

<400> SEQUENCE: 36

Ala Trp Asp Phe Ile Arg
1               5

<210> SEQ ID NO 37
<211> LENGTH: 6
<212> TYPE: PRT
<213> ORGANISM: Gallus gallus

<400> SEQUENCE: 37

Asp Phe Ile Trp Glu Arg
1               5

<210> SEQ ID NO 38
<211> LENGTH: 9
<212> TYPE: PRT
<213> ORGANISM: Gallus gallus

<400> SEQUENCE: 38

Asp Phe Leu Thr Glu Asp Val Phe Lys
1               5

<210> SEQ ID NO 39
<211> LENGTH: 9
<212> TYPE: PRT
<213> ORGANISM: Gallus gallus

<400> SEQUENCE: 39

Asp His Leu Gln Glu Ala Val Asn Lys
1               5

<210> SEQ ID NO 40
<211> LENGTH: 12
<212> TYPE: PRT
<213> ORGANISM: Gallus gallus

<400> SEQUENCE: 40

Asp Leu Trp Asp His Leu Gln Glu Ala Val Asn Lys
1               5                    10

<210> SEQ ID NO 41
<211> LENGTH: 10
<212> TYPE: PRT
<213> ORGANISM: Gallus gallus

<400> SEQUENCE: 41

Asp Asn Ala Tyr Ser Ser Ile Gly Asn Lys
1               5                    10

<210> SEQ ID NO 42
<211> LENGTH: 10
<212> TYPE: PRT
<213> ORGANISM: Gallus gallus

<400> SEQUENCE: 42

Glu Ala Pro Val Val Ser Glu Ala Asp Lys
1               5                    10
```

<210> SEQ ID NO 43
<211> LENGTH: 10
<212> TYPE: PRT
<213> ORGANISM: Gallus gallus

<400> SEQUENCE: 43

Glu Gly Gln Gly Glu Tyr Ala Leu Glu Lys
1               5                   10

<210> SEQ ID NO 44
<211> LENGTH: 16
<212> TYPE: PRT
<213> ORGANISM: Gallus gallus

<400> SEQUENCE: 44

Glu Asn Ser Leu Leu Tyr Asp Asn Ala Tyr Ser Ser Ile Gly Asn Lys
1               5                   10                  15

<210> SEQ ID NO 45
<211> LENGTH: 6
<212> TYPE: PRT
<213> ORGANISM: Gallus gallus

<400> SEQUENCE: 45

Glu Gln Ala Leu Glu Arg
1               5

<210> SEQ ID NO 46
<211> LENGTH: 12
<212> TYPE: PRT
<213> ORGANISM: Gallus gallus

<400> SEQUENCE: 46

Phe Leu Glu Ala Pro Val Val Ser Glu Ala Asp Lys
1               5                   10

<210> SEQ ID NO 47
<211> LENGTH: 14
<212> TYPE: PRT
<213> ORGANISM: Gallus gallus

<400> SEQUENCE: 47

Phe Leu Glu Ala Pro Val Val Ser Glu Ala Asp Lys Leu Arg
1               5                   10

<210> SEQ ID NO 48
<211> LENGTH: 8
<212> TYPE: PRT
<213> ORGANISM: Gallus gallus

<400> SEQUENCE: 48

Phe Asn Thr Glu Phe Glu Leu Lys
1               5

<210> SEQ ID NO 49
<211> LENGTH: 12
<212> TYPE: PRT
<213> ORGANISM: Gallus gallus

<400> SEQUENCE: 49

Gly Ala Asp Ser Ala Glu Pro Thr Trp Asp Ile Lys
1               5                   10

<210> SEQ ID NO 50

```
<211> LENGTH: 10
<212> TYPE: PRT
<213> ORGANISM: Gallus gallus

<400> SEQUENCE: 50

His Tyr Asn Thr Ala Tyr Pro Leu Pro Lys
1               5                   10

<210> SEQ ID NO 51
<211> LENGTH: 12
<212> TYPE: PRT
<213> ORGANISM: Gallus gallus

<400> SEQUENCE: 51

Ile Ala Glu Gly Gln Gly Glu Tyr Ala Leu Glu Lys
1               5                   10

<210> SEQ ID NO 52
<211> LENGTH: 7
<212> TYPE: PRT
<213> ORGANISM: Gallus gallus

<400> SEQUENCE: 52

Ile Leu Ser Phe Phe Glu Arg
1               5

<210> SEQ ID NO 53
<211> LENGTH: 10
<212> TYPE: PRT
<213> ORGANISM: Gallus gallus

<400> SEQUENCE: 53

Ile Trp Gly Arg Pro Ala Ala Ile Ala Glu
1               5                   10

<210> SEQ ID NO 54
<211> LENGTH: 15
<212> TYPE: PRT
<213> ORGANISM: Gallus gallus

<400> SEQUENCE: 54

Ile Trp Gly Arg Pro Ala Ala Ile Ala Glu Gly Gln Gly Glu Tyr
1               5                   10                  15

<210> SEQ ID NO 55
<211> LENGTH: 19
<212> TYPE: PRT
<213> ORGANISM: Gallus gallus

<400> SEQUENCE: 55

Ile Trp Gly Arg Pro Ala Ala Ile Ala Glu Gly Gln Gly Glu Tyr Ala
1               5                   10                  15

Leu Glu Lys

<210> SEQ ID NO 56
<211> LENGTH: 9
<212> TYPE: PRT
<213> ORGANISM: Gallus gallus

<400> SEQUENCE: 56

Lys Gln Asp Ala Thr Ser Thr Ile Asn
1               5

<210> SEQ ID NO 57
```

<211> LENGTH: 20
<212> TYPE: PRT
<213> ORGANISM: Gallus gallus

<400> SEQUENCE: 57

Lys Gln Asp Ala Thr Ser Thr Ile Asn Ser Ile Ala Ser Asn Val Val
1               5                   10                  15

Gly Gln Pro Leu
            20

<210> SEQ ID NO 58
<211> LENGTH: 21
<212> TYPE: PRT
<213> ORGANISM: Gallus gallus

<400> SEQUENCE: 58

Lys Gln Asp Ala Thr Ser Thr Ile Asn Ser Ile Ala Ser Asn Val Val
1               5                   10                  15

Gly Gln Pro Leu Ala
            20

<210> SEQ ID NO 59
<211> LENGTH: 12
<212> TYPE: PRT
<213> ORGANISM: Gallus gallus

<400> SEQUENCE: 59

Leu Ala Gly Pro Leu Gln Gln Gly Gln His Tyr Arg
1               5                   10

<210> SEQ ID NO 60
<211> LENGTH: 11
<212> TYPE: PRT
<213> ORGANISM: Gallus gallus

<400> SEQUENCE: 60

Leu Glu Ala Pro Val Val Ser Glu Ala Asp Lys
1               5                   10

<210> SEQ ID NO 61
<211> LENGTH: 17
<212> TYPE: PRT
<213> ORGANISM: Gallus gallus

<400> SEQUENCE: 61

Leu Pro Thr Ala Leu Lys Pro Glu Ser Tyr Glu Val Thr Leu Gln Pro
1               5                   10                  15

Phe

<210> SEQ ID NO 62
<211> LENGTH: 12
<212> TYPE: PRT
<213> ORGANISM: Gallus gallus

<400> SEQUENCE: 62

Met Leu Ser Asp Phe Leu Thr Glu Asp Val Phe Lys
1               5                   10

<210> SEQ ID NO 63
<211> LENGTH: 15
<212> TYPE: PRT
<213> ORGANISM: Gallus gallus

<400> SEQUENCE: 63

```
Asn Ser Val Pro Leu Pro Asp Ser Ile Gly Ala Ile Met Asp Arg
1               5                   10                  15
```

<210> SEQ ID NO 64
<211> LENGTH: 15
<212> TYPE: PRT
<213> ORGANISM: Gallus gallus

<400> SEQUENCE: 64

```
Pro Ala Ala Ile Ala Glu Gly Gln Gly Glu Tyr Ala Leu Glu Lys
1               5                   10                  15
```

<210> SEQ ID NO 65
<211> LENGTH: 8
<212> TYPE: PRT
<213> ORGANISM: Gallus gallus

<400> SEQUENCE: 65

```
Gln Ala Ile Pro Val Ile Asn Arg
1               5
```

<210> SEQ ID NO 66
<211> LENGTH: 19
<212> TYPE: PRT
<213> ORGANISM: Gallus gallus

<400> SEQUENCE: 66

```
Gln Asp Ala Thr Ser Thr Ile Asn Ser Ile Ala Ser Asn Val Val Gly
1               5                   10                  15

Gln Pro Leu
```

<210> SEQ ID NO 67
<211> LENGTH: 13
<212> TYPE: PRT
<213> ORGANISM: Gallus gallus

<400> SEQUENCE: 67

```
Gln Asn Val Ser Asn Asn Pro Ile Ala Pro Asn Leu Arg
1               5                   10
```

<210> SEQ ID NO 68
<211> LENGTH: 10
<212> TYPE: PRT
<213> ORGANISM: Gallus gallus

<400> SEQUENCE: 68

```
Ser Asp Phe Leu Thr Glu Asp Val Phe Lys
1               5                   10
```

<210> SEQ ID NO 69
<211> LENGTH: 18
<212> TYPE: PRT
<213> ORGANISM: Gallus gallus

<400> SEQUENCE: 69

```
Ser Asp Gln Val Gly Leu Pro Asp Phe Asn Ala Gly Ala Met Glu Asn
1               5                   10                  15

Trp Gly
```

<210> SEQ ID NO 70
<211> LENGTH: 11
<212> TYPE: PRT
<213> ORGANISM: Gallus gallus

<400> SEQUENCE: 70

Ser Glu Val Phe Asp Ser Ile Ala Tyr Ser Lys
1               5                   10

<210> SEQ ID NO 71
<211> LENGTH: 14
<212> TYPE: PRT
<213> ORGANISM: Gallus gallus

<400> SEQUENCE: 71

Ser Leu Leu Tyr Asp Asn Ala Tyr Ser Ile Gly Asn Lys
1               5                   10

<210> SEQ ID NO 72
<211> LENGTH: 12
<212> TYPE: PRT
<213> ORGANISM: Gallus gallus

<400> SEQUENCE: 72

Ser Asn Asn His Gln Ala Ile Pro Val Ile Asn Arg
1               5                   10

<210> SEQ ID NO 73
<211> LENGTH: 14
<212> TYPE: PRT
<213> ORGANISM: Gallus gallus

<400> SEQUENCE: 73

Ser Val Pro Leu Pro Asp Ser Ile Gly Ala Ile Met Asp Arg
1               5                   10

<210> SEQ ID NO 74
<211> LENGTH: 13
<212> TYPE: PRT
<213> ORGANISM: Gallus gallus

<400> SEQUENCE: 74

Thr Asp Leu Trp Asp His Leu Gln Glu Ala Val Asn Lys
1               5                   10

<210> SEQ ID NO 75
<211> LENGTH: 13
<212> TYPE: PRT
<213> ORGANISM: Gallus gallus

<400> SEQUENCE: 75

Thr Gly Glu Leu Ala Asp Asp Leu Ala Gly Phe Tyr Arg
1               5                   10

<210> SEQ ID NO 76
<211> LENGTH: 10
<212> TYPE: PRT
<213> ORGANISM: Gallus gallus

<400> SEQUENCE: 76

Thr Gly Pro Ile Leu Ser Phe Phe Glu Arg
1               5                   10

<210> SEQ ID NO 77
<211> LENGTH: 6
<212> TYPE: PRT
<213> ORGANISM: Gallus gallus

<400> SEQUENCE: 77

Thr Ile Asp Pro Thr Lys
1               5

<210> SEQ ID NO 78
<211> LENGTH: 15
<212> TYPE: PRT
<213> ORGANISM: Gallus gallus

<400> SEQUENCE: 78

Thr Leu Phe Gly Gln Tyr Gly Gly Gly Ser Phe Ser Phe Ser Arg
1               5                   10                  15

<210> SEQ ID NO 79
<211> LENGTH: 7
<212> TYPE: PRT
<213> ORGANISM: Gallus gallus

<400> SEQUENCE: 79

Thr Asn Ile Asn Trp Val Lys
1               5

<210> SEQ ID NO 80
<211> LENGTH: 12
<212> TYPE: PRT
<213> ORGANISM: Gallus gallus

<400> SEQUENCE: 80

Val Asn Tyr Asn Gln Glu Asn Trp Asp Gln Leu Leu
1               5                   10

<210> SEQ ID NO 81
<211> LENGTH: 13
<212> TYPE: PRT
<213> ORGANISM: Gallus gallus

<400> SEQUENCE: 81

Val Asn Tyr Asn Gln Glu Asn Trp Asp Gln Leu Leu Gln
1               5                   10

<210> SEQ ID NO 82
<211> LENGTH: 14
<212> TYPE: PRT
<213> ORGANISM: Gallus gallus

<400> SEQUENCE: 82

Val Asn Tyr Asn Gln Glu Asn Trp Asp Gln Leu Leu Gln Gln
1               5                   10

<210> SEQ ID NO 83
<211> LENGTH: 13
<212> TYPE: PRT
<213> ORGANISM: Gallus gallus

<400> SEQUENCE: 83

Val Val Ala Thr Thr Gln Met Gln Ala Pro Asp Ala Arg
1               5                   10

<210> SEQ ID NO 84
<211> LENGTH: 7
<212> TYPE: PRT
<213> ORGANISM: Gallus gallus

<400> SEQUENCE: 84

Trp Arg Leu Pro Thr Ala Leu

```
<210> SEQ ID NO 85
<211> LENGTH: 11
<212> TYPE: PRT
<213> ORGANISM: Gallus gallus

<400> SEQUENCE: 85

Trp Arg Leu Pro Thr Ala Leu Lys Pro Glu Ser
1               5                   10

<210> SEQ ID NO 86
<211> LENGTH: 19
<212> TYPE: PRT
<213> ORGANISM: Gallus gallus

<400> SEQUENCE: 86

Trp Arg Leu Pro Thr Ala Leu Lys Pro Glu Ser Tyr Glu Val Thr Leu
1               5                   10                  15

Gln Pro Phe

<210> SEQ ID NO 87
<211> LENGTH: 11
<212> TYPE: PRT
<213> ORGANISM: Gallus gallus

<400> SEQUENCE: 87

Tyr Asp Asn Ala Tyr Ser Ser Ile Gly Asn Lys
1               5                   10

<210> SEQ ID NO 88
<211> LENGTH: 10
<212> TYPE: PRT
<213> ORGANISM: Gallus gallus

<400> SEQUENCE: 88

Tyr Leu Gln Tyr Thr Ile Asp Pro Thr Lys
1               5                   10

<210> SEQ ID NO 89
<211> LENGTH: 5
<212> TYPE: PRT
<213> ORGANISM: Gallus gallus

<400> SEQUENCE: 89

Tyr Pro Leu Pro Lys
1               5

<210> SEQ ID NO 90
<211> LENGTH: 13
<212> TYPE: PRT
<213> ORGANISM: Gallus gallus

<400> SEQUENCE: 90

Ala Ala Asp Gly Thr Trp Gln Asp Phe Ala Thr Gly Lys
1               5                   10

<210> SEQ ID NO 91
<211> LENGTH: 6
<212> TYPE: PRT
<213> ORGANISM: Gallus gallus

<400> SEQUENCE: 91

Cys Pro Leu Met Val Lys
```

<210> SEQ ID NO 92
<211> LENGTH: 11
<212> TYPE: PRT
<213> ORGANISM: Gallus gallus

<400> SEQUENCE: 92

Asp Gly Thr Trp Gln Asp Phe Ala Thr Gly Lys
1               5                   10

<210> SEQ ID NO 93
<211> LENGTH: 12
<212> TYPE: PRT
<213> ORGANISM: Gallus gallus

<400> SEQUENCE: 93

Asp Val Val Phe Thr Ala Asn Asp Ser Gly His Arg
1               5                   10

<210> SEQ ID NO 94
<211> LENGTH: 8
<212> TYPE: PRT
<213> ORGANISM: Gallus gallus

<400> SEQUENCE: 94

Gly Leu Gly Leu Ser Pro Phe His
1               5

<210> SEQ ID NO 95
<211> LENGTH: 10
<212> TYPE: PRT
<213> ORGANISM: Gallus gallus

<400> SEQUENCE: 95

Gly Leu Gly Leu Ser Pro Phe His Glu Tyr
1               5                   10

<210> SEQ ID NO 96
<211> LENGTH: 11
<212> TYPE: PRT
<213> ORGANISM: Gallus gallus

<400> SEQUENCE: 96

Gly Leu Gly Leu Ser Pro Phe His Glu Tyr Ala
1               5                   10

<210> SEQ ID NO 97
<211> LENGTH: 15
<212> TYPE: PRT
<213> ORGANISM: Gallus gallus

<400> SEQUENCE: 97

Gly Leu Gly Leu Ser Pro Phe His Glu Tyr Ala Asp Val Val Phe
1               5                   10                  15

<210> SEQ ID NO 98
<211> LENGTH: 23
<212> TYPE: PRT
<213> ORGANISM: Gallus gallus

<400> SEQUENCE: 98

Gly Leu Gly Leu Ser Pro Phe His Glu Tyr Ala Asp Val Val Phe Thr
1               5                   10                  15

Ala Asn Asp Ser Gly His Arg
            20

<210> SEQ ID NO 99
<211> LENGTH: 10
<212> TYPE: PRT
<213> ORGANISM: Gallus gallus

<400> SEQUENCE: 99

Gly Ser Pro Ala Ala Asn Val Ala Val Lys
1               5                   10

<210> SEQ ID NO 100
<211> LENGTH: 11
<212> TYPE: PRT
<213> ORGANISM: Gallus gallus

<400> SEQUENCE: 100

Gly Ser Pro Ala Ala Asn Val Ala Val Lys Val
1               5                   10

<210> SEQ ID NO 101
<211> LENGTH: 10
<212> TYPE: PRT
<213> ORGANISM: Gallus gallus

<400> SEQUENCE: 101

Gly Thr Trp Gln Asp Phe Ala Thr Gly Lys
1               5                   10

<210> SEQ ID NO 102
<211> LENGTH: 8
<212> TYPE: PRT
<213> ORGANISM: Gallus gallus

<400> SEQUENCE: 102

His Tyr Thr Ile Ala Ala Leu Leu
1               5

<210> SEQ ID NO 103
<211> LENGTH: 11
<212> TYPE: PRT
<213> ORGANISM: Gallus gallus

<400> SEQUENCE: 103

His Tyr Thr Ile Ala Ala Leu Leu Ser Pro Phe
1               5                   10

<210> SEQ ID NO 104
<211> LENGTH: 12
<212> TYPE: PRT
<213> ORGANISM: Gallus gallus

<400> SEQUENCE: 104

His Tyr Thr Ile Ala Ala Leu Leu Ser Pro Phe Ser
1               5                   10

<210> SEQ ID NO 105
<211> LENGTH: 12
<212> TYPE: PRT
<213> ORGANISM: Gallus gallus

<400> SEQUENCE: 105

Thr Thr Glu Glu Gln Phe Val Glu Gly Val Tyr Arg
1               5                   10

<210> SEQ ID NO 106
<211> LENGTH: 10
<212> TYPE: PRT
<213> ORGANISM: Gallus gallus

<400> SEQUENCE: 106

Thr Thr Glu Phe Gly Glu Ile His Glu Leu
1               5                   10

<210> SEQ ID NO 107
<211> LENGTH: 15
<212> TYPE: PRT
<213> ORGANISM: Gallus gallus

<400> SEQUENCE: 107

Thr Thr Glu Phe Gly Glu Ile His Glu Leu Thr Thr Glu Glu Gln
1               5                   10                  15

<210> SEQ ID NO 108
<211> LENGTH: 20
<212> TYPE: PRT
<213> ORGANISM: Gallus gallus

<400> SEQUENCE: 108

Thr Thr Glu Phe Gly Glu Ile His Glu Leu Thr Thr Glu Glu Gln Phe
1               5                   10                  15

Val Glu Gly Val
            20

<210> SEQ ID NO 109
<211> LENGTH: 22
<212> TYPE: PRT
<213> ORGANISM: Gallus gallus

<400> SEQUENCE: 109

Thr Thr Glu Phe Gly Glu Ile His Glu Leu Thr Thr Glu Glu Gln Phe
1               5                   10                  15

Val Glu Gly Val Tyr Arg
            20

<210> SEQ ID NO 110
<211> LENGTH: 32
<212> TYPE: PRT
<213> ORGANISM: Gallus gallus

<400> SEQUENCE: 110

Thr Thr Glu Phe Gly Glu Ile His Glu Leu Thr Thr Glu Glu Gln Phe
1               5                   10                  15

Val Glu Gly Val Tyr Arg Val Glu Phe Asp Thr Ser Ser Tyr Trp Lys
            20                  25                  30

<210> SEQ ID NO 111
<211> LENGTH: 10
<212> TYPE: PRT
<213> ORGANISM: Gallus gallus

<400> SEQUENCE: 111

Val Glu Phe Asp Thr Ser Ser Tyr Trp Lys
1               5                   10

<210> SEQ ID NO 112
<211> LENGTH: 6

<212> TYPE: PRT
<213> ORGANISM: Gallus gallus

<400> SEQUENCE: 112

Val Leu Asp Ala Val Arg
1               5

<210> SEQ ID NO 113
<211> LENGTH: 8
<212> TYPE: PRT
<213> ORGANISM: Gallus gallus

<400> SEQUENCE: 113

Glu His Gly Ala Asn Val Glu Lys
1               5

<210> SEQ ID NO 114
<211> LENGTH: 10
<212> TYPE: PRT
<213> ORGANISM: Gallus gallus

<400> SEQUENCE: 114

Thr Leu Asn Leu Val Ser Met Ala Ala Cys
1               5                   10

<210> SEQ ID NO 115
<211> LENGTH: 7
<212> TYPE: PRT
<213> ORGANISM: Gallus gallus

<400> SEQUENCE: 115

Thr Leu Val Ala Cys Pro Arg
1               5

<210> SEQ ID NO 116
<211> LENGTH: 8
<212> TYPE: PRT
<213> ORGANISM: Gallus gallus

<400> SEQUENCE: 116

Asp Leu Glu Glu Val Lys Glu Lys
1               5

<210> SEQ ID NO 117
<211> LENGTH: 5
<212> TYPE: PRT
<213> ORGANISM: Gallus gallus

<400> SEQUENCE: 117

Glu Met Trp Leu Lys
1               5

<210> SEQ ID NO 118
<211> LENGTH: 7
<212> TYPE: PRT
<213> ORGANISM: Gallus gallus

<400> SEQUENCE: 118

Ile Arg Asp Met Val Asp Val
1               5

<210> SEQ ID NO 119
<211> LENGTH: 8
<212> TYPE: PRT
<213> ORGANISM: Gallus gallus

<400> SEQUENCE: 119

Ile Arg Pro Phe Leu Asp Gln Phe
1               5

<210> SEQ ID NO 120
<211> LENGTH: 11
<212> TYPE: PRT
<213> ORGANISM: Gallus gallus

<400> SEQUENCE: 120

Ile Arg Pro Phe Leu Asp Gln Phe Ser Ala Lys
1               5                   10

<210> SEQ ID NO 121
<211> LENGTH: 14
<212> TYPE: PRT
<213> ORGANISM: Gallus gallus

<400> SEQUENCE: 121

Leu Ala Asp Asn Leu Asp Thr Leu Ser Ala Ala Ala Ala Lys
1               5                   10

<210> SEQ ID NO 122
<211> LENGTH: 10
<212> TYPE: PRT
<213> ORGANISM: Gallus gallus

<400> SEQUENCE: 122

Leu Ile Ser Phe Leu Asp Glu Leu Gln Lys
1               5                   10

<210> SEQ ID NO 123
<211> LENGTH: 8
<212> TYPE: PRT
<213> ORGANISM: Gallus gallus

<400> SEQUENCE: 123

Leu Ser Gln Lys Leu Glu Glu Ile
1               5

<210> SEQ ID NO 124
<211> LENGTH: 9
<212> TYPE: PRT
<213> ORGANISM: Gallus gallus

<400> SEQUENCE: 124

Leu Thr Pro Val Ala Glu Glu Ala Arg
1               5

<210> SEQ ID NO 125
<211> LENGTH: 9
<212> TYPE: PRT
<213> ORGANISM: Gallus gallus

<400> SEQUENCE: 125

Leu Thr Pro Val Ala Gln Glu Leu Lys
1               5

<210> SEQ ID NO 126
<211> LENGTH: 9
<212> TYPE: PRT
<213> ORGANISM: Gallus gallus

<400> SEQUENCE: 126

```
Leu Thr Pro Tyr Ala Glu Asn Leu Lys
1               5

<210> SEQ ID NO 127
<211> LENGTH: 9
<212> TYPE: PRT
<213> ORGANISM: Gallus gallus

<400> SEQUENCE: 127

Met Thr Pro Leu Val Gln Glu Phe Arg
1               5

<210> SEQ ID NO 128
<211> LENGTH: 6
<212> TYPE: PRT
<213> ORGANISM: Gallus gallus

<400> SEQUENCE: 128

Gln Lys Leu Ser Gln Lys
1               5

<210> SEQ ID NO 129
<211> LENGTH: 5
<212> TYPE: PRT
<213> ORGANISM: Gallus gallus

<400> SEQUENCE: 129

Gln Leu Asp Leu Lys
1               5

<210> SEQ ID NO 130
<211> LENGTH: 5
<212> TYPE: PRT
<213> ORGANISM: Gallus gallus

<400> SEQUENCE: 130

Tyr Lys Glu Val Arg
1               5

<210> SEQ ID NO 131
<211> LENGTH: 147
<212> TYPE: PRT
<213> ORGANISM: Gallus gallus

<400> SEQUENCE: 131

Met Val His Trp Thr Ala Glu Glu Lys Gln Leu Ile Thr Gly Leu Trp
1               5                   10                  15

Gly Lys Val Asn Val Ala Glu Cys Gly Ala Glu Ala Leu Ala Arg Leu
                20                  25                  30

Leu Ile Val Tyr Pro Trp Thr Gln Arg Phe Phe Ala Ser Phe Gly Asn
            35                  40                  45

Leu Ser Ser Pro Thr Ala Ile Leu Gly Asn Pro Met Val Arg Ala His
        50                  55                  60

Gly Lys Lys Val Leu Thr Ser Phe Gly Asp Ala Val Lys Asn Leu Asp
65                  70                  75                  80

Asn Ile Lys Asn Thr Phe Ser Gln Leu Ser Glu Leu His Cys Asp Lys
                85                  90                  95

Leu His Val Asp Pro Glu Asn Phe Arg Leu Leu Gly Asp Ile Leu Ile
            100                 105                 110

Ile Val Leu Ala Ala His Phe Ser Lys Asp Phe Thr Pro Glu Cys Gln
        115                 120                 125
```

```
Ala Ala Trp Gln Lys Leu Val Arg Val Val Ala His Ala Leu Ala Arg
        130                 135                 140

Lys Tyr His
145

<210> SEQ ID NO 132
<211> LENGTH: 154
<212> TYPE: PRT
<213> ORGANISM: Gallus gallus

<400> SEQUENCE: 132

Met Ala Thr Leu Lys Ala Val Cys Val Met Lys Gly Asp Ala Pro Val
1               5                   10                  15

Glu Gly Val Ile His Phe Gln Gln Gly Ser Gly Pro Val Lys Val
            20                  25                  30

Thr Gly Lys Ile Thr Gly Leu Ser Asp Gly Asp His Gly Phe His Val
        35                  40                  45

His Glu Phe Gly Asp Asn Thr Asn Gly Cys Thr Ser Ala Gly Ala His
    50                  55                  60

Phe Asn Pro Glu Gly Lys Gln His Gly Pro Lys Asp Ala Asp Arg
65                  70                  75                  80

His Val Gly Asp Leu Gly Asn Val Thr Ala Lys Gly Val Ala Glu
                85                  90                  95

Val Glu Ile Glu Asp Ser Val Ile Ser Leu Thr Gly Pro His Cys Ile
            100                 105                 110

Ile Gly Arg Thr Met Val Val His Ala Lys Ser Asp Asp Leu Gly Arg
        115                 120                 125

Gly Gly Asp Asn Glu Ser Lys Leu Thr Gly Asn Ala Gly Pro Arg Leu
    130                 135                 140

Ala Cys Gly Val Ile Gly Ile Ala Lys Cys
145                 150

<210> SEQ ID NO 133
<211> LENGTH: 904
<212> TYPE: PRT
<213> ORGANISM: Gallus gallus

<400> SEQUENCE: 133

Met Val Asp Tyr His Ser Ala Gly Gln Pro Tyr Pro Tyr Gly Gly Asn
1               5                   10                  15

Gly Pro Gly Pro Asn Gly Asp Tyr Met Ala Gln Glu Asp Trp Asp
            20                  25                  30

Arg Asp Leu Leu Leu Asp Pro Ala Trp Glu Lys Gln Gln Arg Lys Thr
        35                  40                  45

Phe Thr Ala Trp Cys Asn Ser His Leu Arg Lys Ala Gly Thr Gln Ile
    50                  55                  60

Glu Asn Ile Asp Glu Asp Phe Arg Asp Gly Leu Lys Leu Met Leu Leu
65                  70                  75                  80

Leu Glu Val Ile Ser Gly Glu Arg Leu Pro Lys Pro Glu Arg Gly Lys
                85                  90                  95

Met Arg Val His Lys Ile Asn Asn Val Asn Lys Ala Leu Asp Phe Ile
            100                 105                 110

Ala Ser Lys Gly Val Asn Val Val Ser Ile Gly Ala Glu Glu Ile Val
        115                 120                 125

Asp Gly Asn Ala Lys Met Thr Leu Gly Met Ile Trp Thr Ile Ile Leu
    130                 135                 140
```

```
Arg Phe Ala Ile Gln Asp Ile Ser Val Glu Glu Thr Ser Ala Lys Glu
145                 150                 155                 160

Gly Leu Leu Leu Trp Cys Gln Arg Lys Thr Ala Pro Tyr Lys Asn Val
                165                 170                 175

Asn Val Gln Asn Phe His Ile Ser Trp Lys Asp Gly Leu Ala Phe Asn
            180                 185                 190

Ala Leu Ile His Arg His Arg Pro Glu Leu Ile Glu Tyr Asp Lys Leu
            195                 200                 205

Arg Lys Asp Asp Pro Val Thr Asn Leu Asn Asn Ala Phe Glu Val Ala
210                 215                 220

Glu Lys Tyr Leu Asp Ile Pro Lys Met Leu Asp Ala Glu Asp Ile Val
225                 230                 235                 240

Asn Thr Ala Arg Pro Asp Glu Lys Ala Ile Met Thr Tyr Val Ser Ser
                245                 250                 255

Phe Tyr His Ala Phe Ser Gly Ala Gln Lys Ala Glu Thr Ala Ala Asn
            260                 265                 270

Arg Ile Cys Lys Val Leu Ala Val Asn Gln Glu Asn Glu His Leu Met
            275                 280                 285

Glu Asp Tyr Glu Lys Leu Ala Ser Asp Leu Leu Glu Trp Ile Arg Arg
290                 295                 300

Thr Ile Pro Trp Leu Glu Asp Arg Ser Pro Gln Lys Thr Ile Gln Glu
305                 310                 315                 320

Met Gln Gln Lys Leu Glu Asp Phe Arg Asp Tyr Arg Arg Val His Lys
                325                 330                 335

Pro Pro Lys Val Gln Glu Lys Cys Gln Leu Glu Ile Asn Phe Asn Thr
            340                 345                 350

Leu Gln Thr Lys Leu Arg Leu Ser Asn Arg Pro Ala Phe Met Pro Ser
            355                 360                 365

Glu Gly Arg Met Val Ser Asp Ile Asn Thr Gly Trp Gln His Leu Glu
370                 375                 380

Gln Ala Glu Lys Gly Tyr Glu Glu Trp Leu Leu Asn Glu Ile Arg Arg
385                 390                 395                 400

Leu Glu Pro Leu Asp His Leu Ala Glu Lys Phe Arg Gln Lys Ala Ser
                405                 410                 415

Ile His Glu Ala Trp Thr Glu Gly Lys Glu Ala Met Leu Lys Gln Lys
            420                 425                 430

Asp Tyr Glu Thr Ala Thr Leu Ser Asp Ile Lys Ala Leu Ile Arg Lys
            435                 440                 445

His Glu Ala Phe Glu Ser Asp Leu Ala Ala His Gln Asp Arg Val Glu
            450                 455                 460

Gln Ile Ala Ala Ile Ala Gln Glu Leu Asn Glu Leu Asp Tyr Tyr Asp
465                 470                 475                 480

Ser Pro Ser Val Asn Ala Arg Cys Gln Lys Ile Cys Asp Gln Trp Asp
                485                 490                 495

Val Leu Gly Ser Leu Thr His Ser Arg Arg Glu Ala Leu Glu Lys Thr
            500                 505                 510

Glu Lys Gln Leu Glu Thr Ile Asp Glu Leu His Leu Glu Tyr Ala Lys
            515                 520                 525

Arg Ala Ala Pro Phe Asn Asn Trp Met Glu Ser Ala Met Glu Asp Leu
530                 535                 540

Gln Asp Met Phe Ile Val His Thr Ile Glu Glu Ile Glu Gly Leu Ile
545                 550                 555                 560
```

Ala Ala His Asp Gln Phe Lys Ala Thr Leu Pro Asp Ala Asp Arg Glu
            565                 570                 575

Arg Glu Ala Ile Leu Gly Ile Gln Arg Glu Ala Gln Arg Ile Ala Asp
        580                 585                 590

Leu His Ser Ile Lys Leu Ser Gly Asn Asn Pro Tyr Thr Ser Val Thr
    595                 600                 605

Pro Gln Val Ile Asn Ser Lys Trp Glu Arg Val Gln Gln Leu Val Pro
610                 615                 620

Thr Arg Asp Arg Ala Leu Gln Asp Glu Gln Ser Arg Gln Gln Cys Asn
625                 630                 635                 640

Glu Arg Leu Arg Arg Gln Phe Ala Gly Gln Ala Asn Ile Val Gly Pro
            645                 650                 655

Trp Met Gln Thr Lys Met Glu Glu Ile Gly Arg Ile Ser Ile Glu Met
            660                 665                 670

His Gly Thr Leu Glu Asp Gln Leu Gln His Leu Lys His Tyr Glu Gln
        675                 680                 685

Ser Ile Val Asp Tyr Lys Pro Asn Leu Glu Leu Glu His Glu His
    690                 695                 700

Gln Leu Val Glu Glu Ala Leu Ile Phe Asp Asn Lys His Thr Asn Tyr
705                 710                 715                 720

Thr Met Glu His Ile Arg Val Gly Trp Glu Gln Leu Leu Thr Thr Ile
            725                 730                 735

Ala Arg Thr Ile Asn Glu Val Glu Asn Gln Ile Leu Thr Arg Asp Ala
            740                 745                 750

Lys Gly Ile Ser Gln Glu Gln Met Gln Glu Phe Arg Ala Ser Phe Asn
        755                 760                 765

His Phe Asp Lys Asp His Cys Gly Ala Leu Gly Pro Glu Glu Phe Lys
770                 775                 780

Ala Cys Leu Ile Ser Leu Gly Tyr Asp Val Glu Asn Asp Arg Gln Gly
785                 790                 795                 800

Asp Ala Glu Phe Asn Arg Ile Met Ser Leu Val Asp Pro Asn Gly Ser
            805                 810                 815

Gly Ser Val Thr Phe Gln Ala Phe Ile Asp Phe Met Ser Arg Glu Thr
        820                 825                 830

Thr Asp Thr Asp Thr Ala Asp Gln Val Ile Ala Ser Phe Lys Val Leu
    835                 840                 845

Ala Gly Asp Lys Asn Tyr Ile Thr Ala Glu Glu Leu Arg Arg Glu Leu
850                 855                 860

Pro Pro Glu Gln Ala Glu Tyr Cys Ile Ala Arg Met Ala Pro Tyr Arg
865                 870                 875                 880

Gly Pro Asp Ala Ala Pro Gly Ala Leu Asp Tyr Lys Ser Phe Ser Thr
            885                 890                 895

Ala Leu Tyr Gly Glu Ser Asp Leu
            900

<210> SEQ ID NO 134
<211> LENGTH: 1193
<212> TYPE: PRT
<213> ORGANISM: Gallus gallus

<400> SEQUENCE: 134

Ala Lys Glu Leu Tyr Gly Asn Ile Trp Ser Asn Phe Ser Asp Pro Gln
1               5                   10                  15

Leu Lys Lys Ile Ile Gly Ser Ile Gln Thr Leu Gly Pro Ser Asn Leu
            20                  25                  30

-continued

```
Pro Leu Asp Lys Arg Gln Gln Tyr Asn Thr Ile Leu Ser Asp Met Asp
         35                  40                  45

Lys Ile Tyr Ser Thr Ala Lys Val Cys Leu Asp Asn Gly Thr Cys Trp
 50                  55                  60

Asp Leu Glu Pro Asp Ile Ser Asp Ile Met Ala Thr Ser Arg Ser Tyr
 65                  70                  75                  80

Lys Lys Leu Leu Tyr Ala Trp Glu Gly Trp His Asn Ala Ala Gly Asn
                 85                  90                  95

Pro Leu Arg Ala Lys Tyr Gln Glu Phe Val Thr Leu Ser Asn Glu Ala
                100                 105                 110

Tyr Gln Met Asp Gly Phe Glu Asp Thr Gly Ser Tyr Trp Arg Ser Trp
            115                 120                 125

Tyr Asp Ser Thr Thr Phe Glu Asp Asp Leu Glu His Leu Tyr Asn Gln
130                 135                 140

Leu Glu Pro Leu Tyr Leu Asn Leu His Ala Phe Val Arg Arg Lys Leu
145                 150                 155                 160

Tyr Asp Arg Tyr Gly Pro Lys Tyr Ile Asn Leu Lys Gly Pro Ile Pro
                165                 170                 175

Ala His Leu Leu Gly Asn Met Trp Ala Gln Gln Trp Asn Asn Ile Tyr
            180                 185                 190

Asp Leu Met Val Pro Tyr Pro Asp Lys Pro Asn Leu Asp Val Thr Asn
        195                 200                 205

Thr Met Val Asn Gln Gly Trp Asn Ala Thr His Met Phe Arg Val Ser
210                 215                 220

Glu Glu Phe Phe Thr Ser Leu Gly Leu Leu Glu Met Pro Pro Glu Phe
225                 230                 235                 240

Trp Glu Lys Ser Met Leu Glu Lys Pro Ala Asp Gly Arg Glu Val Val
                245                 250                 255

Cys His Ala Ser Ala Trp Asp Phe Tyr Asn Arg Lys Asp Phe Arg Ile
            260                 265                 270

Lys Gln Cys Thr Thr Val Thr Met Glu Gln Leu Phe Thr Val His His
        275                 280                 285

Glu Met Gly His Val Gln Tyr Tyr Leu Gln Tyr Lys Asp Gln Pro Val
290                 295                 300

Ser Phe Arg Gly Gly Ala Asn Pro Gly Phe His Glu Ala Ile Gly Asp
305                 310                 315                 320

Val Leu Ser Leu Ser Val Ser Thr Pro Ser His Leu Gln Lys Ile Gly
                325                 330                 335

Leu Leu Ser Ser Ala Val Glu Asp Glu Ser Asn Ile Asn Tyr Leu
            340                 345                 350

Leu Lys Met Ala Leu Glu Lys Ile Ala Phe Leu Pro Phe Gly Tyr Leu
        355                 360                 365

Ile Asp Gln Trp Arg Trp Asn Val Phe Ser Gly Arg Thr Pro Pro Ser
370                 375                 380

Arg Tyr Asn Tyr Asp Trp Trp Tyr Leu Arg Thr Lys Tyr Gln Gly Ile
385                 390                 395                 400

Cys Ala Pro Val Ser Arg Asn Glu Ser Asn Phe Asp Pro Gly Ala Lys
                405                 410                 415

Tyr His Ile Pro Gly Asn Thr Pro Tyr Ile Arg Tyr Phe Val Ser Phe
            420                 425                 430

Ile Leu Gln Phe Gln Phe His Lys Ala Leu Cys Gln Ala Ala Asn His
        435                 440                 445
```

-continued

```
Thr Gly Pro Leu His Thr Cys Asp Ile Tyr Met Ser Lys Glu Ala Gly
    450                 455                 460
Ala Lys Leu Arg Glu Val Leu Lys Ala Gly Ser Ser Lys Ser Trp Gln
465                 470                 475                 480
Glu Ile Leu Phe Asn Leu Thr Gly Thr Asp Lys Met Asp Ala Gly Ala
                485                 490                 495
Leu Leu Glu Tyr Phe Ser Pro Val Thr Thr Trp Leu Gln Glu Gln Asn
            500                 505                 510
Asn Lys Thr Asn Glu Val Leu Gly Trp Pro Glu Phe Asp Trp Arg Ser
        515                 520                 525
Pro Ile Pro Glu Gly Tyr Pro Glu Gly Ile Asp Lys Ile Val Asp Glu
530                 535                 540
Ala Gln Ala Lys Glu Phe Leu Ser Glu Tyr Asn Ser Thr Ala Glu Val
545                 550                 555                 560
Val Trp Asn Ala Tyr Thr Glu Ala Ser Trp Glu Tyr Asn Thr Asn Ile
                565                 570                 575
Thr Asp His Asn Lys Glu Val Met Leu Glu Lys Asn Leu Ala Met Ser
            580                 585                 590
Lys His Thr Ile Glu Tyr Gly Met Arg Ala Arg Gln Phe Asp Pro Ser
        595                 600                 605
Asp Phe Gln Asp Glu Thr Val Thr Arg Ile Leu Asn Lys Leu Ser Val
    610                 615                 620
Leu Glu Arg Ala Ala Leu Pro Glu Asp Glu Leu Lys Glu Tyr Asn Thr
625                 630                 635                 640
Leu Leu Ser Asp Met Glu Thr Thr Tyr Ser Val Ala Lys Val Cys Arg
                645                 650                 655
Glu Asn Asn Thr Phe His Pro Leu Asp Pro Asp Leu Thr Asp Ile Leu
            660                 665                 670
Ala Thr Ser Arg Asp Tyr Asn Glu Leu Leu Phe Ala Trp Lys Gly Trp
        675                 680                 685
Trp Asp Ala Ser Gly Ala Lys Ile Lys Asp Lys Tyr Lys Arg Tyr Val
    690                 695                 700
Glu Leu Ser Asn Lys Ala Ala Val Leu Asn Gly Tyr Thr Asp Asn Gly
705                 710                 715                 720
Ala Tyr Trp Arg Ser Leu Tyr Glu Thr Pro Thr Phe Glu Glu Asp Leu
                725                 730                 735
Glu Arg Leu Tyr Leu Gln Leu Gln Pro Leu Tyr Leu Asn Leu His Ala
            740                 745                 750
Tyr Val Arg Arg Ala Leu Tyr Asn Lys Tyr Gly Ala Glu His Ile Ser
        755                 760                 765
Leu Lys Gly Pro Ile Pro Ala His Leu Leu Gly Asn Met Trp Ala Gln
    770                 775                 780
Ser Trp Ser Asn Ile Phe Asp Leu Val Met Pro Phe Pro Asp Ala Thr
785                 790                 795                 800
Lys Val Asp Ala Thr Pro Ala Met Lys Gln Gln Gly Trp Thr Pro Lys
                805                 810                 815
Met Met Phe Glu Glu Ser Asp Arg Phe Phe Thr Ser Leu Gly Leu Ile
            820                 825                 830
Pro Met Pro Gln Glu Phe Trp Asp Lys Ser Met Ile Glu Lys Pro Ala
        835                 840                 845
Asp Gly Arg Glu Val Val Cys His Ala Ser Ala Trp Asp Phe Tyr Asn
    850                 855                 860
Arg Lys Asp Phe Arg Ile Lys Gln Cys Thr Val Val Asn Met Asp Asp
```

```
                865                 870                 875                 880
Leu Ile Thr Val His His Glu Met Gly His Val Gln Tyr Phe Leu Gln
                    885                 890                 895
Tyr Met Asp Gln Pro Ile Ser Phe Arg Asp Gly Ala Asn Pro Gly Phe
                900                 905                 910
His Glu Ala Ile Gly Asp Val Met Ala Leu Ser Val Ser Thr Pro Lys
                    915                 920                 925
His Leu His Ser Ile Asn Leu Leu Asp Gln Val Thr Glu Asn Glu Glu
                930                 935                 940
Ser Asp Ile Asn Tyr Leu Met Ser Ile Ala Leu Asp Lys Ile Ala Phe
945                 950                 955                 960
Leu Pro Phe Gly Tyr Leu Met Asp Gln Trp Arg Trp Lys Val Phe Asp
                    965                 970                 975
Gly Arg Ile Lys Glu Asp Glu Tyr Asn Gln Gln Trp Trp Asn Leu Arg
                980                 985                 990
Leu Lys Tyr Gln Gly Leu Cys Pro Pro Val Pro Arg Ser Glu Asp Asp
                    995                1000                1005
Phe Asp Pro Gly Ala Lys Phe His Ile Pro Ala Asn Val Pro Tyr
    1010                1015                1020
Ile Arg Tyr Phe Val Ser Phe Val Ile Gln Phe Gln Phe His Gln
    1025                1030                1035
Ala Leu Cys Lys Ala Ala Gly His Thr Gly Pro Leu His Thr Cys
    1040                1045                1050
Asp Ile Tyr Gln Ser Lys Glu Ala Gly Lys Leu Leu Gly Asp Ala
    1055                1060                1065
Met Lys Leu Gly Phe Ser Lys Pro Trp Pro Glu Ala Met Gln Leu
    1070                1075                1080
Ile Thr Gly Gln Pro Asn Met Ser Ala Glu Ala Leu Met Ser Tyr
    1085                1090                1095
Phe Glu Pro Leu Met Thr Trp Leu Val Lys Lys Asn Thr Glu Asn
    1100                1105                1110
Gly Glu Val Leu Gly Trp Pro Glu Tyr Ser Trp Thr Pro Tyr Ala
    1115                1120                1125
Val Thr Glu Phe His Ala Ala Thr Asp Thr Ala Asp Phe Leu Gly
    1130                1135                1140
Met Ser Val Gly Thr Lys Gln Ala Thr Ala Gly Ala Trp Val Leu
    1145                1150                1155
Leu Ala Leu Ala Leu Val Phe Leu Ile Thr Ser Ile Phe Leu Gly
    1160                1165                1170
Val Lys Leu Phe Ser Ser Arg Arg Lys Ala Phe Lys Ser Ser Ser
    1175                1180                1185
Glu Met Glu Leu Lys
    1190

<210> SEQ ID NO 135
<211> LENGTH: 609
<212> TYPE: PRT
<213> ORGANISM: Gallus gallus

<400> SEQUENCE: 135

Met Arg Met Pro Tyr Glu Ile Lys Lys Val Phe Ala Ser Leu Pro Gln
1               5                  10                  15
Val Glu Arg Gly Val Ser Lys Ile Gly Gly Asp Pro Lys Gly Asn
            20                  25                  30
```

-continued

```
Asn Phe Leu Tyr Thr Asn Gly Lys Cys Val Val Ile Arg Asn Ile Asp
         35                  40                  45

Asn Pro Ala Ile Ala Asp Ile Tyr Thr Glu His Ala His Gln Val Val
 50                  55                  60

Val Ala Lys Tyr Ala Pro Ser Gly Phe Tyr Ile Ala Ser Gly Asp Val
 65                  70                  75                  80

Ser Gly Lys Leu Arg Ile Trp Asp Thr Thr Gln Lys Glu His Leu Leu
                 85                  90                  95

Lys Tyr Glu Tyr Gln Pro Phe Ala Gly Lys Ile Lys Asp Leu Ala Trp
             100                 105                 110

Thr Glu Asp Ser Lys Arg Ile Ala Val Val Gly Glu Gly Arg Glu Lys
         115                 120                 125

Phe Gly Ala Val Phe Leu Trp Asp Ser Gly Ser Val Gly Glu Ile
     130                 135                 140

Thr Gly His Asn Lys Val Ile Asn Ser Val Asp Ile Lys Gln Thr Arg
145                 150                 155                 160

Pro Tyr Arg Leu Ala Thr Gly Ser Asp Asp Asn Cys Ala Ala Phe Phe
                 165                 170                 175

Glu Gly Pro Pro Phe Lys Phe Lys Phe Thr Leu Ser Asp His Thr Arg
             180                 185                 190

Phe Val Asn Cys Val Arg Phe Ser Pro Asp Gly Asn Arg Phe Ala Thr
         195                 200                 205

Ala Ser Ala Asp Gly Gln Ile Phe Ile Tyr Asp Gly Lys Thr Gly Glu
     210                 215                 220

Lys Val Cys Ala Leu Gly Gly Lys Ala His Asp Gly Gly Ile Tyr
225                 230                 235                 240

Ala Ile Ser Trp Ser Pro Asp Ser Ser Gln Leu Leu Ser Ala Ser Gly
                 245                 250                 255

Asp Lys Thr Ala Lys Ile Trp Asp Val Gly Ala Asn Ser Val Val Ser
             260                 265                 270

Thr Phe Asn Met Gly Ser Asn Val Leu Asp Gln Leu Gly Cys Leu
         275                 280                 285

Trp Gln Lys Asp His Leu Leu Ser Leu Ser Leu Ser Gly Tyr Ile Asn
     290                 295                 300

Tyr Leu Asp Lys Asn Asn Pro Asp Lys Pro Leu Arg Val Ile Lys Gly
305                 310                 315                 320

His Ser Lys Ser Ile Gln Cys Leu Thr Val His Lys Asn Gly Gly Lys
                 325                 330                 335

Ser Tyr Ile Tyr Ser Gly Ser Asn Asp Gly His Ile Asn Tyr Trp Asp
             340                 345                 350

Ser Asp Thr Gly Glu Asn Asp Gly Phe Ser Gly Lys Gly His Thr Asn
         355                 360                 365

Gln Val Ser Arg Met Ala Val Asp Glu Met Asp Gln Leu Val Thr Cys
     370                 375                 380

Ser Met Asp Asp Thr Val Arg Tyr Thr Asn Leu Ser Lys Arg Asp Tyr
385                 390                 395                 400

Ser Gly Gln Asp Ala Val Lys Met Asp Val Gln Pro Lys Cys Leu Ala
                 405                 410                 415

Val Gly Pro Gly Gly Tyr Thr Val Leu Cys Ile Gly Gln Ile Val
             420                 425                 430

Leu Met Lys Asp Lys Lys Lys Cys Phe Ala Ile Asp Asp Leu Gly Tyr
         435                 440                 445

Glu Pro Glu Ala Val Ala Val His Pro Gly Gly Gly Ser Val Ala Val
```

```
                450             455             460
Gly Gly Thr Asp Gly Asn Val Arg Leu Tyr Ser Ile Gln Gly Thr Ser
465                 470                 475                 480

Leu Lys Ser Asp Asp Lys Thr Leu Glu Ala Lys Gly Pro Val Thr Asp
                485                 490                 495

Leu Ala Tyr Ser His Asp Gly Ala Phe Leu Ala Val Cys Asp Ala Asn
                500                 505                 510

Lys Val Val Thr Val Phe Ser Val Pro Asp Gly Tyr Val Glu His Asn
                515                 520                 525

Val Phe Tyr Gly His His Ala Lys Val Val Cys Ile Ala Trp Ser Pro
                530                 535                 540

Asp Asn Glu His Phe Ala Ser Gly Gly Met Asp Met Met Val Tyr Val
545                 550                 555                 560

Trp Thr Val Ser Asp Pro Glu Thr Arg Ile Lys Ile Pro Asp Ala His
                565                 570                 575

Arg Leu His His Val Ser Gly Leu Ala Trp Leu Asp Glu His Thr Leu
                580                 585                 590

Val Thr Thr Ser His Asp Ala Ser Val Lys Glu Trp Ser Ile Ser Tyr
                595                 600                 605

Asn

<210> SEQ ID NO 136
<211> LENGTH: 423
<212> TYPE: PRT
<213> ORGANISM: Gallus gallus

<400> SEQUENCE: 136

Met Ala Leu Leu Gln Ser Arg Leu Leu Leu Ser Ala Pro Arg Arg Ala
1               5                   10                  15

Ala Ala Thr Ala Arg Ala Ser Ser Trp Trp Ser His Val Glu Met Gly
                20                  25                  30

Pro Pro Asp Pro Ile Leu Gly Val Thr Glu Ala Phe Lys Arg Asp Thr
                35                  40                  45

Asn Ser Lys Lys Met Asn Leu Gly Val Gly Ala Tyr Arg Asp Asp Asn
50                  55                  60

Gly Lys Ser Tyr Val Leu Asn Cys Val Arg Lys Ala Glu Ala Met Ile
65                  70                  75                  80

Ala Ala Lys Lys Met Asp Lys Glu Tyr Leu Pro Ile Ala Gly Leu Ala
                85                  90                  95

Asp Phe Thr Arg Ala Ser Ala Glu Leu Ala Leu Gly Glu Asn Ser Glu
                100                 105                 110

Ala Phe Lys Ser Gly Arg Tyr Val Thr Val Gln Gly Ile Ser Gly Thr
                115                 120                 125

Gly Ser Leu Arg Val Gly Ala Asn Phe Leu Gln Arg Phe Phe Lys Phe
                130                 135                 140

Ser Arg Asp Val Tyr Leu Pro Lys Pro Ser Trp Gly Asn His Thr Pro
145                 150                 155                 160

Ile Phe Arg Asp Ala Gly Leu Gln Leu Gln Ala Tyr Arg Tyr Tyr Asp
                165                 170                 175

Pro Lys Thr Cys Ser Leu Asp Phe Thr Gly Ala Met Glu Asp Ile Ser
                180                 185                 190

Lys Ile Pro Glu Lys Ser Ile Ile Leu Leu His Ala Cys Ala His Asn
                195                 200                 205

Pro Thr Gly Val Asp Pro Arg Gln Glu Gln Trp Lys Glu Leu Ala Ser
```

```
                210                 215                 220
Val Val Lys Lys Arg Asn Leu Leu Ala Tyr Phe Asp Met Ala Tyr Gln
225                 230                 235                 240

Gly Phe Ala Ser Gly Asp Ile Asn Arg Asp Ala Trp Ala Leu Arg His
                245                 250                 255

Phe Ile Glu Gln Gly Ile Asp Val Val Leu Ser Gln Ser Tyr Ala Lys
                260                 265                 270

Asn Met Gly Leu Tyr Gly Glu Arg Ala Gly Ala Phe Thr Val Ile Cys
                275                 280                 285

Arg Asp Ala Glu Glu Ala Lys Arg Val Glu Ser Gln Leu Lys Ile Leu
                290                 295                 300

Ile Arg Pro Met Tyr Ser Asn Pro Pro Met Asn Gly Ala Arg Ile Ala
305                 310                 315                 320

Ser Leu Ile Leu Asn Thr Pro Glu Leu Arg Lys Glu Trp Leu Val Glu
                325                 330                 335

Val Lys Gly Met Ala Asp Arg Ile Ile Ser Met Arg Thr Gln Leu Val
                340                 345                 350

Ser Asn Leu Lys Lys Glu Gly Ser Ser His Asn Trp Gln His Ile Thr
                355                 360                 365

Asp Gln Ile Gly Met Phe Cys Phe Thr Gly Leu Lys Pro Glu Gln Val
                370                 375                 380

Glu Arg Leu Thr Lys Glu Phe Ser Ile Tyr Met Thr Lys Asp Gly Arg
385                 390                 395                 400

Ile Ser Val Ala Gly Val Ala Ser Ser Asn Val Gly Tyr Leu Ala His
                405                 410                 415

Ala Ile His Gln Val Thr Lys
                420

<210> SEQ ID NO 137
<211> LENGTH: 129
<212> TYPE: PRT
<213> ORGANISM: Gallus gallus

<400> SEQUENCE: 137

Met Ser Gly Arg Gly Lys Gln Gly Gly Lys Ala Arg Ala Lys Ala Lys
1               5                   10                  15

Ser Arg Ser Ser Arg Ala Gly Leu Gln Phe Pro Val Gly Arg Val His
                20                  25                  30

Arg Leu Leu Arg Lys Gly Asn Tyr Ala Glu Arg Val Gly Ala Gly Ala
            35                  40                  45

Pro Val Tyr Leu Ala Ala Val Leu Glu Tyr Leu Thr Ala Glu Ile Leu
        50                  55                  60

Glu Leu Ala Gly Asn Ala Ala Arg Asp Asn Lys Lys Thr Arg Ile Ile
65                  70                  75                  80

Pro Arg His Leu Gln Leu Ala Ile Arg Asn Asp Glu Glu Leu Asn Lys
                85                  90                  95

Leu Leu Gly Lys Val Thr Ile Ala Gln Gly Gly Val Leu Pro Asn Ile
                100                 105                 110

Gln Ala Val Leu Leu Pro Lys Lys Thr Asp Ser His Lys Ala Lys Ala
            115                 120                 125

Lys

<210> SEQ ID NO 138
<211> LENGTH: 103
<212> TYPE: PRT
```

<213> ORGANISM: Gallus gallus

<400> SEQUENCE: 138

Gln Pro Lys Val Ala Pro Thr Ile Thr Leu Phe Pro Pro Ser Lys Glu
1               5                   10                  15

Glu Leu Asn Glu Ala Thr Lys Ala Thr Leu Val Cys Leu Ile Asn Asp
            20                  25                  30

Phe Tyr Pro Ser Pro Val Thr Val Asp Trp Val Ile Asp Gly Ser Thr
        35                  40                  45

Arg Ser Gly Glu Thr Thr Ala Pro Gln Arg Gln Ser Asn Ser Gln Tyr
    50                  55                  60

Met Ala Ser Ser Tyr Leu Ser Leu Ser Ala Ser Asp Trp Ser Ser His
65                  70                  75                  80

Glu Thr Tyr Thr Cys Arg Val Thr His Asn Gly Thr Ser Ile Thr Lys
                85                  90                  95

Thr Leu Lys Arg Ser Glu Cys
            100

<210> SEQ ID NO 139
<211> LENGTH: 113
<212> TYPE: PRT
<213> ORGANISM: Gallus gallus

<400> SEQUENCE: 139

Met Ala Trp Ala Pro Leu Leu Leu Ala Val Leu Ala His Thr Ser Gly
1               5                   10                  15

Ser Leu Val Gln Ala Ala Leu Thr Gln Pro Ser Ser Val Ser Ala Asn
            20                  25                  30

Pro Gly Glu Thr Val Lys Ile Thr Cys Ser Gly Asp Arg Ser Tyr Tyr
        35                  40                  45

Gly Trp Tyr Gln Gln Lys Ala Pro Gly Ser Ala Pro Val Thr Leu Ile
    50                  55                  60

Tyr Asp Asn Thr Asn Arg Pro Ser Asn Ile Pro Ser Arg Phe Ser Gly
65                  70                  75                  80

Ser Lys Ser Gly Ser Thr Ala Thr Leu Thr Ile Thr Gly Val Gln Ala
                85                  90                  95

Asp Asp Glu Ala Val Tyr Tyr Cys Gly Ser Ala Asp Ser Ser Ser Thr
            100                 105                 110

Ala

<210> SEQ ID NO 140
<211> LENGTH: 398
<212> TYPE: PRT
<213> ORGANISM: Gallus gallus

<400> SEQUENCE: 140

Met Ala Pro Arg Gly Leu Leu Val Leu Leu Leu Ala Leu Val Gly
1               5                   10                  15

Pro Cys Ala Ala Leu Ile Arg Ile Pro Leu Thr Lys Phe Thr Ser Thr
            20                  25                  30

Arg Arg Met Leu Thr Glu Val Gly Ser Glu Ile Pro Asp Met Asn Ala
        35                  40                  45

Ile Thr Gln Phe Leu Lys Phe Lys Leu Gly Phe Ala Asp Leu Ala Glu
    50                  55                  60

Pro Thr Pro Glu Ile Leu Lys Asn Tyr Met Asp Ala Gln Tyr Tyr Gly
65                  70                  75                  80

```
Glu Ile Gly Ile Gly Thr Pro Pro Gln Lys Phe Thr Val Val Phe Asp
                85                  90                  95

Thr Gly Ser Ser Asn Leu Trp Val Pro Ser Val His Cys His Leu Leu
            100                 105                 110

Asp Ile Ala Cys Leu Leu His His Lys Tyr Asp Ala Ser Lys Ser Ser
            115                 120                 125

Thr Tyr Val Glu Asn Gly Thr Glu Phe Ala Ile His Tyr Gly Thr Gly
            130                 135                 140

Ser Leu Ser Gly Phe Leu Ser Gln Asp Thr Val Thr Leu Gly Asn Leu
145                 150                 155                 160

Lys Ile Lys Asn Gln Ile Phe Gly Glu Ala Val Lys Gln Pro Gly Ile
                165                 170                 175

Thr Phe Ile Ala Ala Lys Phe Asp Gly Ile Leu Gly Met Ala Phe Pro
            180                 185                 190

Arg Ile Ser Val Asp Lys Val Thr Pro Phe Phe Asp Asn Val Met Gln
            195                 200                 205

Gln Lys Leu Ile Glu Lys Asn Ile Phe Ser Phe Tyr Leu Asn Arg Asp
210                 215                 220

Pro Thr Ala Gln Pro Gly Gly Glu Leu Leu Leu Gly Gly Thr Asp Pro
225                 230                 235                 240

Lys Tyr Tyr Ser Gly Asp Phe Ser Trp Val Asn Val Thr Arg Lys Ala
                245                 250                 255

Tyr Trp Gln Val His Met Asp Ser Val Asp Val Ala Asn Gly Leu Thr
            260                 265                 270

Leu Cys Lys Gly Gly Cys Glu Ala Ile Val Asp Thr Gly Thr Ser Leu
            275                 280                 285

Ile Thr Gly Pro Thr Lys Glu Val Lys Glu Leu Gln Thr Ala Ile Gly
290                 295                 300

Ala Lys Pro Leu Ile Lys Gly Gln Tyr Val Ile Ser Cys Asp Lys Ile
305                 310                 315                 320

Ser Ser Leu Pro Val Val Thr Leu Met Leu Gly Gly Lys Pro Tyr Gln
                325                 330                 335

Leu Thr Gly Glu Gln Tyr Val Phe Lys Val Ser Ala Gln Gly Glu Thr
            340                 345                 350

Ile Cys Leu Ser Gly Phe Ser Gly Leu Asp Val Pro Pro Pro Gly Gly
            355                 360                 365

Pro Leu Trp Ile Leu Gly Asp Val Phe Ile Gly Pro Tyr Tyr Thr Val
370                 375                 380

Phe Asp Arg Asp Asn Asp Ser Val Gly Phe Ala Lys Cys Val
385                 390                 395

<210> SEQ ID NO 141
<211> LENGTH: 196
<212> TYPE: PRT
<213> ORGANISM: Gallus gallus

<400> SEQUENCE: 141

Met Ala Tyr Thr Trp Arg Ala Leu Leu Leu Ala Leu Ala Phe Leu
1               5                   10                  15

Gly Ser Ser Met Ala Glu Arg Asp Cys Arg Val Ser Ser Phe Lys Val
                20                  25                  30

Lys Glu Asn Phe Asp Lys Asn Arg Tyr Ser Gly Thr Trp Tyr Ala Met
            35                  40                  45

Ala Lys Lys Asp Pro Glu Gly Leu Phe Leu Gln Asp Asn Val Val Ala
50                  55                  60
```

```
Gln Phe Thr Val Asp Glu Asn Gly Gln Met Ser Ala Thr Ala Lys Gly
 65                  70                  75                  80

Arg Val Arg Leu Phe Asn Asn Trp Asp Val Cys Ala Asp Met Ile Gly
                 85                  90                  95

Ser Phe Thr Asp Thr Glu Asp Pro Ala Lys Phe Lys Met Lys Tyr Trp
            100                 105                 110

Gly Val Ala Ser Phe Leu Gln Lys Gly Asn Asp Asp His Trp Val Val
        115                 120                 125

Asp Thr Asp Tyr Asp Thr Tyr Ala Leu His Tyr Ser Cys Arg Glu Leu
    130                 135                 140

Asn Glu Asp Gly Thr Cys Ala Asp Ser Tyr Ser Phe Val Phe Ser Arg
145                 150                 155                 160

Asp Pro Lys Gly Leu Pro Pro Glu Ala Gln Lys Ile Val Arg Gln Arg
                165                 170                 175

Gln Ile Asp Leu Cys Leu Asp Arg Lys Tyr Arg Val Ile Val His Asn
            180                 185                 190

Gly Phe Cys Ser
        195
```

```
<210> SEQ ID NO 142
<211> LENGTH: 10
<212> TYPE: PRT
<213> ORGANISM: Gallus gallus

<400> SEQUENCE: 142

Lys Val Leu Thr Ser Phe Gly Asp Ala Val
1               5                   10

<210> SEQ ID NO 143
<211> LENGTH: 8
<212> TYPE: PRT
<213> ORGANISM: Gallus gallus

<400> SEQUENCE: 143

Leu His Val Asp Pro Glu Asn Phe
1               5

<210> SEQ ID NO 144
<211> LENGTH: 10
<212> TYPE: PRT
<213> ORGANISM: Gallus gallus

<400> SEQUENCE: 144

Leu Leu Ile Val Tyr Pro Trp Thr Gln Arg
1               5                   10

<210> SEQ ID NO 145
<211> LENGTH: 6
<212> TYPE: PRT
<213> ORGANISM: Gallus gallus

<400> SEQUENCE: 145

Asn Leu Asp Asn Ile Lys
1               5

<210> SEQ ID NO 146
<211> LENGTH: 10
<212> TYPE: PRT
<213> ORGANISM: Gallus gallus

<400> SEQUENCE: 146
```

```
Val Leu Thr Ser Phe Gly Asp Ala Val Lys
1               5                   10

<210> SEQ ID NO 147
<211> LENGTH: 6
<212> TYPE: PRT
<213> ORGANISM: Gallus gallus

<400> SEQUENCE: 147

Ala Val Cys Val Met Lys
1               5

<210> SEQ ID NO 148
<211> LENGTH: 10
<212> TYPE: PRT
<213> ORGANISM: Gallus gallus

<400> SEQUENCE: 148

Phe Gln Gln Gln Gly Ser Gly Pro Val Lys
1               5                   10

<210> SEQ ID NO 149
<211> LENGTH: 20
<212> TYPE: PRT
<213> ORGANISM: Gallus gallus

<400> SEQUENCE: 149

Gly Asp Ala Pro Val Glu Gly Val Ile His Phe Gln Gln Gly Ser
1               5                   10                  15

Gly Pro Val Lys
            20

<210> SEQ ID NO 150
<211> LENGTH: 8
<212> TYPE: PRT
<213> ORGANISM: Gallus gallus

<400> SEQUENCE: 150

Gly Gly Val Ala Glu Val Glu Ile
1               5

<210> SEQ ID NO 151
<211> LENGTH: 19
<212> TYPE: PRT
<213> ORGANISM: Gallus gallus

<400> SEQUENCE: 151

Gly Gly Val Ala Glu Val Glu Ile Glu Asp Ser Val Ile Ser Leu Thr
1               5                   10                  15

Gly Pro His

<210> SEQ ID NO 152
<211> LENGTH: 7
<212> TYPE: PRT
<213> ORGANISM: Gallus gallus

<400> SEQUENCE: 152

Gly Val Ile Gly Ile Ala Lys
1               5

<210> SEQ ID NO 153
<211> LENGTH: 10
<212> TYPE: PRT
```

<213> ORGANISM: Gallus gallus

<400> SEQUENCE: 153

His Val Gly Asp Leu Gly Asn Val Thr Ala
1               5                   10

<210> SEQ ID NO 154
<211> LENGTH: 11
<212> TYPE: PRT
<213> ORGANISM: Gallus gallus

<400> SEQUENCE: 154

His Val Gly Asp Leu Gly Asn Val Thr Ala Lys
1               5                   10

<210> SEQ ID NO 155
<211> LENGTH: 14
<212> TYPE: PRT
<213> ORGANISM: Gallus gallus

<400> SEQUENCE: 155

Ile Thr Gly Leu Ser Asp Gly Asp His Gly Phe His Val His
1               5                   10

<210> SEQ ID NO 156
<211> LENGTH: 10
<212> TYPE: PRT
<213> ORGANISM: Gallus gallus

<400> SEQUENCE: 156

Leu Ala Cys Gly Val Ile Gly Ile Ala Lys
1               5                   10

<210> SEQ ID NO 157
<211> LENGTH: 8
<212> TYPE: PRT
<213> ORGANISM: Gallus gallus

<400> SEQUENCE: 157

Leu Thr Gly Asn Ala Gly Pro Arg
1               5

<210> SEQ ID NO 158
<211> LENGTH: 6
<212> TYPE: PRT
<213> ORGANISM: Gallus gallus

<400> SEQUENCE: 158

Ser Asp Asp Leu Gly Arg
1               5

<210> SEQ ID NO 159
<211> LENGTH: 13
<212> TYPE: PRT
<213> ORGANISM: Gallus gallus

<400> SEQUENCE: 159

Ser Asp Asp Leu Gly Arg Gly Gly Asp Asn Glu Ser Lys
1               5                   10

<210> SEQ ID NO 160
<211> LENGTH: 6
<212> TYPE: PRT
<213> ORGANISM: Gallus gallus

```
<400> SEQUENCE: 160

Thr Met Val Val His Ala
1               5

<210> SEQ ID NO 161
<211> LENGTH: 14
<212> TYPE: PRT
<213> ORGANISM: Gallus gallus

<400> SEQUENCE: 161

Asp Ala Glu Asp Ile Val Asn Thr Ala Arg Pro Asp Glu Lys
1               5                   10

<210> SEQ ID NO 162
<211> LENGTH: 8
<212> TYPE: PRT
<213> ORGANISM: Gallus gallus

<400> SEQUENCE: 162

Thr Ile Pro Trp Leu Glu Asp Arg
1               5

<210> SEQ ID NO 163
<211> LENGTH: 26
<212> TYPE: PRT
<213> ORGANISM: Gallus gallus

<400> SEQUENCE: 163

Ala Ala Leu Pro Glu Asp Glu Leu Lys Glu Tyr Asn Thr Leu Leu Ser
1               5                   10                  15

Asp Met Glu Thr Thr Tyr Ser Val Ala Lys
            20                  25

<210> SEQ ID NO 164
<211> LENGTH: 5
<212> TYPE: PRT
<213> ORGANISM: Gallus gallus

<400> SEQUENCE: 164

Ala Leu Tyr Asn Lys
1               5

<210> SEQ ID NO 165
<211> LENGTH: 14
<212> TYPE: PRT
<213> ORGANISM: Gallus gallus

<400> SEQUENCE: 165

Asp Gly Ala Asn Pro Gly Phe His Glu Ala Ile Gly Asp Val
1               5                   10

<210> SEQ ID NO 166
<211> LENGTH: 16
<212> TYPE: PRT
<213> ORGANISM: Gallus gallus

<400> SEQUENCE: 166

Asp Gly Ala Asn Pro Gly Phe His Glu Ala Ile Gly Asp Val Met Ala
1               5                   10                  15

<210> SEQ ID NO 167
<211> LENGTH: 17
<212> TYPE: PRT
<213> ORGANISM: Gallus gallus
```

<400> SEQUENCE: 167

Asp Gly Asn Pro Gly Phe His Glu Ala Ile Gly Asp Val Met Ala
1               5                   10                  15

Leu

<210> SEQ ID NO 168
<211> LENGTH: 10
<212> TYPE: PRT
<213> ORGANISM: Gallus gallus

<400> SEQUENCE: 168

Asp Tyr Asn Glu Leu Leu Phe Ala Trp Lys
1               5                   10

<210> SEQ ID NO 169
<211> LENGTH: 11
<212> TYPE: PRT
<213> ORGANISM: Gallus gallus

<400> SEQUENCE: 169

Glu Thr Pro Thr Phe Glu Glu Asp Leu Glu Arg
1               5                   10

<210> SEQ ID NO 170
<211> LENGTH: 6
<212> TYPE: PRT
<213> ORGANISM: Gallus gallus

<400> SEQUENCE: 170

Glu Val Met Leu Glu Lys
1               5

<210> SEQ ID NO 171
<211> LENGTH: 6
<212> TYPE: PRT
<213> ORGANISM: Gallus gallus

<400> SEQUENCE: 171

Phe Glu Glu Ser Asp Arg
1               5

<210> SEQ ID NO 172
<211> LENGTH: 17
<212> TYPE: PRT
<213> ORGANISM: Gallus gallus

<400> SEQUENCE: 172

Phe Phe Thr Ser Leu Gly Leu Ile Pro Met Pro Gln Glu Phe Trp Asp
1               5                   10                  15

Lys

<210> SEQ ID NO 173
<211> LENGTH: 16
<212> TYPE: PRT
<213> ORGANISM: Gallus gallus

<400> SEQUENCE: 173

Gly Gly Ala Asn Pro Gly Phe His Glu Ala Ile Gly Asp Val Leu Ser
1               5                   10                  15

<210> SEQ ID NO 174
<211> LENGTH: 12

```
<212> TYPE: PRT
<213> ORGANISM: Gallus gallus

<400> SEQUENCE: 174

Gly Leu Ile Pro Met Pro Gln Glu Phe Trp Asp Lys
1               5                   10

<210> SEQ ID NO 175
<211> LENGTH: 12
<212> TYPE: PRT
<213> ORGANISM: Gallus gallus

<400> SEQUENCE: 175

Gly Leu Leu Glu Met Pro Pro Glu Phe Trp Glu Lys
1               5                   10

<210> SEQ ID NO 176
<211> LENGTH: 7
<212> TYPE: PRT
<213> ORGANISM: Gallus gallus

<400> SEQUENCE: 176

Gly Pro Ile Pro Ala His Leu
1               5

<210> SEQ ID NO 177
<211> LENGTH: 12
<212> TYPE: PRT
<213> ORGANISM: Gallus gallus

<400> SEQUENCE: 177

Gly Pro Ile Pro Ala His Leu Leu Gly Asn Met Trp
1               5                   10

<210> SEQ ID NO 178
<211> LENGTH: 15
<212> TYPE: PRT
<213> ORGANISM: Gallus gallus

<400> SEQUENCE: 178

Gly Pro Ile Pro Ala His Leu Leu Gly Asn Met Trp Ala Gln Gln
1               5                   10                  15

<210> SEQ ID NO 179
<211> LENGTH: 15
<212> TYPE: PRT
<213> ORGANISM: Gallus gallus

<400> SEQUENCE: 179

Gly Pro Ile Pro Ala His Leu Leu Gly Asn Met Trp Ala Gln Ser
1               5                   10                  15

<210> SEQ ID NO 180
<211> LENGTH: 8
<212> TYPE: PRT
<213> ORGANISM: Gallus gallus

<400> SEQUENCE: 180

Gly Tyr Leu Ile Asp Gln Trp Arg
1               5

<210> SEQ ID NO 181
<211> LENGTH: 17
<212> TYPE: PRT
<213> ORGANISM: Gallus gallus
```

<400> SEQUENCE: 181

Ile Ile Gly Ser Ile Gln Thr Leu Gly Pro Ser Asn Leu Pro Leu Asp
1               5                   10                  15
Lys

<210> SEQ ID NO 182
<211> LENGTH: 18
<212> TYPE: PRT
<213> ORGANISM: Gallus gallus

<400> SEQUENCE: 182

Ile Ile Gly Ser Ile Gln Thr Leu Gly Pro Ser Asn Leu Pro Leu Asp
1               5                   10                  15
Lys Arg

<210> SEQ ID NO 183
<211> LENGTH: 13
<212> TYPE: PRT
<213> ORGANISM: Gallus gallus

<400> SEQUENCE: 183

Ile Lys Glu Asp Glu Tyr Asn Gln Gln Trp Trp Asn Leu
1               5                   10

<210> SEQ ID NO 184
<211> LENGTH: 18
<212> TYPE: PRT
<213> ORGANISM: Gallus gallus

<400> SEQUENCE: 184

Lys Ile Ile Gly Ser Ile Gln Thr Leu Gly Pro Ser Asn Leu Pro Leu
1               5                   10                  15
Asp Lys

<210> SEQ ID NO 185
<211> LENGTH: 18
<212> TYPE: PRT
<213> ORGANISM: Gallus gallus

<400> SEQUENCE: 185

Lys Ile Ile Gly Ser Ile Gln Thr Leu Gly Pro Ser Asn Leu Pro Leu
1               5                   10                  15
Asp Lys

<210> SEQ ID NO 186
<211> LENGTH: 7
<212> TYPE: PRT
<213> ORGANISM: Gallus gallus

<400> SEQUENCE: 186

Leu Leu Gly Asp Ala Met Lys
1               5

<210> SEQ ID NO 187
<211> LENGTH: 17
<212> TYPE: PRT
<213> ORGANISM: Gallus gallus

<400> SEQUENCE: 187

Leu Leu Tyr Ala Trp Glu Gly Trp His Asn Ala Ala Gly Asn Pro Leu
1               5                   10                  15

Arg

<210> SEQ ID NO 188
<211> LENGTH: 6
<212> TYPE: PRT
<213> ORGANISM: Gallus gallus

<400> SEQUENCE: 188

Leu Ser Val Leu Glu Arg
1               5

<210> SEQ ID NO 189
<211> LENGTH: 7
<212> TYPE: PRT
<213> ORGANISM: Gallus gallus

<400> SEQUENCE: 189

Met Ser Ile Ala Leu Asp Lys
1               5

<210> SEQ ID NO 190
<211> LENGTH: 9
<212> TYPE: PRT
<213> ORGANISM: Gallus gallus

<400> SEQUENCE: 190

Asn Thr Ile Leu Ser Asp Met Asp Lys
1               5

<210> SEQ ID NO 191
<211> LENGTH: 14
<212> TYPE: PRT
<213> ORGANISM: Gallus gallus

<400> SEQUENCE: 191

Gln Cys Thr Val Val Asn Met Asp Asp Leu Ile Thr Val His
1               5                   10

<210> SEQ ID NO 192
<211> LENGTH: 14
<212> TYPE: PRT
<213> ORGANISM: Gallus gallus

<400> SEQUENCE: 192

Gln Phe Asp Pro Ser Asp Phe Gln Asp Glu Thr Val Thr Arg
1               5                   10

<210> SEQ ID NO 193
<211> LENGTH: 7
<212> TYPE: PRT
<213> ORGANISM: Gallus gallus

<400> SEQUENCE: 193

Gln Gln Gly Trp Thr Pro Lys
1               5

<210> SEQ ID NO 194
<211> LENGTH: 12
<212> TYPE: PRT
<213> ORGANISM: Gallus gallus

<400> SEQUENCE: 194

Gln Gln Tyr Asn Thr Ile Leu Ser Asp Met Asp Lys
1               5                   10

```
<210> SEQ ID NO 195
<211> LENGTH: 8
<212> TYPE: PRT
<213> ORGANISM: Gallus gallus

<400> SEQUENCE: 195

Arg Tyr Val Glu Leu Ser Asn Lys
1               5

<210> SEQ ID NO 196
<211> LENGTH: 14
<212> TYPE: PRT
<213> ORGANISM: Gallus gallus

<400> SEQUENCE: 196

Ser Leu Gly Leu Ile Pro Met Pro Gln Glu Phe Trp Asp Lys
1               5                   10

<210> SEQ ID NO 197
<211> LENGTH: 12
<212> TYPE: PRT
<213> ORGANISM: Gallus gallus

<400> SEQUENCE: 197

Ser Leu Ser Val Ser Thr Pro Ser His Leu Gln Lys
1               5                   10

<210> SEQ ID NO 198
<211> LENGTH: 14
<212> TYPE: PRT
<213> ORGANISM: Gallus gallus

<400> SEQUENCE: 198

Ser Leu Tyr Glu Thr Pro Thr Phe Glu Glu Asp Leu Glu Arg
1               5                   10

<210> SEQ ID NO 199
<211> LENGTH: 10
<212> TYPE: PRT
<213> ORGANISM: Gallus gallus

<400> SEQUENCE: 199

Ser Met Ile Glu Lys Pro Ala Asp Gly Arg
1               5                   10

<210> SEQ ID NO 200
<211> LENGTH: 15
<212> TYPE: PRT
<213> ORGANISM: Gallus gallus

<400> SEQUENCE: 200

Ser Asn Ile Phe Asp Leu Val Met Pro Phe Pro Asp Ala Thr Lys
1               5                   10                  15

<210> SEQ ID NO 201
<211> LENGTH: 6
<212> TYPE: PRT
<213> ORGANISM: Gallus gallus

<400> SEQUENCE: 201

Ser Val Ser Thr Pro Lys
1               5
```

```
<210> SEQ ID NO 202
<211> LENGTH: 10
<212> TYPE: PRT
<213> ORGANISM: Gallus gallus

<400> SEQUENCE: 202

Ser Val Ser Thr Pro Ser His Leu Gln Lys
1               5                   10

<210> SEQ ID NO 203
<211> LENGTH: 11
<212> TYPE: PRT
<213> ORGANISM: Gallus gallus

<400> SEQUENCE: 203

Thr Leu Gly Pro Ser Asn Leu Pro Leu Asp Lys
1               5                   10

<210> SEQ ID NO 204
<211> LENGTH: 26
<212> TYPE: PRT
<213> ORGANISM: Gallus gallus

<400> SEQUENCE: 204

Thr Asn Glu Val Leu Gly Trp Pro Glu Phe Asp Trp Arg Ser Pro Ile
1               5                   10                  15

Pro Glu Gly Tyr Pro Glu Gly Ile Asp Lys
            20                  25

<210> SEQ ID NO 205
<211> LENGTH: 15
<212> TYPE: PRT
<213> ORGANISM: Gallus gallus

<400> SEQUENCE: 205

Thr Ser Leu Gly Leu Ile Pro Met Pro Gln Glu Phe Trp Asp Lys
1               5                   10                  15

<210> SEQ ID NO 206
<211> LENGTH: 15
<212> TYPE: PRT
<213> ORGANISM: Gallus gallus

<400> SEQUENCE: 206

Thr Ser Leu Gly Leu Leu Glu Met Pro Pro Glu Phe Trp Glu Lys
1               5                   10                  15

<210> SEQ ID NO 207
<211> LENGTH: 8
<212> TYPE: PRT
<213> ORGANISM: Gallus gallus

<400> SEQUENCE: 207

Val Asp Ala Thr Pro Ala Met Lys
1               5

<210> SEQ ID NO 208
<211> LENGTH: 6
<212> TYPE: PRT
<213> ORGANISM: Gallus gallus

<400> SEQUENCE: 208

Val Glu Leu Ser Asn Lys
1               5
```

```
<210> SEQ ID NO 209
<211> LENGTH: 9
<212> TYPE: PRT
<213> ORGANISM: Gallus gallus

<400> SEQUENCE: 209

Tyr Gly Ala Glu His Ile Ser Leu Lys
1               5

<210> SEQ ID NO 210
<211> LENGTH: 9
<212> TYPE: PRT
<213> ORGANISM: Gallus gallus

<400> SEQUENCE: 210

Tyr His Ile Pro Gly Asn Thr Pro Tyr
1               5

<210> SEQ ID NO 211
<211> LENGTH: 5
<212> TYPE: PRT
<213> ORGANISM: Gallus gallus

<400> SEQUENCE: 211

Tyr Ile Asn Leu Lys
1               5

<210> SEQ ID NO 212
<211> LENGTH: 9
<212> TYPE: PRT
<213> ORGANISM: Gallus gallus

<400> SEQUENCE: 212

Tyr Asn Glu Leu Leu Phe Ala Trp Lys
1               5

<210> SEQ ID NO 213
<211> LENGTH: 10
<212> TYPE: PRT
<213> ORGANISM: Gallus gallus

<400> SEQUENCE: 213

Tyr Gln Gly Leu Cys Pro Pro Val Pro Arg
1               5                   10

<210> SEQ ID NO 214
<211> LENGTH: 7
<212> TYPE: PRT
<213> ORGANISM: Gallus gallus

<400> SEQUENCE: 214

Tyr Val Glu Leu Ser Asn Lys
1               5

<210> SEQ ID NO 215
<211> LENGTH: 7
<212> TYPE: PRT
<213> ORGANISM: Gallus gallus

<400> SEQUENCE: 215

Ile Ile Gly Gly Asp Pro Lys
1               5

<210> SEQ ID NO 216
```

```
<211> LENGTH: 15
<212> TYPE: PRT
<213> ORGANISM: Gallus gallus

<400> SEQUENCE: 216

Lys Val Phe Ala Ser Leu Pro Gln Val Glu Arg Gly Val Ser Lys
1               5                   10                  15

<210> SEQ ID NO 217
<211> LENGTH: 8
<212> TYPE: PRT
<213> ORGANISM: Gallus gallus

<400> SEQUENCE: 217

Val Ile Asn Ser Val Asp Ile Lys
1               5

<210> SEQ ID NO 218
<211> LENGTH: 14
<212> TYPE: PRT
<213> ORGANISM: Gallus gallus

<400> SEQUENCE: 218

Gly Pro Pro Asp Pro Ile Leu Gly Val Thr Glu Ala Phe Lys
1               5                   10

<210> SEQ ID NO 219
<211> LENGTH: 7
<212> TYPE: PRT
<213> ORGANISM: Gallus gallus

<400> SEQUENCE: 219

Leu Leu Leu Ser Ala Pro Arg
1               5

<210> SEQ ID NO 220
<211> LENGTH: 8
<212> TYPE: PRT
<213> ORGANISM: Gallus gallus

<400> SEQUENCE: 220

Met Asp Lys Glu Tyr Leu Pro Ile
1               5

<210> SEQ ID NO 221
<211> LENGTH: 7
<212> TYPE: PRT
<213> ORGANISM: Gallus gallus

<400> SEQUENCE: 221

Met Gly Leu Tyr Gly Glu Arg
1               5

<210> SEQ ID NO 222
<211> LENGTH: 8
<212> TYPE: PRT
<213> ORGANISM: Gallus gallus

<400> SEQUENCE: 222

Asn Pro Thr Gly Val Asp Pro Arg
1               5

<210> SEQ ID NO 223
<211> LENGTH: 8
<212> TYPE: PRT
```

<213> ORGANISM: Gallus gallus

<400> SEQUENCE: 223

Thr Gln Leu Val Ser Asn Leu Lys
1               5

<210> SEQ ID NO 224
<211> LENGTH: 7
<212> TYPE: PRT
<213> ORGANISM: Gallus gallus

<400> SEQUENCE: 224

Asn Asp Glu Glu Leu Asn Lys
1               5

<210> SEQ ID NO 225
<211> LENGTH: 19
<212> TYPE: PRT
<213> ORGANISM: Gallus gallus

<400> SEQUENCE: 225

Val Thr Ile Ala Gln Gly Gly Val Leu Pro Asn Ile Gln Ala Val Leu
1               5                   10                  15

Leu Pro Lys

<210> SEQ ID NO 226
<211> LENGTH: 18
<212> TYPE: PRT
<213> ORGANISM: Gallus gallus

<400> SEQUENCE: 226

Asp Phe Tyr Pro Ser Pro Val Thr Val Asp Trp Val Ile Asp Gly Ser
1               5                   10                  15

Thr Arg

<210> SEQ ID NO 227
<211> LENGTH: 8
<212> TYPE: PRT
<213> ORGANISM: Gallus gallus

<400> SEQUENCE: 227

Ile Thr Leu Phe Pro Pro Ser Lys
1               5

<210> SEQ ID NO 228
<211> LENGTH: 19
<212> TYPE: PRT
<213> ORGANISM: Gallus gallus

<400> SEQUENCE: 228

Asn Asp Phe Tyr Pro Ser Pro Val Thr Val Asp Trp Val Ile Asp Gly
1               5                   10                  15

Ser Thr Arg

<210> SEQ ID NO 229
<211> LENGTH: 9
<212> TYPE: PRT
<213> ORGANISM: Gallus gallus

<400> SEQUENCE: 229

Ser Gly Glu Thr Thr Ala Pro Gln Arg
1               5

```
<210> SEQ ID NO 230
<211> LENGTH: 9
<212> TYPE: PRT
<213> ORGANISM: Gallus gallus

<400> SEQUENCE: 230

Thr His Asn Gly Thr Ser Ile Thr Lys
1               5

<210> SEQ ID NO 231
<211> LENGTH: 11
<212> TYPE: PRT
<213> ORGANISM: Gallus gallus

<400> SEQUENCE: 231

Thr Val Asp Trp Val Ile Asp Gly Ser Thr Arg
1               5                   10

<210> SEQ ID NO 232
<211> LENGTH: 12
<212> TYPE: PRT
<213> ORGANISM: Gallus gallus

<400> SEQUENCE: 232

Val Ala Pro Thr Ile Thr Leu Phe Pro Pro Ser Lys
1               5                   10

<210> SEQ ID NO 233
<211> LENGTH: 16
<212> TYPE: PRT
<213> ORGANISM: Gallus gallus

<400> SEQUENCE: 233

Val Ala Pro Thr Ile Thr Leu Phe Pro Pro Ser Lys Glu Glu Leu Asn
1               5                   10                  15

<210> SEQ ID NO 234
<211> LENGTH: 19
<212> TYPE: PRT
<213> ORGANISM: Gallus gallus

<400> SEQUENCE: 234

Val Ala Pro Thr Ile Thr Leu Phe Pro Pro Ser Lys Glu Glu Leu Asn
1               5                   10                  15

Glu Ala Thr

<210> SEQ ID NO 235
<211> LENGTH: 20
<212> TYPE: PRT
<213> ORGANISM: Gallus gallus

<400> SEQUENCE: 235

Val Ala Pro Thr Ile Thr Leu Phe Pro Pro Ser Lys Glu Glu Leu Asn
1               5                   10                  15

Glu Ala Thr Lys
                20

<210> SEQ ID NO 236
<211> LENGTH: 10
<212> TYPE: PRT
<213> ORGANISM: Gallus gallus

<400> SEQUENCE: 236
```

```
Val Thr His Asn Gly Thr Ser Ile Thr Lys
1               5                   10

<210> SEQ ID NO 237
<211> LENGTH: 17
<212> TYPE: PRT
<213> ORGANISM: Gallus gallus

<400> SEQUENCE: 237

Ala Leu Thr Gln Pro Ser Ser Val Ser Ala Asn Pro Gly Glu Thr Val
1               5                   10                  15

Lys

<210> SEQ ID NO 238
<211> LENGTH: 23
<212> TYPE: PRT
<213> ORGANISM: Gallus gallus

<400> SEQUENCE: 238

Ala Pro Gly Ser Ala Pro Val Thr Leu Ile Tyr Asp Asn Thr Asn Arg
1               5                   10                  15

Pro Ser Asn Ile Pro Ser Arg
            20

<210> SEQ ID NO 239
<211> LENGTH: 21
<212> TYPE: PRT
<213> ORGANISM: Gallus gallus

<400> SEQUENCE: 239

Gly Ser Ala Pro Val Thr Leu Ile Tyr Asp Asn Thr Asn Arg Pro Ser
1               5                   10                  15

Asn Ile Pro Ser Arg
            20

<210> SEQ ID NO 240
<211> LENGTH: 7
<212> TYPE: PRT
<213> ORGANISM: Gallus gallus

<400> SEQUENCE: 240

Ile Thr Cys Ser Gly Asp Arg
1               5

<210> SEQ ID NO 241
<211> LENGTH: 7
<212> TYPE: PRT
<213> ORGANISM: Gallus gallus

<400> SEQUENCE: 241

Asn Pro Gly Glu Thr Val Lys
1               5

<210> SEQ ID NO 242
<211> LENGTH: 7
<212> TYPE: PRT
<213> ORGANISM: Gallus gallus

<400> SEQUENCE: 242

Pro Ser Asn Ile Pro Ser Arg
1               5

<210> SEQ ID NO 243
```

```
<211> LENGTH: 8
<212> TYPE: PRT
<213> ORGANISM: Gallus gallus

<400> SEQUENCE: 243

Arg Pro Ser Asn Ile Pro Ser Arg
1               5

<210> SEQ ID NO 244
<211> LENGTH: 9
<212> TYPE: PRT
<213> ORGANISM: Gallus gallus

<400> SEQUENCE: 244

Ser Ala Asn Pro Gly Glu Thr Val Lys
1               5

<210> SEQ ID NO 245
<211> LENGTH: 11
<212> TYPE: PRT
<213> ORGANISM: Gallus gallus

<400> SEQUENCE: 245

Ser Val Ser Ala Asn Pro Gly Glu Thr Val Lys
1               5                   10

<210> SEQ ID NO 246
<211> LENGTH: 7
<212> TYPE: PRT
<213> ORGANISM: Gallus gallus

<400> SEQUENCE: 246

Tyr Gly Trp Tyr Gln Gln Lys
1               5

<210> SEQ ID NO 247
<211> LENGTH: 18
<212> TYPE: PRT
<213> ORGANISM: Gallus gallus

<400> SEQUENCE: 247

Asp Pro Thr Ala Gln Pro Gly Gly Glu Leu Leu Gly Gly Thr Asp
1               5                   10                  15

Pro Lys

<210> SEQ ID NO 248
<211> LENGTH: 11
<212> TYPE: PRT
<213> ORGANISM: Gallus gallus

<400> SEQUENCE: 248

Glu Leu Gln Thr Ala Ile Gly Ala Lys Pro Leu
1               5                   10

<210> SEQ ID NO 249
<211> LENGTH: 12
<212> TYPE: PRT
<213> ORGANISM: Gallus gallus

<400> SEQUENCE: 249

Glu Leu Gln Thr Ala Ile Gly Ala Lys Pro Leu Ile
1               5                   10

<210> SEQ ID NO 250
```

```
<211> LENGTH: 11
<212> TYPE: PRT
<213> ORGANISM: Gallus gallus

<400> SEQUENCE: 250

Phe Asp Gly Ile Leu Gly Met Ala Phe Pro Arg
1               5                   10

<210> SEQ ID NO 251
<211> LENGTH: 5
<212> TYPE: PRT
<213> ORGANISM: Gallus gallus

<400> SEQUENCE: 251

Ile Pro Leu Thr Lys
1               5

<210> SEQ ID NO 252
<211> LENGTH: 14
<212> TYPE: PRT
<213> ORGANISM: Gallus gallus

<400> SEQUENCE: 252

Gln Pro Gly Gly Glu Leu Leu Leu Gly Gly Thr Asp Pro Lys
1               5                   10

<210> SEQ ID NO 253
<211> LENGTH: 12
<212> TYPE: PRT
<213> ORGANISM: Gallus gallus

<400> SEQUENCE: 253

Val Thr Pro Phe Phe Asp Asn Val Met Gln Gln Lys
1               5                   10

<210> SEQ ID NO 254
<211> LENGTH: 8
<212> TYPE: PRT
<213> ORGANISM: Gallus gallus

<400> SEQUENCE: 254

Gln Ile Asp Leu Cys Leu Asp Arg
1               5

<210> SEQ ID NO 255
<211> LENGTH: 13
<212> TYPE: PRT
<213> ORGANISM: Gallus gallus

<400> SEQUENCE: 255

Thr Val Asp Glu Asn Gly Gln Met Ser Ala Thr Ala Lys
1               5                   10
```